Oct. 2, 1962  P. C. BROCKETT  3,056,946
TRAFFIC ACTUATED CONTROL SYSTEM AND APPARATUS
Filed Feb. 12, 1958  10 Sheets-Sheet 4

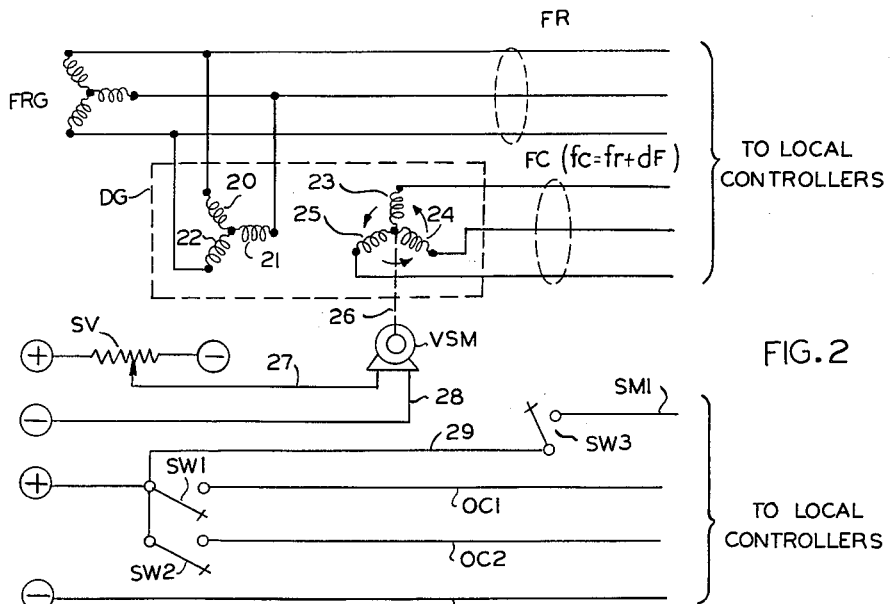
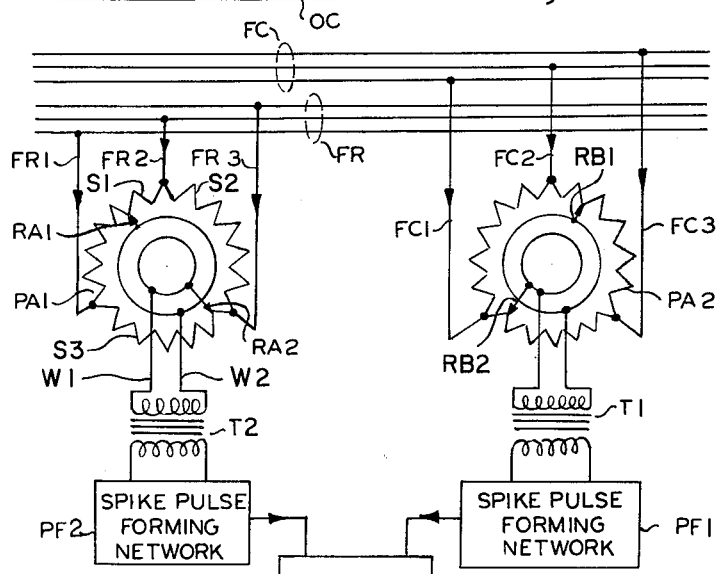
FIG.2
FIG.3
FIG.13
INVENTOR.
PETER C. BROCKETT

INVENTOR.
PETER C. BROCKETT
BY
Edward H. Eames
ATTORNEY

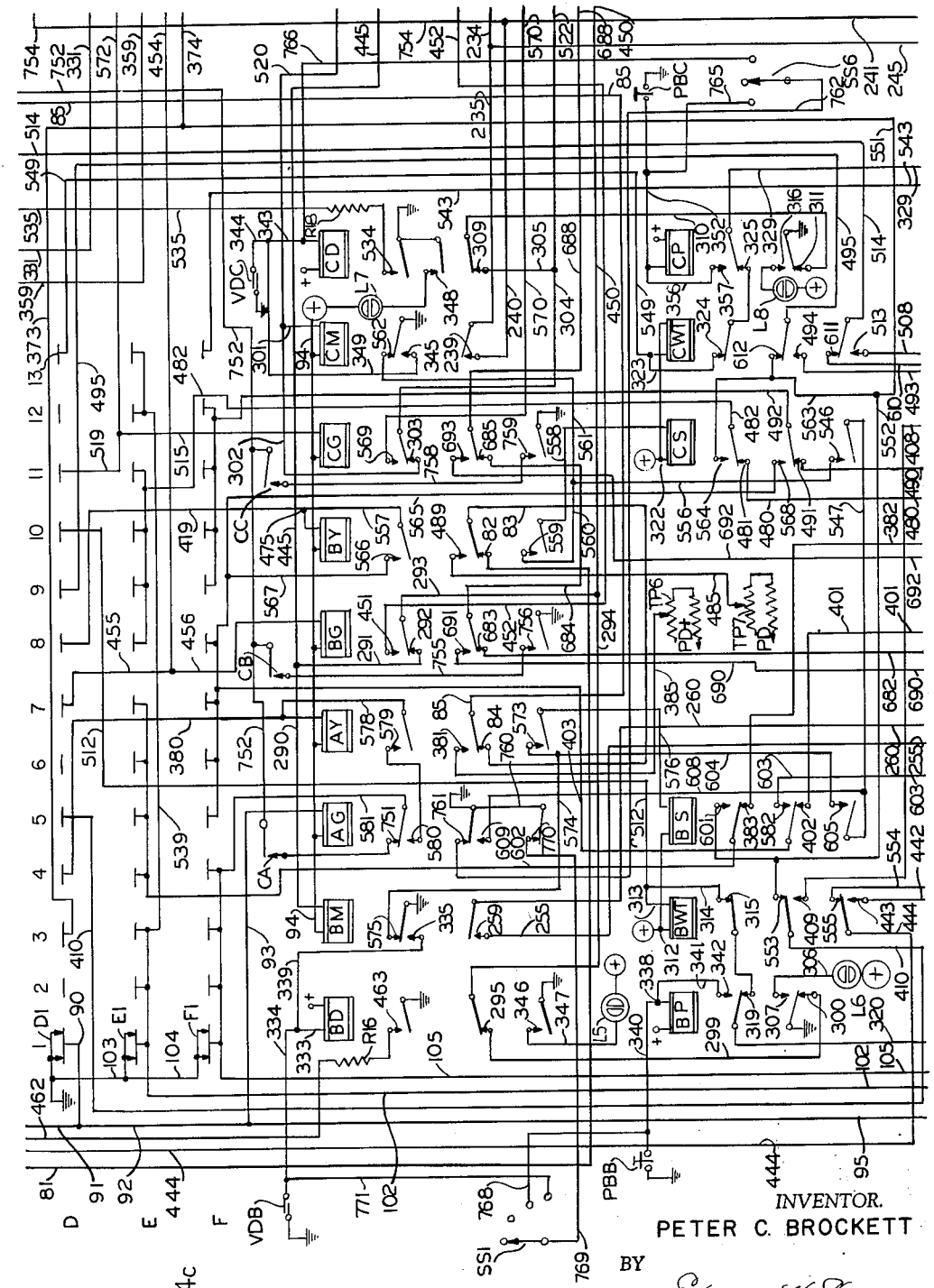

Oct. 2, 1962   P. C. BROCKETT   3,056,946
TRAFFIC ACTUATED CONTROL SYSTEM AND APPARATUS
Filed Feb. 12, 1958   10 Sheets-Sheet 6

INVENTOR.
PETER C. BROCKETT
BY
Edward H. Cairns
ATTORNEY

INVENTOR.
PETER C. BROCKETT

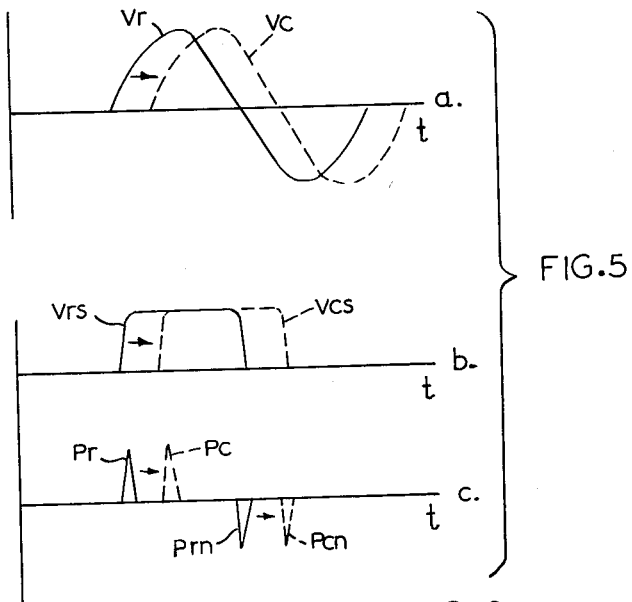
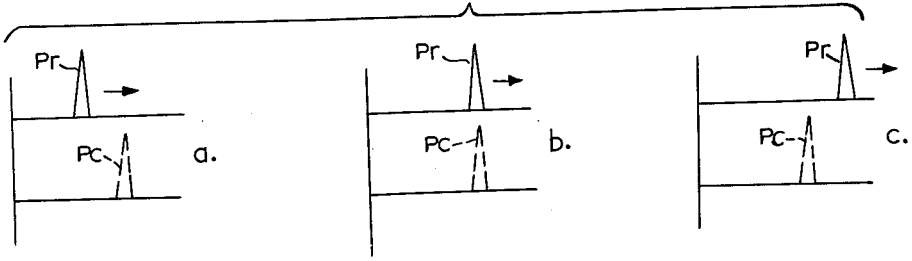
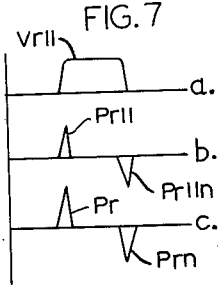 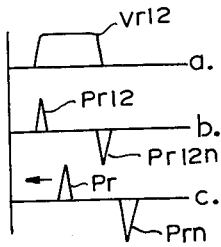 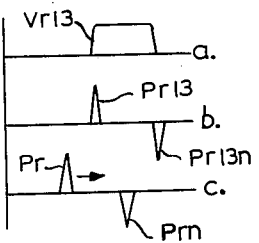
INVENTOR.
PETER C. BROCKETT

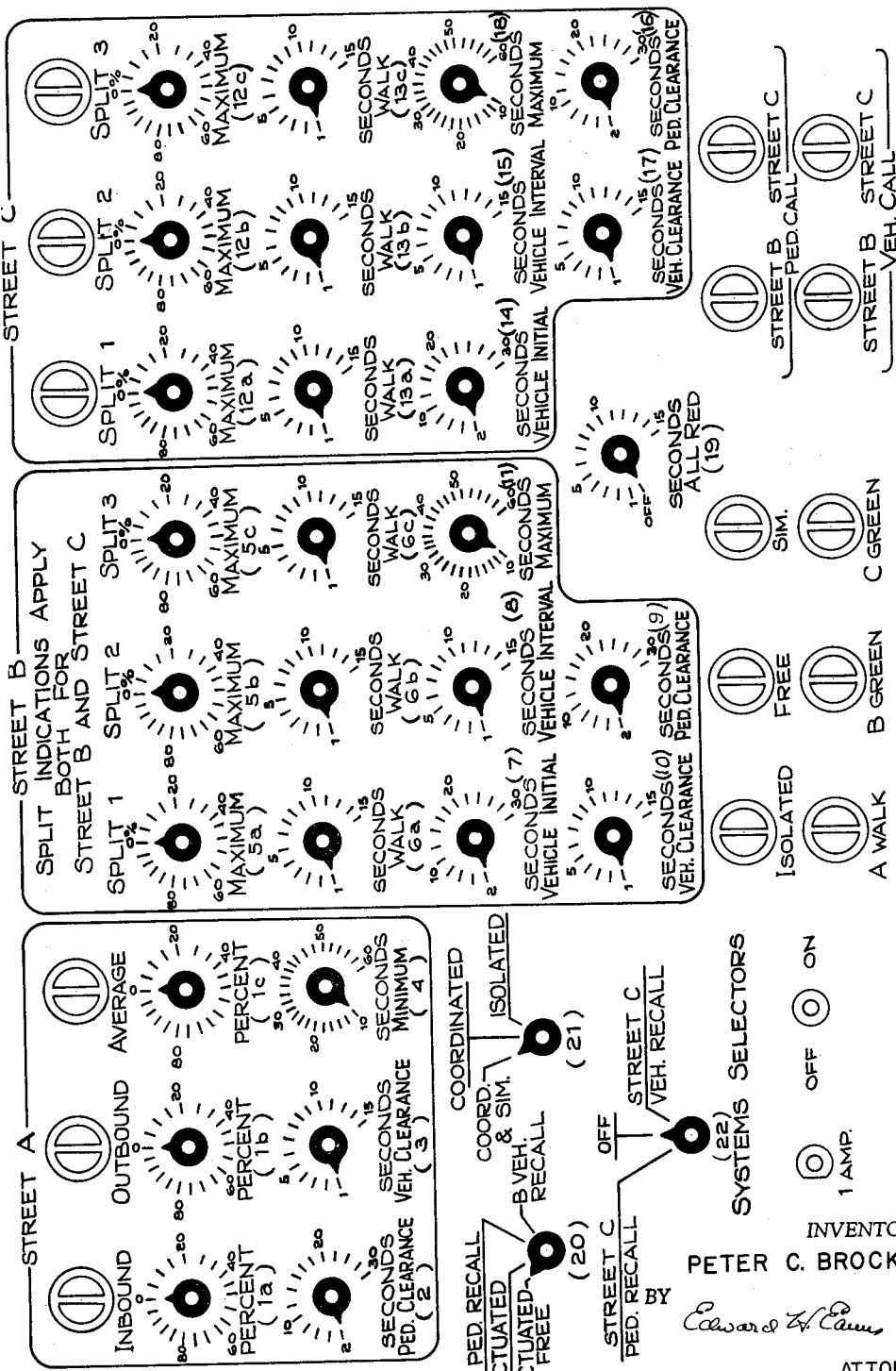

Oct. 2, 1962  P. C. BROCKETT  3,056,946
TRAFFIC ACTUATED CONTROL SYSTEM AND APPARATUS
Filed Feb. 12, 1958  10 Sheets-Sheet 10

(IN ISOLATED OPERATION, CYCLE B, & C MAX. ARE SET IN LOCAL SYNCHRONOUS MOTOR UNIT.)

(MINOR STREET MAXIMUM EXTENSION LIMITS ARE TIMED BEGINNING WITH THE FIRST VEHICLE EXTENSION INTERVAL.)

INVENTOR.
PETER C. BROCKETT
BY Edward W. Evans
ATTORNEY

United States Patent Office 3,056,946
Patented Oct. 2, 1962

3,056,946
TRAFFIC ACTUATED CONTROL SYSTEM
AND APPARATUS
Peter C. Brockett, Milford, Conn., assignor, by mesne assignments, to Laboratory for Electronics, Inc., Boston, Mass., a corporation of Delaware
Filed Feb. 12, 1958, Ser. No. 714,906
16 Claims. (Cl. 340—35)

This invention relates to a traffic actuated control system and to a traffic signal controller for actuation by traffic in a master-local traffic control system in which a number of local controllers, each controlling the usual traffic signal or signals at an individual street intersection, are remotely controlled by a master controller as to some features of a time cycle, for operation of the traffic signal in desired coordinated relationship to permit smooth flow of traffic through the several control led intersections.

The present invention relates more particularly to a greatly improved local controller of the multiphase type for control of more than two traffic phases and adapted to be remotely controlled by a master controller and to be locally controlled by traffic actuation, as by cross traffic on two mutually interfering side streets or cross streets intersecting a main street for example, as well as to a traffic control system of this type.

Various forms of traffic actuated control systems for individual intersections and groups of intersections are already well known in which the traffic signal time cycle is initiated or modified by actuation by the traffic itself, such known systems including a number of master-local traffic control systems in which the time cycle of the local controller is supervised in several ways.

U.S. Patent 2,542,978, issued February 27, 1951, to John L. Barker, assignor to Eastern Industries, Inc., for "Traffic Actuated Control Apparatus," illustrates certain forms of master-local control systems in which the total time cycle of the local traffic signal controller and its "offset" from a reference "zero offset," and consequently its time lag or lead with respect to other local controllers, is remotely controlled by the master controller, with the master controller actuated by traffic at sampling points for varying the time cycle length and selecting among several offsets in accordance with traffic demand, for example. This prior patent also illustrates at least one way in which a traffic actuated local controller may be employed in such a master-local system.

Another prior U.S. Patent 2,100,831, issued November 30, 1937, to said John L. Barker, assignor to said Eastern Industries, Inc., for "Traffic Control System," illustrates one form of traffic actuated control system and controller of the multi-phase type for more than two mutually interfering lanes, as in the case of intersections of three roads or streets for example. As illustrated by said U.S. Patent 2,100,831 such multi-phase systems may normally include all of three traffic phases, such as A, B, and C phases, for example, in the traffic signal control cycle for three respective traffic lanes or streets in sequence in the presence of traffic on all such phases, but may omit or skip any phase in the absence of traffic on that phase, as determined by presence or absence of traffic actuation of traffic detectors associated with the respective traffic phases.

As far as the present local controller or traffic actuated control system is concerned, the master controller may be itself actuated by traffic for varying the time cycle length or offset or division or "split" of the right-of-way signal periods between through traffic and cross traffic or other conflicting traffic flows or intersecting streets, or these features may be changed on program time basis of the master controller or otherwise remotely or by supervisory control, or such variations may be partly by master traffic actuation and partly by program timing, but the control of such variation by traffic actuation is preferred for greater flexibility, and in any event the present invention provides a greatly improved combination of local traffic actuated control of the multi-phase type, local time control and remote time control.

In accordance with one aspect of the invention an improved traffic actuated control system or a local controller of the multi-phase type is provided with a traffic signal time cycle locally adjusted for distribution among several signal periods in desired percentage relation to a variable master control cycle and for desired offset relation thereto, and with at least two out of three traffic signal right-of-way periods controlled by local traffic actuation within limits determined by such master control cycle.

Although the present invention is illustrated in the form of a controller and system for three traffic phases, one being non-actuated locally and the other two being individually traffic actuated locally, as on two side streets or cross streets having traffic actuated devices and intersecting a main street not having traffic actuated devices at this location, this is provided as a preferred illustrative example of such system and it will be understood that by employing the teachings of the invention illustrated to add further steps to the signal cycle and further components and circuitry of the types illustrated, additional traffic phases either of the non-actuated or actuated type may be added to provide multi-phase operation for various combinations of non-actuated and actuated phases and for more than two or more than three traffic phases if desired.

Thus from certain aspects the invention relates to a traffic actuated controller or traffic control system in which individual local controllers of the multi-phase semi-actuated type may have individually adjusted distribution of their time cycle or "split" of signal periods among more than two traffic phases, as establishing limits for the period as initiated or varied in accordance with traffic demand by actuation, or may have several such individual "splits" with selection among such splits by remote control from the master controller, and with the total time cycle of the several local controllers determined and shortened or lengthened together by remote control from the master, while maintaining substantially the same percentage split desired. The invention also is adapted readily to the remote control of the offsets of the time cycles of the several signals controllers, and to a greatly improved method and means of changing offsets.

In its preferred form the traffic actuated controller or control system according to the invention is designed for operation in a master-local control system in which certain of the signal changes in the signal time cycle are controlled or initiated at desired percentage points in the time cycle variably controlled by the master controller or in desired offset relation thereto. Such controller or control system is designed particularly for use in such master-local control system in which the remote control of timing by the master controller is provided by a very gradual progressive phase shift between a reference frequency and a slightly differing control or variable frequency to produce cyclic phase coincidences of the two frequencies at time periods of the order of the desired traffic signal cycle, and by employing coincidence response means such as coincidence gate circuits in the local controller for obtaining the desired percentage control points in the signal cycle. The frequency difference is varied at the master controller as desired to vary the length of the signal time cycle at the local controllers.

A traffic control system of the type employing slow progressive phase shift between two electrical wave energies transmitted to the several local controllers and coincidence response thereto is the subject of a co-pending application S.N. 510,926, filed May 25, 1955, by said John L. Barker and assigned to the assignee of the present application, said co-pending application having since issued on January 20, 1961, as U.S. Patent 2,989,728.

According to one aspect of the prior co-pending application S.N. 510,926, a polyphase constant reference frequency and a polyphase variable frequency are both generated at the master controller, with the variable frequency derived from but having continuous gradual phase shift with respect to the reference frequency at an adjustable time rate, the time required for variable frequency to shift one cycle with respect to the reference frequency corresponding to the desired total traffic signal time cycle for example, the "variable frequency," being variable in the sense that it is adjustable to the desired value of difference from the reference frequency for a desired signal cycle length but it is constant at such adjusted value for such particular length.

The variable and reference frequencies are transmitted from the master controller to the several local controllers and at the latter these frequencies are applied to the stators of individual 360 degree potentiometers, one potentiometer on each polyphase frequency circuit for example. Rotor arms providing adjustable position taps at 180 degree spacing on such potentiometers take off voltages providing two sine wave single phase outputs, one of which shifts its time phase with respect to the other slowly and uniformly at the desired rate of phase shift of the master controller.

These two sine wave voltages, each of single phase, one derived from the reference frequency, and the other from the variable frequency, are applied to pulse forming circuits to derive a sharp narrow pulse at corresponding points on their respective sine waves, such as at zero on the up-slope of the wave, for example, and the two pulses (one gradually and progressively shifting in time phase with respect to the other) are applied to a coincidence gate circuit to derive an output once per signal cycle at a particular point in the cycle as determined by the position of the potentiometer rotors. This coincidence pulse is then employed to operate a relay or other device to operate a particular signal or to switch signals in the signal cycle.

In a preferred arrangement, the coincidence pulse is employed to cause a cyclic stepping switch to advance one step in a cycle of traffic signal indications, the stepping switch connecting one or more other response point potentiometers into the pulse forming and coincidence gate circuits at desired points in its step by step cycle to control certain signal switching or other control function transfer points.

In accordance with a further feature of such phase comparison system of the prior co-pending application S.N. 510,926, a local reference frequency element may be automatically rotated from one remotely selected and locally adjusted phase displaced relation to another such relation in response to change between such remote selections.

The broader aspects of such phase comparison system are disclosed and claimed in the aforesaid co-pending application S.N. 510,926, and some aspects of application of such phase comparison system to a traffic actuated controller of the two phase semi-actuated type are disclosed and claimed in a further co-pending application assigned to the same assignee.

The present application is directed to an improved and much more complex system, applying the several features of the phase comparison system to the control of more than two traffic phases, and to a traffic actuated controller of the multi-phase semi-actuated type having one non-actuated phase and at least two traffic actuated phases, all adapted to be controlled in part with a high degree of flexibility and selectability in such a phase comparison system.

It is an important feature of the present invention to provide a local controller of the multi-phase semi-traffic-actuated type adapted to operate as a local controller in such a master-local system of the phase comparison type, in coordination with other local controllers at other intersections of the same or of other types, such as locally non-actuated controllers or two-phase locally traffic actuated controllers, for example.

In a preferred embodiment of the present invention the coincidence of the pulses from the phase comparison system is employed in combination with traffic actuation to advance a cyclic stepping switch one step (in phase A, for example) in a cycle of traffic signal indications including three traffic phases, the stepping switch connecting other response point potentiometers into the pulse forming and coincidence gate circuits at desired points in its step by step cycle to control certain signal switching or transfer points such as the maximum limit for the traffic actuated extendable right-of-way period of two other phases (phase B and phase C, for example) in the cycle, and consequently to control the "split" or distribution of the signal cycle among three different traffic phases in accordance with the setting of the respective potentiometers, while permitting one or the other of the phases B or C to be skipped or omitted from the cycle in absence of traffic actuation on the respective such phase.

It is an object of the invention to provide a traffic control system or traffic signal controller for more than two mutually interfering traffic lanes or movements with right of way periods individual to at least two of such lanes or movements accorded in response to traffic actuation on the respective lanes or movements, such right of way periods when so accorded being variable between minimum and maximum limits in accordance with traffic actuation and at least such maximum limits being established in desired relation to individual percentage points in a remotely controlled variable time cycle for the several right of way periods.

It is another object of the invention to provide a traffic control system or traffic signal controller for more than two mutually interfering traffic lanes or movements with right of way periods individual to at least two of such lanes or movements accorded in response to traffic actuation on the respective lanes or movements, such right of way periods when so accorded being variable between minimum and maximum limits in accordance with traffic actuation, and at least such maximum limits being established in desired relation to individual percentage points in a remotely controlled variable time cycle for the several right of way periods, and in which a plurality of individual means are provided for alternative adjustment of such maximum limit controlling percentage points, with remote control of selection among such individual adjustment means.

It is a further object of the invention to provide a traffic control system or traffic signal controller including right of way periods for more than two traffic lanes or movements and accorded and variable between minimum and maximum limits in at least two of said lanes or movements in accordance with traffic actuation therein, with individually adjustable percentage settings for the respective maximum limits in a remotely controlled variable time cycle.

It is a further object of the invention to provide a traffic control system or traffic signal controller including right of way periods for more than two traffic lanes or movements and accorded and variable between minimum and maximum limits in at least two of said lanes or movements in accordance with traffic actuation therein, with a plurality of individually adjustable percentage settings for each of a plurality of said respective maximum limits in a remotely controlled variable time cycle, and with remotely controlled selection among said plurality of percentage settings to provide remote selection among locally adjusted alternative distribution of the time cycle in maximum traffic conditions.

It is also an object of the invention to provide an improved traffic control system or traffic signal controller for more than two mutually interfering traffic lanes or movements with right of way periods individual to at least two of such lanes or movements accorded in response to traffic actuation on the respective lanes or movements, and including relay means individual to the respective traffic actuated lanes or movements for including its associated right of way period in the cycle in response to traffic actuation in such lane or movement substantially by the beginning of a preceding traffic clearance period, and for omitting such right of way period and continuing quickly to the next following right of way period following its associated preceding clearance period in absence of such traffic actuation for the first mentioned such right of way period.

It is an additional object of the invention to provide an improved traffic control system or traffic signal controller for more than two mutually interfering traffic lanes or movements with right of way periods individual to at least two of such lanes or movements accorded in response to traffic actuation on the respective lanes or movements, in which the right of way periods are controlled in part in desired percentage relation to a total time cycle of variable length in accordance with the ratio of slow progressive phase shift between remotely controlled periodic electrical wave energies and in response to coincidence of certain of said wave energies.

It is an additional object of the invention to provide an improved traffic control system or traffic signal controller for more than two mutually interfering traffic lanes or movements with right of way periods individual to at least two of such lanes or movements accorded in response to traffic actuation on the respective lanes or movements, in which the right of way periods are controlled in part in desired percentage relation to a total time cycle of variable length in accordance with the rate of slow progressive phase shift between remotely controlled periodic electrical wave energies and in response to coincidences of certain of said wave energies, and in which individual percentage relationships are established for a plurality of said right of way periods in accordance with coincidences of a succession of individual wave energies of individually adjustable phase relation and derived from one remotely controlled wave energy with another remotely controlled wave energy having such slow progressive phase shift in relation to the next preceding wave energy or with a wave energy derived therefrom and in adjustable phase relation thereto.

It is also an object of the invention to provide an improved traffic control system for more than two mutually interfering traffic lanes or movements in which right of way periods, of adjustable minimum periods, are provided for vehicle passage in response to vehicle actuation in the associated traffic lanes or movements respectively and in which right of way periods of longer adjustable minimum periods with associated individually adjustable pedestrian clearance periods, are provided for pedestrian walking, in response to pedestrian actuation in connection with the associated traffic lanes or movements, selection being made among a plurality of such vehicle and associated pedestrian period adjustments by remote control and in desired percentage relation to a remotely controlled variable total time cycle for the several periods.

Other objects of the invention will appear from the accompanying claims and from the following description of the invention with respect to the drawings in which:

FIG. 2 illustrates in somewhat more detailed schematic form a master controller for a control system according to one embodiment of the invention.

FIG. 3 illustrates partly in block diagram and partly in schematic form a local controller or traffic signal controller, with connections to the master controller and extending to other local controllers, for cooperation with the master controller of FIG. 2 for example, according to one embodiment of the invention.

FIGS. 4a through 4e, when arranged side by side as indicated in FIG. 13, illustrate in detailed schematic circuit form a preferred embodiment of a traffic actuated local controller or system for cooperation with a master controller of FIG. 2, for example, and employing several aspects of the invention. The several drawings FIG. 4a, FIG. 4b, FIG. 4c, FIG. 4d, and FIG. 4e thus together form a circuit diagram which is sometimes referred to herein as FIG. 4 for convenience.

FIG. 5, including SUBFIGURES 5a, 5b, and 5c, illustrates sine wave forms and successive stages of pulse forms derived from the reference frequency and the control frequency in connection with spike pulse forming networks for assistance in understanding the operation of a control system or controller according to one embodiment of the invention.

FIG. 6, including SUBFIGURES 6a, 6b, and 6c, illustrate successive time positions of the spike pulses derived from the reference and control frequencies in approaching and passing coincidence in the time cycle.

FIG. 7, including SUBFIGURES 7a, 7b, and 7c, illustrates the pulse forms at coincidence in the selective phase offset homing feature as illustrated in detail in FIG. 4.

FIG. 8, including SUBFIGURES 8a, 8b, and 8c, illustrates the same pulse form as in FIG. 7 but in different time phase relationship, approaching coincidence in one phase direction.

FIG. 9, including SUBFIGURES 9a, 9b, and 9c, illustrates the same pulse forms as in FIG. 7 and in FIG. 8 but in different time phase relation indicating approach to coincidence in a phase direction opposite to FIG. 8.

FIG. 10 is a partly schematic diagram of an illustrative "dial" panel showing adjustment dials, selector switches and indicator lamps for the controller of FIG. 4, for example.

Figure 11:
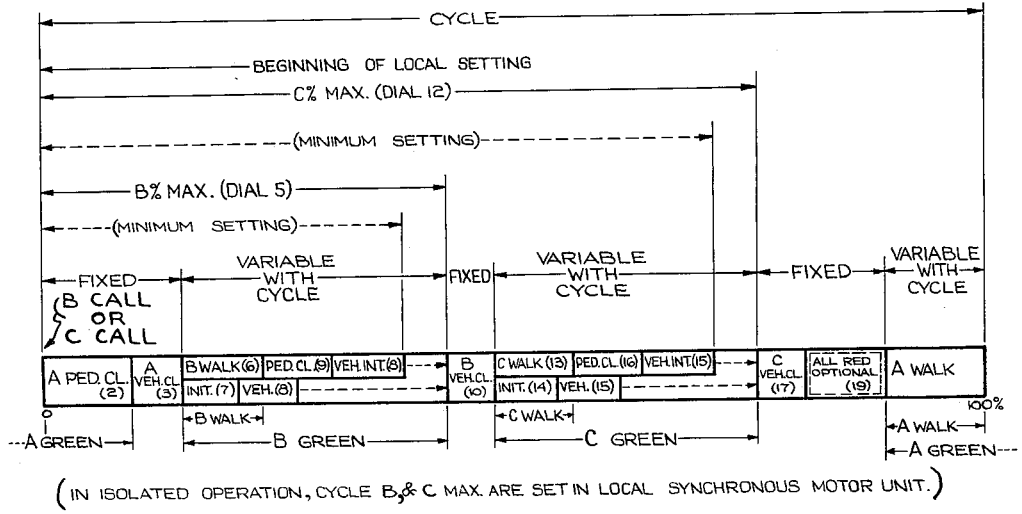

FIG. 11 shows schematically, in block form a sample cycle of operation of the local controller of FIG. 4 in response to traffic actuation under coordinated control, with reference in parenthesis to the dials shown in FIG. 10 above.

Figure 12:
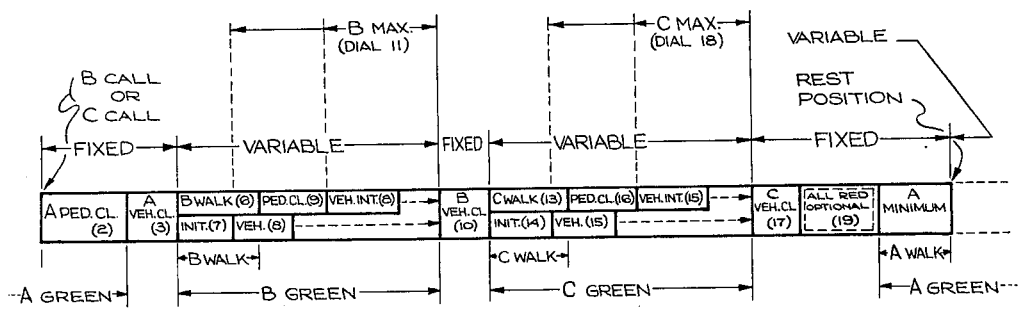

FIG. 12 shows similarly a sample cycle for "free" operation of the same controller in response to traffic actuation when operating independent of coordinated control.

FIG. 13 shows how FIGS. 4a through 4e are to be arranged to form a complete circuit diagram.

In considering the more detailed description below the invention in relation to the several figures of the drawings it will be understood that the timing of any given length of the time cycle, for traffic signal operation, is the period between successive phase coincidences of the two wave energies derived from the master controller which is the important timing factor and consequently the time rate of phase shift of one of these wave energies with respect to the other determines the time cycle as controlled by the master controller. For any given time cycle length this rate of phase shift is constant, or in other words there is a constant frequency difference between the two frequencies of the respective two basic wave energies transmitted from the master controller to the local controllers supervised by the master controller.

If it is desired to change to a longer time cycle for the local controllers, then the frequency difference between the basic wave energies is decreased so that the rate of phase shift of one wave energy with respect to the other is decreased and the period between phase coincidence is thereby increased, to increase the length of the controlled time cycle.

Although such reduction of the frequency differences might be accomplished by increasing the frequency of the lower of the two frequencies and reducing the frequency of the upper of the two frequencies for example, it will be obvious that it is more convenient to keep one of the frequencies constant as a reference and to change only the other frequency, which thus may be considered a variable frequency or control frequency, both the reference frequency and the control frequency being constant for any given time cycle length, but the control frequency being adjustable over a range of desired values to obtain an adjustable time rate of phase shift between the two frequencies and thus an adjustable time period between phase coincidences and corresponding controlled time cycle length.

Thus for convenience of reference in describing the invention one of the frequencies is assumed to be constant and is referred to as the reference frequency or reference periodic wave energy and the other adjustable frequency is referred to as the variable or control frequency or control wave energy or cycle frequency without intending that the invention shall be limited thereby.

For purpose of illustration and without limiting the invention thereto, the following values may be employed for the two basic periodic wave energies transmitted from the master controller to the local controllers. The reference frequency may be 400 cycles per second and the variable or control frequency or cycle frequency may be adjustable from 400+1/40 cycles per second to 400+1/120 cycles per second for a controlled time cycle adjustable between 40 seconds and 120 seconds in length, of the order of those widely used in traffic signals for street and road intersetcions, for example; and for a controlled time cycle of 60 seconds, the reference frequency may be 400 cycles per second and the control frequency 400+1/60 cycles per second or 400.0167 cycles per second approximately, for example.

It will be understood in this connection that the control frequency may be varied between desired difference frequency limits at similar values below the reference frequency if desired instead of above the reference frequency as illustrated in the above example, if it is desired to have the progressive phase shift between the two frequencies in the opposite direction. In the first instance with the reference frequency lower the reference frequency will progressively lag further behind the control frequency between phase coincidences on a time scale, and in the second instance with the reference frequency higher than the control frequency the control frequency will lag progressively further behind the reference frequency between coincidences on a time scale, and either method may be used within the scope of the invention.

Since the progressive phase shift between the reference frequency and the control frequency is relative, where both reference frequency and control frequency are on the same time scale either one may be considered constant in position and the other moving, and thus the lagging shift of one frequency toward the right is the equivalent of the leading shift of the other frequency toward the left. Thus the control frequency may be considered as shifting progressively to the right with the reference frequency stationary on the time scale, or the reference frequency may be considered as shifting progressively to the left with the control frequency stationary on the time scale.

For convenience of illustration the preferred form of the invention is described primarily from the viewpoint that the control frequency is higher than the reference frequency and consequently the reference frequency has a progressive lagging phase shift, or in other words a given point on the reference frequency wave travels slowly to the right with respect to a corresponding point on the control frequency wave, on a left to right time scale.

Figure 1:
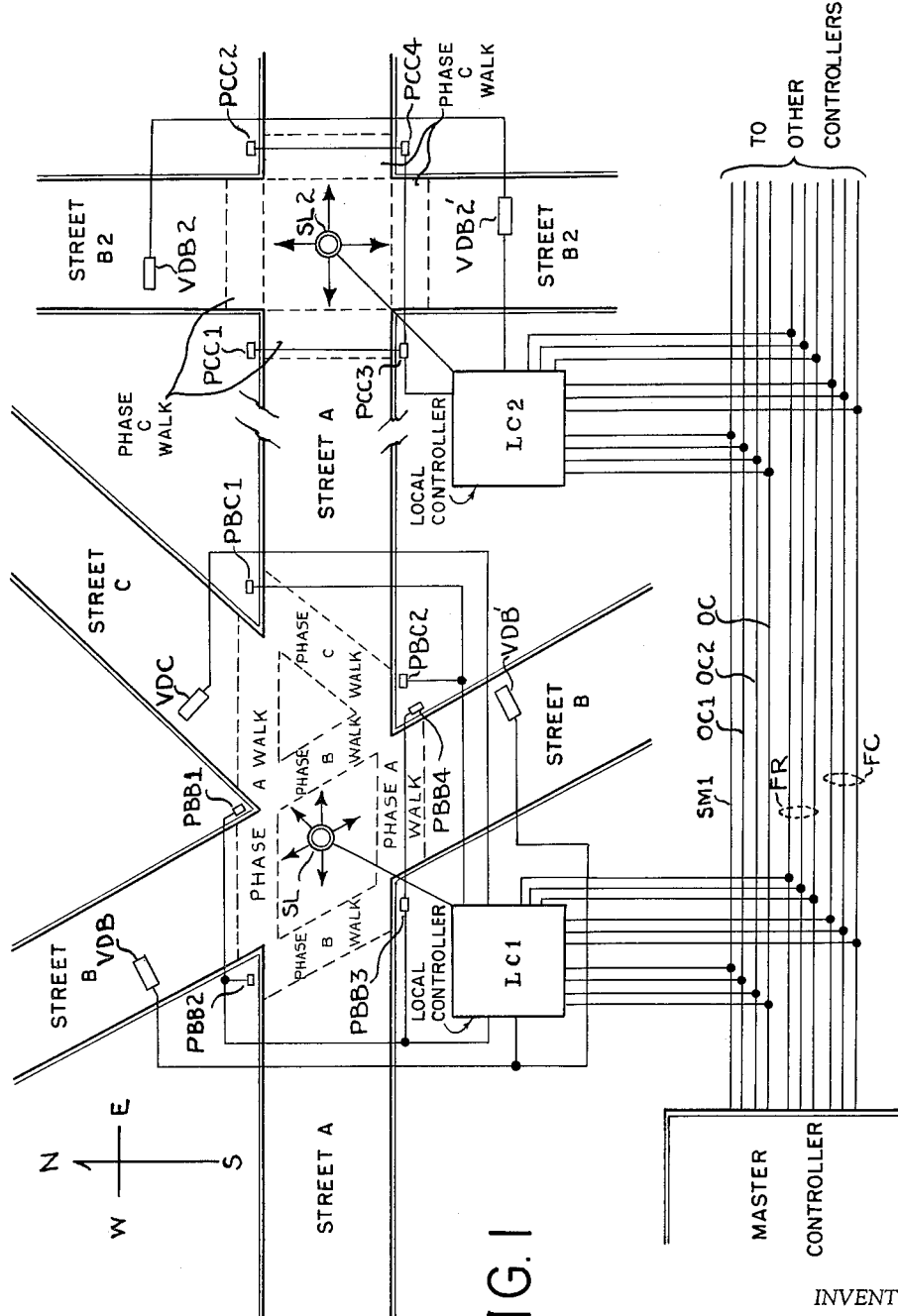
FIG. 1 illustrates in block diagram form two of a series of intersections along a highway with individual local controllers and traffic signals and connections with the master controller illustrated in FIG. 2, for example.

FIG. 1, in block diagram, represents generally, two different types of intersections, each intersection controlled by a local controller, the type of which is presented herein.

In the upper left corner of the diagram is a crossed arrow with N, W, E and S at the end of each line. These indicate compass directions that are used herein for convenience of locating some of the parts of the diagram.

The intersection generally located in the west half of the diagram is made up of three intersecting streets, Street A, Street B and Street C. Traffic at this intersection is controlled by signal lights represented by a double circle with five arrows extending therefrom and labeled SL. The signal lights SL generally represent all the signal lights that may control vehicle traffiic and pedestrian traffic at the intersection. For convenience ail such signal lights that may be employed to control both vehicle traffic and pedestrian traffic in the described instruction are represented collectively in the center of the intersection but it is understood that the signals may be distributed and placed at different locations through out the intersection so that the signals may be conveniently displayed to the traffic the individual signals control.

The signal lights SL are controlled by the local controller LC1, represented by a box marked LOCAL CONTOLLER, LC1, to which the signals lights are connected.

In the west half of Street B at a short distance north of the intersection is a vehicle detector VDB, represented by a rectangle so labeled. In the east half of street B, located a short distance south of the intersection is a vehicle detector VDB' represented by a rectangle so labeled. Both vehicle detectors are connected to the local controller LC1 and send "calls" to the local controller when traffic approaching the intersection on Street B, either from the north or from the south, cause the detectors VDB or VDB' respectively, to be actuated by crossing the same. The vehicle detectors VDB, VDB' are, in FIG. 4c below, collectively represented by a single vehicle detector labeled VDB.

Four rectangles PBB1, PBB2, PBB3, and PBB4 represent four pedestrian pushbuttons that are connected to the local controller LC1 and send "calls" to the local controller when any one or all are actuated by pedestrian traffic. These pedestrian pushbuttons are collectively represented in FIG. 4c below by a single pedestrian pushbutton PBB, the actuation of which calls for a phase B signal sequence that will include a green walk signal in a cycle so that pedestrian traffic may cross Street A in the lanes marked PHASE B WALK without interference from opposing vehicle traffic.

In the west side of Street C is a rectangle VDC which represents a vehicle detector so placed for actuation by traffic approaching the intersection on Street C. The vehicle detector VDC is connected to the local controller LC1 to which calls are sent when the vehicle detector VDC is actuated. The detector VDC is represented in the circuit diagram of the local controller in FIG. 4 by a vehicle detector similarly labeled.

All of the above mentioned vehicle detectors may be any of the well known type of pressure or sound sensitive, electronic or mechanical or magnetic sensitive or any other type whether to be located in the roadbed, upon the roadbed or over the roadbed. However, it is here assumed that the vehicle detectors here mentioned are of the pressure sensitive type that close a set of contacts when pressure is applied to the vehicle detector and that they are located in the roadbed surface so that vehicles will cross over the same in their approach to the intersection.

The rectangles PBC1 and PBC2 on the north and south side of Street A respectively, east of the intersection, represent pedestrian pushbuttons that are connected to the local controller LC1 and send "calls" to the local controller for a signal sequence that will include a green walk signal in a cycle so that pedestrian traffic may cross Street A in the lane where marked "PHASE C WALK" without interference from opposing vehicle traffic. In FIG. 4c below, the pedestrian pushbuttons PBC1 and PBC2 of FIG. 1, are collectively represented by the pedestrian pushbutton PBC.

All the pedestrian pushbuttons above mentioned may be any of the well known mechanical, electrical or electronic type generally used to send calls to a local controller of a controlled intersection or other controlled area and generally placed in a convenient place for pedestrian actuations.

In the lower left of the drawing is an incompleted box marked MASTER CONTROLLER which here represents a master controller of the type disclosed in more detail in FIG. 2 below. Extending from the master controller are three groups of lines representing in general, the output lines of the master controller. The upper group of four lines SM1, OC1, OC2, and OC represent lines that are similarly labeled appearing in FIG. 2 and FIG. 4b below.

The middle group labeled FR and the lower group labeled FC represent the three reference frequency lines (FR) and the three control frequency lines (FC) which groups of lines also appear in FIGS. 2, 3 and 4 similarly labeled.

These three groups of lines will generally be extended to other local controller in one coordinated system such as is indicated here by the notation at the right end of the lines, "TO OTHER CONTROLLERS." Vertical lines between these output lines and the local controller LC1 represent the electrical connection between the local controller and the master controller. To the right of the intersection above described is a second intersection composed of intersecting Streets A and B2. This intersection is controlled by signal lights collectively represented by a double circle with four protruding arrows, located in the center of the intersection and labeled SL2. As in the case of the signal lights SL, the representation SL2 represents all the signal lights for both vehicle and pedestrian traffic used to control such traffic at the intersection. The signal lights SL2, although illustrated collectively in the center of the intersection may be deployed around the intersection for more convenient display to the traffic controlled by the individual signals. The signal lights SL2 are connected to the local controller labeled LC2, represented by a rectangle labeled "LOCAL CONTROLLER" LC2.

The local controller LC2 is connected to the output lines from the master controller in a manner similar to that of local controller LC1.

In the west half of Street B2, north of the intersection is a rectangle VDB2 which represents a pressure sensitive vehicle detector located in the surface of the roadbed while the rectangle VDB2', in the east half of Street B2, south of the intersection represents a similar type vehicle detector located in the surface of the roadbed of Street B2. Both vehicle detectors VDB2 and VDB2' are connected to the local controller LC2 and send "calls" to the controller LC2 when either is actuated by southbound and northbound traffic respectively, approaching the intersection.

On the four corners of the intersection of Streets A and B2 each represented by rectangle are four pedestrian pushbuttons PCC1, PCC2, PCC3 and PCC4 all connected to the local controller LC2. These pedestrian pushbuttons, that may be of a similar type as those associated with the intersection on the left of the diagram, when actuated by pedestrian traffic send calls to the local controller LC2 to give a green pedestrian signal so that pedestrian traffic may cross the Streets A and B2 in the walk path marked off by broken lines at the intersection and lebeled PHASE C WALK.

It will be noticed that the intersection in the left of the diagram differs somewhat from the intersection in the right of the diagram in that the intersection in the left is composed of three intersecting roads, Streets A, B and C while the intersection on the right is composed of two intersecting roads, Streets A and B2.

Both local controllers LC1 and LC2 are identical and both are of the same type disclosed in circuit form in FIG. 4 below. FIG. 1 from one aspect, illustrates some of the versatilities of such local controller, for in the intersection at the left the controller LC1 would control both vehicle and pedestrian traffic both associated with each phase while the controller LC2 would control vehicle and pedestrian traffic with vehicle traffic associated with phase A and phase B and pedestrian traffic associated only with phase C, for example.

Although both local controllers LC1 and LC2 are identical and each is similar to the local controller illustrated in FIG. 4 the connections to the signal lights as between controller LC1 and controller LC2 will differ.

The controller LC1 may generally display a green signal followed by a yellow signal to both pedestrian and vehicle traffic on Street A while on both Street B and C red signals are displayed to vehicle and pedestrian traffic. This may be followed by a green signal followed by a yellow signal to both pedestrian and vehicle traffic on Street B while on Street C and A red signals are displayed to vehicle and pedestrian traffic. A green signal followed by a yellow signal may then be displayed on Street C for vehicle and pedestrian traffic while on Street A and B red signals are displayed.

The controller LC2, on the other hand, may generally display a green signal followed by a yellow signal to vehicle traffic on Street A and red signals to vehicle traffic on Street B2 and all pedestrian traffic at the intersection. This may be followed by a green signal followed by a yellow signal for vehicle traffic on Street B2 while red signals are displayed to vehicle traffic on Street A and all pedestrian traffic at the intersection. A green signal may now follow for all pedestrian traffic while red signals are displayed to all vehicle traffic on Street A and Street B2 so that the pedestrian traffic may enjoy an exclusive walk period while all vehicle traffic is held stopped.

Referring to FIG. 2 in more detail, the three windings of an alternating current three phase generator are shown schematically at the left and designed FRG as a group, to indicate that this is the generator of the three phase alternating current reference frequency provided on the lines FR extending to the right and corresponding with the similarly designated lines of FIGS. 1, 3 and 4. These lines extend to the right of FIG. 2 for connection to the local controllers.

Below the lines FR there is shown schematically the differential generator within the broken line box DG, and the lines FC extending outward to the right. For convenience in explaining the invention in connection with FIG. 2, the parenthetical designation $(fc=fr+df)$ is noted along side of FC. This is intended as a reminder that the control frequency output on the lines FC is the sum of the reference and the difference frequency corresponding to the rate of phase shift provided in the differential generator.

It will be understood that the usual 120 degree spaced three phase windings 20, 21 and 22 at the left of the differential generator DG as shown in FIG. 2 will have a rotating field, and for purpose of illustration this is assumed to be the stator set of windings. The windings to the right with the associated three curved arrows are also 120 degree spaced windings forming the rotor of the differential generator for example. The lines FC extend from these latter rotor windings 23, 24 and 25 toward the right and correspond with the lines designated FC in several of the other figures of the drawings.

A variable speed motor VSM is shown schematically below the rotor windings of the differential generator and is indicated as mechanically associated therewith to drive the rotor by the broken line 26. The motor VSM is illustrated as connected via wires 27 and 28, and the variable speed control SV, to positive and negative electrical power terminals indicated. The speed control SV is illustrated as a potentiometer adjustable for controlling the voltage or power applied to the motor VSM to vary the speed of the latter as desired to obtain the frequency difference of between the reference frequency and the variable control frequency.

It will be understood that the motor VSM has a low speed output, provided by gearing or otherwise as desired, to rotate the rotor windings 23, 24 and 25 at speeds of the order of one revolution in 40 seconds to one revolution in 120 seconds to derive a time cycle of the order of 40 seconds to 120 seconds for example as described above, one revolution of the motor output shaft being equal to one time cycle of the system. It will be understood by those skilled in the art that when the three phase rotor windings are rotated with respect to the three phase stator windings of the differential generator DG the output frequency from the rotor windings for example will have a phase shift with respect to the input at the stator windings which progresses at a time rate depending upon the rate of rotation of the rotor. In effect the turning of the rotor in the direction of the rotation of the field at the three phase stator windings will provide a slightly lower output frequency in relation to the input frequency which may be expressed $FC=FR-DF$ for example, whereas if the rotor windings are turned in the direction opposite to the rotating field of the stator windings the output will have a slightly increased frequency which may be represented by the expression $FC=FR+DF$ for example. For convenience in describing the invention it is assumed that the rotor windings always are turned in the same direction but at varying time rates to provide a variable time cycle for remote control purposes as described above.

In connection with the offset control lines in the lower part of FIG. 2, it will be noted that the switches SW1 and SW2 are connected at their left ends to the positive power terminal for example and are shown in a normally open position. The switch arm of either switch may be moved into its closed position independently to apply positive power to its associated line, the switch SW1 controlling line OC1 and the switch SW2 controlling line OC2, the remaining line OC being connected as a common line to the negative power terminal. It will be understood that the power terminals designated plus and minus are merely for convenience of identification and may be direct current or alternating current power as desired. The line OC1 alone may be energized by the closing of switch SW1 and the line OC2 may alone be energized by closing switch SW2 or both lines OC1 and OC2 may be energized by the closing of both switches. The switches SW1 and SW2 may be manually operated as desired by the traffic authorities at the master controller location or may be operated automatically in the form of relay contacts from time switches or from an automatic offset selector system.

A third switch SW3 is also provided in FIG. 2, and shown in open position but which may be closed if desired to connect positive power via wire 29 through the switch to line SM1 extending to the local controllers, for remote selection between percentage potentiometers associated with the lines FR, which may serve for remote control of the offset of a traffic signal cycle for example.

FIG. 3 illustrates, partly in block form and partly in schematic form a simplified form of local controller associated with reference frequency lines, FR, and variable frequency lines, FC, extending from the master controller of FIG. 2 to the several local controllers. The reference frequency lines FR starting at the left of FIG. 3 may be considered extensions of the lines FR at the right of FIG. 2 and continue to the right across FIG. 3 for connection to other local controllers as desired.

Similarly, the variable frequency or control lines, FC, of FIG. 3 may be considered extensions of the lines FC of FIG. 2.

At the left side of FIG. 3 a group of three lines FR1, FR2 and FR3, extend downward from the lines FR to supply the three phase reference frequency to three tapping points 120 degrees apart on the 360 degree continuous resistance forming the circular stator element of a 360 degree potentiometer PA1, dividing this stator element into three equal sections S1, S2 and S3. These three sections with their tapped connections to the three phase reference lines thus have a delta connected three phase arrangement, as it is familiarly known in the electrical art, but with each section of the delta one third of the resistance of the circle.

The potentiometer PA1 is provided with a two part diametric rotor having two contacts insulated from each other and movable jointly over the circular stator to any diametrically opposite contact positions, the contacts always being 180 degrees apart. The left hand arm RA1, as shown, is connected to an outer control contact ring and the right arm RA2 of the rotor is connected to an inner control contact ring. These rings are in turn connected respectively by familiar contact brush arrangements via wires W1 and W2 to the input winding of isolating transformer T2, the output winding of which is connected to the input of a spike pulse forming network PF2.

Since the rotor arms RA1 and RA2 of the potentiometer PA1 provide movable taps 180 degrees apart on the delta three phase connected stator, these rotor arms will take off a single phase sine wave voltage from the three phase reference voltage on the stator, this single phase voltage being at the reference frequency and having a phase rotation to the latter depending on the position of the rotor contacts RA1 and RA2. Thus by turning the rotor to the desired angular position, the desired phase displacement of the voltage output from the rotor can be obtained with respect to the original three phase reference frequency applied to the stator.

It will be noted in FIG. 3 that the rotor RA1—RA2 is shown as slightly displaced clockwise from a position extending from the tap between sections S3 and S2 of the stator, to the opposite section S1 of the stator, as one illustration. A dial plate-knob arrangement, illustrated in FIG. 10, may be associated with the rotor RA1—RA2 to indicate the angle of phase displacement or percentage displacement on the basis of 100 percent for 360 degrees of arm RA2 with respect to the tap center point as zero displacement for example.

The single phase sine wave voltage, displaced from the reference frequency by the desired amount by potentiometer PA1, is thus applied via transformer T2 to the input at the top of the pulse forming network PF2. This network is identified as a spike pulse forming network in its preferred form, of which one embodiment is shown and described in more detail in connection with FIG. 4d. This spike pulse forming network derives a narrow spike pulse at a particular point on the sine wave voltage applied to its input, this point being chosen for convenience as the wave becomes positive just beyond zero. For convenience of reference this is considered as substantially as the wave passes zero increasing toward the positive peak. It will be appreciated that some other reference point might be selected within the spirit of the invention, but this point is employed in the preferred form of the invention.

The spike pulse output of network PF2 is applied to one of the two inputs to the coincidence gate CG1.

On the right of FIG. 3 is shown another potentiometer PA2, which is similar to the potentiometer PA1 described above and has adjustable rotors set in different desired phase displaced relation as indicated, for example, to determine the desired percentage response point in the total time cycle controlled by the master controller via the reference frequency and variable frequency lines FR and FC.

The stator of the potentiometer PA2 is connected in delta arrangement to the three phase variable frequency lines FC by the downward extending branch wires FC1, FC2 and FC3 these wires being connected to corresponding tapping points as potentiometer PA1, described above.

The potentiometer PA2, like the potentiometer PA1, has a rotor with one contact arm, RB2, connected to the inner ring and another contact arm, RB1, connected to the outer ring, the arm RB1 connected to the inner ring is considered to be the phase displacement indicator.

The potentiometer PA1 is comparable to potentiometer PA5 in FIG. 4b below and potentiometer PA2 is comparable to potentiometers PB1, PB2, PB3, PC1, PC2 and/or PC3 and/or resistor network PA, which obtains similar results as the potentiometers but is not readily adjusable.

Figure 4A:
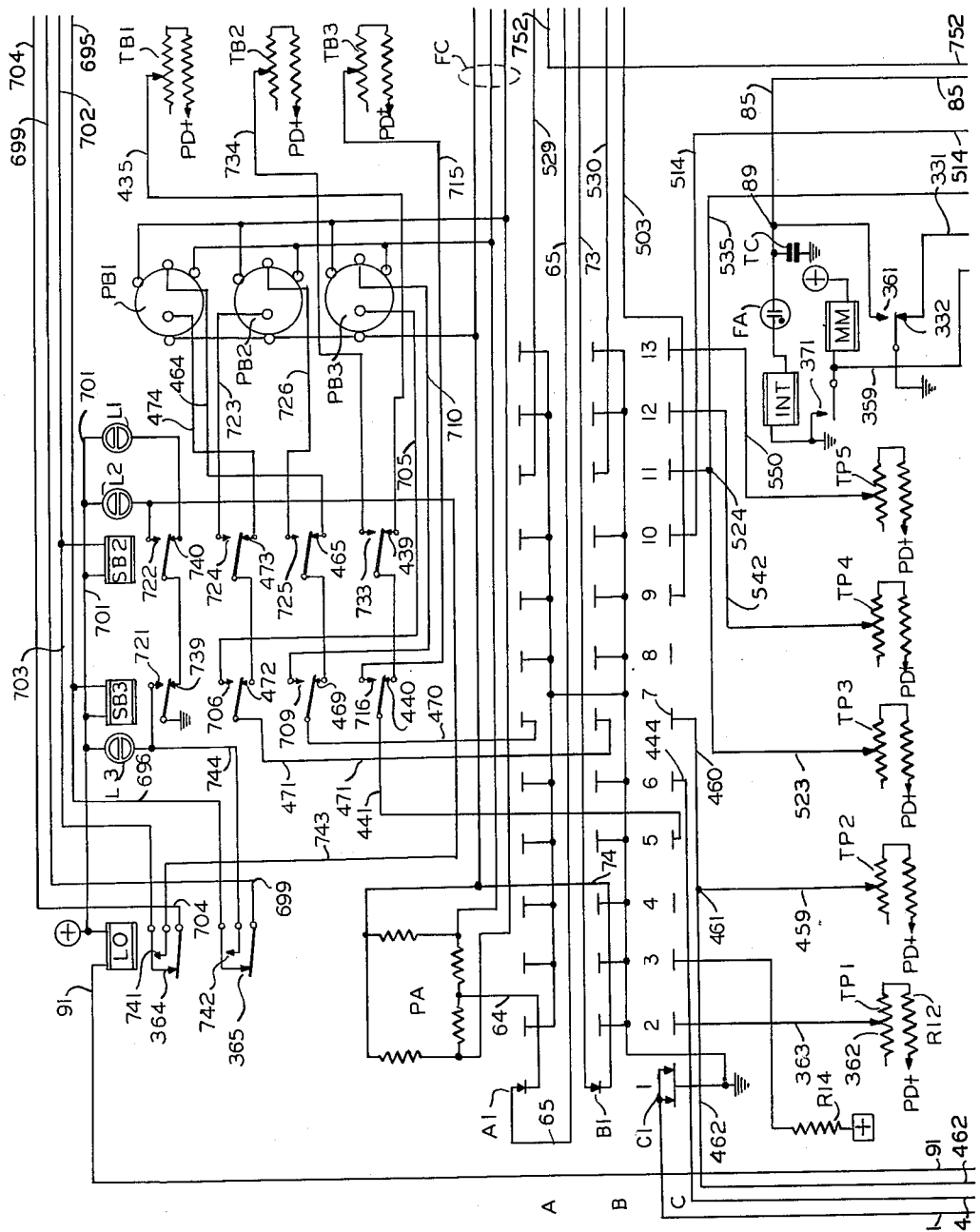
Figure 4B:
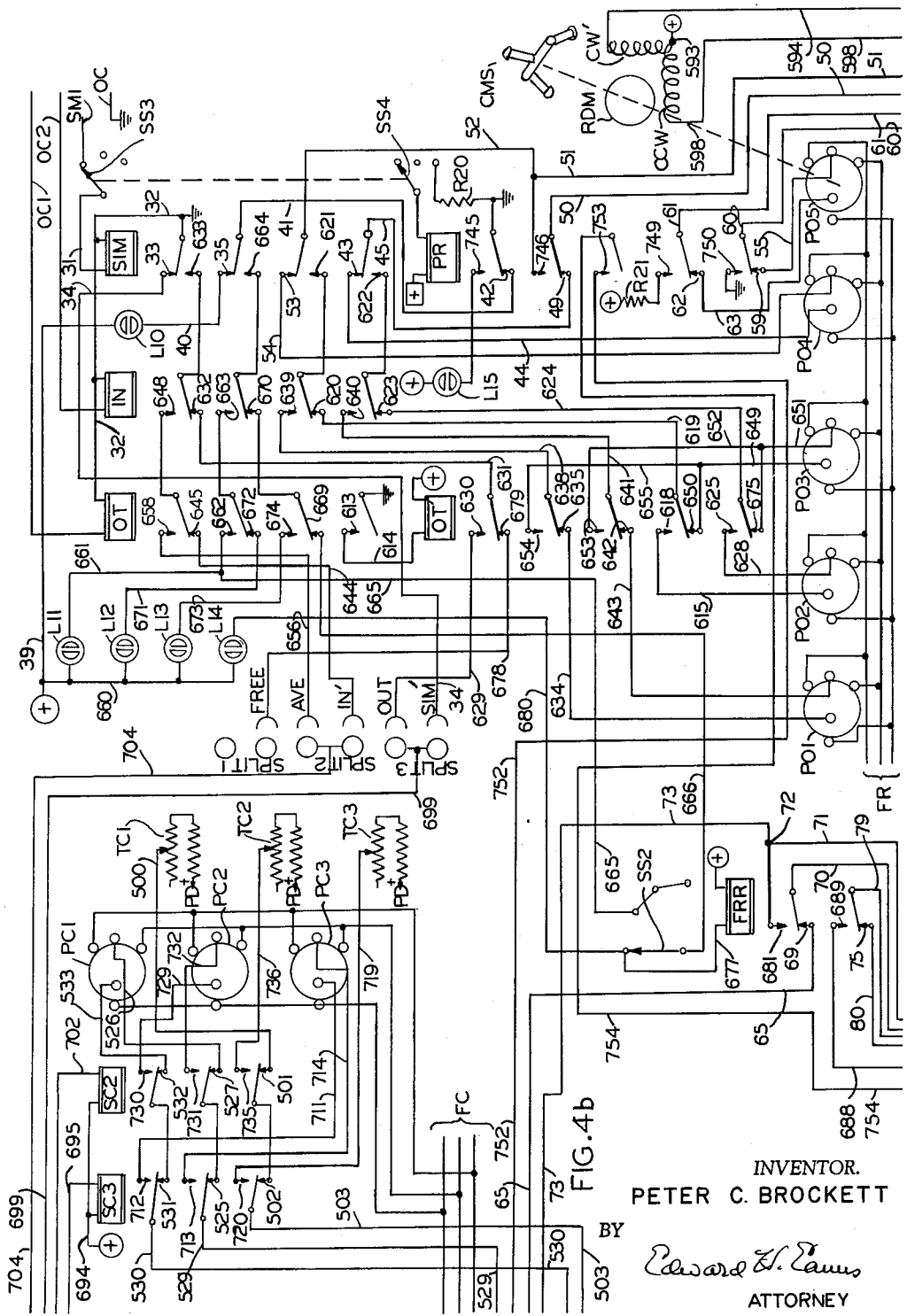
Figure 4D:
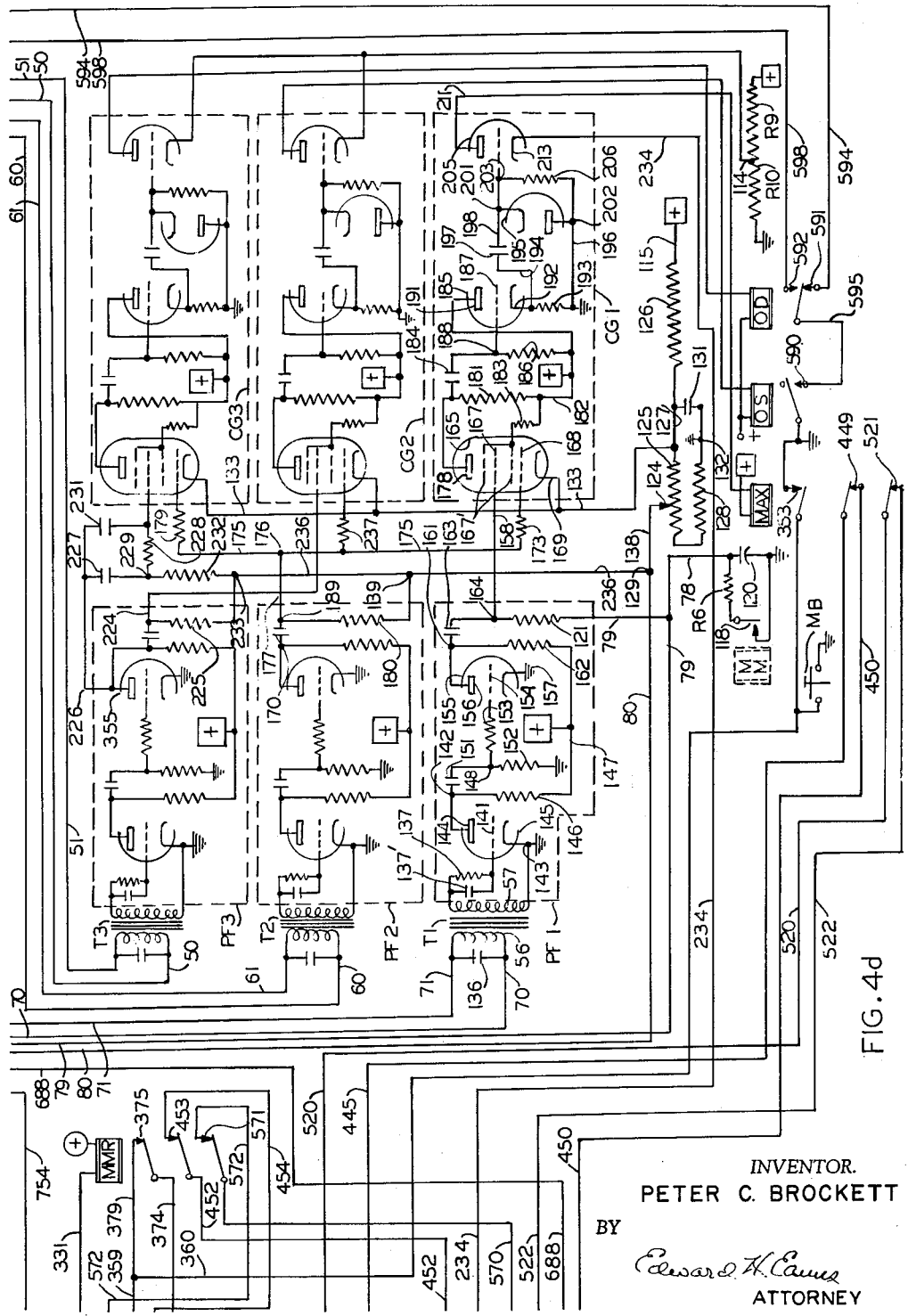

The transformers T1 and T2 are comparable to similarly numbered transformers in FIG. 4d, similarly numbered for convenience. The pulse forming networks PF1 and PF2 are comparable to similarly numbered pulse forming networks in FIG. 4d while the coincidence gate CG1 represents a similarly numbered coincidence gate CG1 in FIG. 4d.

The box labeled control device may be considered to be the remaining parts of the local controllers illustrated completely in FIG. 4. Such control device may include means for advancing a step by step cyclic switch, the cyclic switch itself and relay control circuits to control signal lights all as described with reference to FIG. 4 below.

Referring now to FIGS. 5 through 9, a series of pulse forms are illustrated in relation to time scales to aid better understanding of the invention.

FIG. 5, for example illustrates successive stages in the formation of spike pulses from the control and reference voltages or wave energies, one of which is slowly shifting in phase at the desired time rate in relation to the other. For convenience in understanding the invention in relation to the several figures of the drawings it is assumed that the reference frequency is slightly lower than the variable or control frequency so that the reference frequency will slowly shift to the right on the time scale if the control frequency wave is considered stationary with respect to the time scale.

Thus referring momentarily back to FIG. 3 the reference frequency at the phase offset determined by potentiometer PA1 may be considered as shifting in phase clockwise or proceeding clockwise around the potentiometer PA2 associated with the variable or control frequency, with the rotors of these potentiometers preset by local adjustment, thus a given point on the reference wave output of the rotor of PA1 in FIG. 3 may be considered as proceeding clockwise around the stators of the potentiometer PA2 and successively passing the rotor arms RB1 and RB2 in the time cycle periodically repeated.

Correspondingly in FIG. 5 the reference frequency Vr indicated by a solid line wave in SUBFIGURE 5a may be considered as progressing toward the right on the time line indicated as t, this progression to the right being indicated by a small arrow extending from the wave Vr.

Reviewing this more fully SUBFIGURE 5a illustrates one cycle of the adjustably phase displaced voltage derived from the reference frequency and of the adjustably phase displaced voltage derived from the variable or control frequency superimposed on the same scale, although it will be appreciated that these two voltages are actually applied to two different channels of pulse forming networks and input circuits to the coincidence gate. Thus although these two voltage waves are shown in SUBFIGURE 5a as superimposed on the same time scale for convenience of comparison, they are not to be considered as additive algebraically since they are in independent circuits applied to individual pulse forming networks.

Similarly the pulses below in SUBFIGURES 5b and 5c, derived in two stages respectively from the sine voltage waves of 5a are also shown superimposed for comparison purposes in the drawings only, since these are also actually in independent circuits or separate channels. In order to distinguish the pulses more clearly, particularly in the overlapped form in SUBFIGURE 5b, one of the voltage waves and the corresponding pulse below derived from the reference frequency are shown in solid line form, and the other set derived from the control frequency are shown in broken line form.

It will be understood that in SUBFIGURE 5a for simplification of illustration, only one cycle of the wave Vr and only one cycle of the wave Vc are shown, although it will be appreciated that each is only one of a series of similar waves extending in each direction on the left to right time scale. Thus if the reference and control frequencies are of the order of 400 cycles per second for example the one cycle wave illustrated will each have a time length of approximately $\frac{1}{400}$ of a second.

In the several figures of FIG. 5 the wave Vc derived from the variable or control frequency is assumed to remain in a fixed position on the left to right time scale t, and the wave Vr derived from the reference frequency is assumed to be moving slowly to the right, that is to have a slow progressive phase shift toward the right.

In the illustration of SUBFIGURE 5a the wave Vr is illustrated as about 60 degrees or $\frac{1}{6}$ of the total cycle before coincidence in the wave Vc and approaching coincidence.

It will be understood that the wave Vr of SUBFIGURE 5a may be considered to be derived or represent substantially the output from the rotor of potentiometer PA1 of FIG. 3 for example, and thus have a desired constant but adjustably pre-set phase displacement with respect to the reference frequency on lines FR. As more fully described below with reference to FIG. 4 if the wave Vr were slightly displaced in phase corresponding to the difference in position of the rotors of the potentiometer PO5 of FIG. 4b and potentiometer PA1 of FIG. 3 this wave Vr could be considered to represent the output of the rotor of potentiometer PA1 of FIG. 3.

Similarly in SUBFIGURE 5a the voltage wave Vc may be considered to represent the output of the rotor of the potentiometer PB1 of FIG. 4a, for example having a constant but adjusted preset phase displacement with respect to the variable or control frequency on lines FC, although with slightly shifted but preset position along the time scale; the wave Vc might also represent the output for the resistor network PA of FIG. 4a or the output from the rotor of the potentiometer PC1 of FIG. 4a for example.

Thus the wave Vr represents what may be considered a locally derived reference voltage wave energy having a preferably locally adjusted (but possibly permanently set, if desired), phase relation to the reference frequency wave energy from the master controller, and the voltage wave Vc represents similarly a locally derived wave energy having a preferably locally adjusted (but possibly permanently set) phase relation to the control frequency wave energy from the master controller.

For the present, for a better understanding of the invention with relation to FIG. 3 for example, let it be assumed that the voltage Vr represents the output from the rotor of potentiometer PA1 and the voltage wave Vc represents the output of the rotor of the potentiometer PA2 of FIG. 3 in the immediately following discussion. The voltage wave Vr is shifting to the right on the time scale approaching coincidence with wave Vc, and if a total time cycle of 60 seconds were assumed, the wave Vr is approximately of $\frac{1}{6}$ of the cycle or 10 seconds before coincidence with the wave Vc. Thus these two waves represent substantially the wave forms and their relative wave positions as applied to the respective spike pulse forming networks leading to the coincidence gate CG1, the wave Vr being applied to transformer T2 to the input of the pulse former PF2 and the wave Vc being applied via transformer T1 to the pulse former PF1.

These spike pulse forming networks have two stages, as more particularly described in connection with FIG. 4d, leading to a narrow spike pulse output as illustrated in SUBFIGURE 5c, the SUBFIGURE 5b indicating an intermediate stage at which a substantially square wave pulse is formed, from which the spike pulse of SUB-FIGURE 5c is derived at the leading edge of the square wave pulse. As shown in SUBFIGURE 5b, the respective spike pulse forming networks PF2 and PF1, by use of limiter circuits, for example, derive the substantially square wave pulse Vrs from the upper or positive half of the wave Vr of SUBFIGURE 5a and the broken line substantially square wave pulse Vcs from the upper or positive half of the wave Vc of SUBFIGURE 5a, these two square pulses having the same phase relation as their associated waves shown in SUBFIGURE 5a, with the square wave pulse Vrs shifting slowly toward the right on the time scale toward coincidence with pulse Vcs.

At a further stage in the pulse forming networks the very narrow spike pulses illustrated in SUBFIGURE 5c are derived from the corresponding square wave pulses of SUBFIGURE 5b above, this being accomplished by differentiating circuits for example.

Thus the spike pulse Pr of SUBFIGURE 5c is derived from the front edge of the square pulse Vrs above, and the broken line spike pulse Pc is derived correspondingly from the square pulse Vcs above. These pulses appear on the upper or positive side of the time scale. Smaller pulses are illustrated below the time scale as Prn and Pcn as the corresponding negative pulses derived from the right hand or trailing edge of the respective square pulses Vrs and Vcs above.

Although these latter negative pulses appear in the output of the pulse forming network and thus at the input of the coincidence gate CG1, the coincidence gate is designed to respond only to the positive pulses indicated above, such as Pr and Pc and does not respond to the negative pulses Prn and Pcn as described more fully in connection with the detailed description of FIG. 4. Thus for practical purposes it may be considered that the distinctive outputs of the respective pulse forming networks are pulses Pr and Pc.

It will be understood that in the several FIGURES 5, 6, 7, 8 and 9 the spike pulses are for convenience of illustration in the drawing shown considerably wider than they actually would be in practice. In a preferred actual embodiment of the invention, for example, it has been found that spike pulse widths may be employed of the order of $\frac{1}{200}$ of one cycle of the wave itself whose period might be of the order of $\frac{1}{400}$ of a second so that the spike pulse shown in FIG. 5c might actually be of the order of $\frac{1}{80000}$ of a second.

FIG. 6 illustrates several successive time positions of the spike pulses of SUBFIGURE 5c in proceeding from the approximate position of FIG. 5c to and beyond coincidence. SUBFIGURE 6a shows the spike pulses Pr and Pc on separated but corresponding time scales one above the other, representing the two pulse output channels PF1 and PF2 for example, in the positions of the corresponding pulses in SUBFIGURE 5c. SUBFIGURE 6b illustrates the same pulses a short time later at coincidence, the pulse Pr having moved somewhat to the right in the time scale. SUBFIGURE 6c illustrates the same two pulses Pr and Pc on corresponding time scales a short time after coincidence, the pulse Pr continuing to move further to the right beyond coincidence.

The relative positions of the spike pulses from pulse formers PF2 and PF3 and the square pulse from pulse former PF3, under the several conditions above assumed in connection with changes of offset selection, are shown in FIGS. 7, 8 and 9 in which the several pulses are shown in similar time scales one above the other.

FIG. 7 illustrates the condition of coincidence of the positive spike pulses with the beginning of the positive square wave pulse, which is the condition of rest for the motor RDM, with the rotor of the potentiometer PO5 also at rest in the home position corresponding to one of the selected offsets of the potentiometers PO1, PO2, PO3 or PO4. In FIG. 7 the substantially squire pulse Vr11 illustrated in SUBFIGURE 7a represents the positive square output pulse from pulse former PF3 at wire 226 for example which is applied to the upper control grid input of the coincidence gate CG3, as previously described. The spike pulse Pr11 shown in SUBFIGURE 7b above the line represents the positive spike pulse output of the pulse former PF3 on line 224 for example which is applied to the upper control grid of the coincidence gate CG2 at the input side of the latter.

The pulse Pr11 is shown directly under the beginning of the positive square wave pulse Vr11, a relation which is always maintained on the time scales. The negative pulse Pr11n shown below the line in SUBFIGURE 7b corresponds with the right hand end of the square pulse Vr11, and since the coincidence gate responses only to the positive pulses this negative pulse is neglected.

In SUBFIGURE 7c the positive pulse Pr above line is shown in the same position as in the pulse Pr11 above it, and the pulse Prn below the line is the corresponding negative pulse which is neglected since it does not influence the coincidence gate circuit. The pulse Pr in SUBFIGURE 7c corresponds with the pulse Pr indicated in FIGS. 5 and 6 above, in the sense that these pulses are all derived from the reference frequency as locally determined in desired phase relation to such reference frequency, and in the case of FIG. 4d for example the pulse Pr of FIG. 7 represents the spike pulse output of pulse former PF2 on lines 177 and 175 applied to the lower control grids of the inputs of the several coincidence gate circuits CG1, CG2 and CG3, and derived from the sine wave output from the rotor of the potentiometer PO5. In the stable condition assumed in FIG. 4d with the rotor of potentiometer PO5 in the offset position corresponding to the output from the potentiometer PO4, these pulses will be in coincidence as shown in FIG. 7.

In FIG. 8 it is assumed that a change of selection of offset has been made by the master controller to which the homing operation of the rotor of PO5 has not had time to fully respond. FIG. 8 illustrates the condition in which the newly selected offset, represented by the pulses Vr12 and Pr12, is to the left on the time scale with respect to the position of the rotor of potentiometer PO4 resulting from the previous offset, represented by the pulse Pr. This is a condition in which the pulse Pr must move to the left as indicated by the small arrow associated with it in SUBFIGURE 8c toward coincidence with the pulse Pr12 above, and consequentially illustrates the counter clockwise rotation of the rotor of potentiometer PO5 by the operation of the winding CCW, by the combination of relay contact 590 being closed and relay contact 592 being closed, and this consequently represents the condition of relay OS being released and relay OD being energized as previously described above. It will be noted in this connection that the pulse Pr falls within the period or phase position of the positive half of the square wave represented by Vr12 above, the spike pulse Pr being from the output of the pulse former PF2 and the spike pulse Pr12 and corresponding square pulse Vr12 being from the output of the pulse former PF3.

The counter clockwise drive and corresponding movement to the left of the pulse Pr illustrated in FIG. 8 will continue until pulse Pr coincides in position with the pulse Pr12, at which coincidence the drive of the motor RDM will be stopped and the rotor of potentiometer PO5 will stop in its new position because of the coincidence of pulses and consequent operation of relay OS by coincidence gate CG2.

The condition illustrated in FIG. 9 is another assumed condition opposite to that of FIG. 8. This condition illustrated in FIG. 9 represents a relation of the pulse outputs of the pulse formers PF2 and PF3 derived from the output of the potentiometer PO5 and of the selected offset from one of the potentiometers PO1, PO2, PO3 or PO4, where the newly selected offset is to the right an the time scale with respect to the old one, or in a clockwise position with relation to the old position of the rotor of potentiometer PO5, so that the pulse P$r$ must move to the right and the rotor of PO5 must be rotated in a clockwise direction to coincide with the newly selected offset position. This is the condition described above in connection with FIG. 4$d$ in which the relay contact 590 is closed and the relay contact 591 is closed with both relays OS and OD released, to cause energization of the winding CW' for clockwise rotation of the rotor of potentiometer PO5 toward coincidence with its new home position.

It will be noted in FIG. 9 that the square pulse V$r$13 in SUBFIGURE 9$a$ and the spike pulse P$r$13 below it are in the same relation to each other but both of these pulses are to the right of pulse P$r$ shown in SUBFIGURE 9$c$. Thus this illustrates the condition of noncoincidence of the spike pulse P$r$ representing the positive pulse output of pulse former PF2 and the square wave pulse V$r$13 representing the positive square pulse output of pulse former PF3 in the present assumed condition. The spike pulse P$r$13 represents the positive spike pulse output of pulse former PF3 in this present assumed condition.

In view of the noncoincidence of pulses P$r$ and V$r$13 in the assumed condition of FIG. 9, the coincidence gate CG3 controlled by the phase comparison of these pulses will not be operated and its output relay OD will therefore be released. Similarly, because of the noncoincidence of pulses P$r$ and P$r$13 as illustrated in the assumed condition of FIG. 9 the coincidence gate CG2 controlled thereby will also not be operated and its output relay OS will be released. This combination of conditions with relay OD released and relay OS released will continue until the clockwise driving of the rotor of potentiometer PO5 has brought it into position to correspond with the new offset relation and consequently will have brought pulse P$r$ into coincidence with pulse P$r$13 at sometime after the condition illustrated in FIG. 9. When such coincidence has been reached coincidence gate CG2 will be operated to energize its relay OS, and the relays OS and OD will thus be in the positions shown in FIG. 4$d$.

Referring now to FIG. 13 a block diagram is presented illustrating how the several figures of FIG. 4 may be arranged so as to show a complete circuit diagram. The FIG. 4$a$ would be arranged as the upper left diagram with FIG. 4$b$ directly to the right of FIG. 4$a$. FIG. 4$c$ would be arranged below FIG. 4$a$ with FIG. 4$e$ directly below FIG. 4$c$. FIG. 4$d$ would be arranged directly below FIG. 4$b$ and to the right of FIG. 4$c$.

Referring now to FIG. 4 which is composed of FIGS. 4$a$, 4$b$, 4$c$, 4$d$, and 4$e$, arranged as shown in FIG. 13, this FIG. 4 shows a detailed schematic circuit diagram of a preferred embodiment of a local controller combining several features of the invention cooperatively in one system, particularly adapted for operation in a traffic control system of the general type illustrated in block diagram in FIG. 1 and involving master control of the total time cycle for traffic signals for example, with master controlled expansion and contraction of the time cycle, and master controlled change of split of the time cycle, and master controlled selection between several locally adjusted offsets of the individual local time cycles at the individual local controllers, and with smooth transition of the local time cycle from one such offset selection to another, the local cycle being partly distributed on a percentage basis by locally adjusted percentage potentiometers to expand with the total time cycle, and also involving local timing of the yellow or clearance signals, along with parts of other signal periods desired, so that the local timing of the several local controllers may be individually adjusted locally while being also jointly adjusted and synchronized by the master controller, and thus the local time cycle is controlled and timed partly from the local controller, all in cooperation with traffic actuation at the local controller.

FIG. 4 here presented in five sections, FIGS. 4$a$, 4$b$, 4$c$, 4$d$ and 4$e$ is illustrated in a rest position. The signals at the controlled intersection will show a green signal for go for vehicle traffic on Street A, a green walk signal for pedestrians to cross Street B and/or Street C, and red signals for stop for vehicle traffic on Street B and Street C with red or wait signals for pedestrians to cross Street A.

It will be assumed for the purpose of illustration that the local controller is in simultaneous offset operation.

FIG. 4 consists of FIGS. 4$a$, 4$b$, 4$c$, 4$d$ and 4$e$ which illustrations comprise a complete circuit when arranged so that FIG. 4$b$ is to the right of FIG. 4$a$ while FIGS. 4$c$ and 4$d$ are arranged under FIGS. 4$a$ and 4$b$ respectively with FIG. 4$e$ arranged under FIG. 4$c$, all as shown in FIG. 13.

FIG. 4$a$ illustrates five relays LO, SB3, SB2, INT and MM and their associated contacts below the respective relays. The relays SB3 and SB2 serve to control the selection of cycle "splits" of one phase of the local controller, for example phase B while relay LO serves to control the point in the cycle at which splits may be changed. The relay INT serves as part of one of the timing circuits while relay MM serves to advance the wiper arms of the six banks of the rotary stepping switch, three banks of which appear in FIG. 4$a$.

The relay LO is illustrated as energized while relays SB3, SB2, INT and MM are illustrated as deenergized.

The wiper arms A1, B1 and C1, associated with the respective banks A, B, and C of the rotary stepping switch appear in FIG. 4$a$ illustrated in position 1.

The relays SB3 and SB2 select the local split adjustments associated with phase B, for example, under control of relay LO and the remote offset selection.

To the right of the contacts of the aforementioned relays LO, SB3 and SB2 is a group of three cycle percentage split adjustment potentiometers PB1, PB2 and PB3, all associated with phase B, for example, of the type shown as PA1 and PA2 in FIG. 3. Each potentiometer is associated with timing adjusting resistors TB1, TB2, and TB3 respectively, which are connected to the desired calibration point on a potential divider PDX at point PD+.

The combination of potentiometer PB1 and resistor TB1 effect "split" 1 of phase B, for example, while PB2 and TB2 and PB3 and TB3 effect "splits" 2 and 3 respectively of phase B.

The block of resistors PA below the contacts associated with relay LO serve to produce a voltage from lines FC phased to provide a zero reference point in a cycle, from which "split" percentage points in the local cycle may be obtained by adjustment of the potentiometers PB1, PB2 and PB3 respectively for phase B, for example, for remote selection.

The three horizontal lines marked FC are input variable frequency lines from the master controller, and correspond to the lines similarly labeled in FIGS. 1, 2 and 3.

Immediately below the lines FC are the aforementioned three banks, A, B and C of a thirteen position rotary stepping switch of the familiar telephone type with wiper arms A1, B1 and C1 with wiper arm C1 a bridged wiper. The additional contact banks D, E and F with associated wiper arms D1, E1 and F1 are shown below in FIG. 4$c$.

The relay MM, located below the bank C, to the right of FIG. 4$a$ with some of its associated contacts, represents a motor magnet used to advance the wiper arms of the several banks of the rotary stepping switch step-by-step in a manner familiar to those in the art.

Additional adjustable timing resistors TP1, TP2, TP3, TP4 and TP5 are found below the bank C of the rotary stepping switch with which the several adjustable timing resistors are associated, each being connected to certain positions in the bank C while the terminals marked PD+ are connected to a selected position on the potential divider PDX shown in FIG. 4e.

The relay INT, and its contact, tube FA and capacitor TC also found below the bank C on the right of the diagram, are parts of one of the timing circuits associated with some of the timing resistors as more fully described hereinafter.

Referring to FIG. 4b, in the upper left of the diagram are relays SC3 and SC2 and their associated contacts below the respective relay. These relays illustrated as deenergized, serve the same purpose with relation to phase C as relays SB3 and SB2 of FIG. 4a serve with relation to phase B as previously described.

Also associated with phase C are potentiometers PC1, PC2 and PC3 and timing adjustable resistors TC1, TC2 and TC3. These several relays, potentiometers and timing adjustable resistors are particularly associated with the several "splits" of phase C in a similar manner as those relays, potentiometers and timing adjustable resistors mentioned above in FIG. 4a, associated with phase B. The relay LO of FIG. 4a also controls the relay SC3 and SC2 of FIG. 4b as mentioned above relative to relays SB3 and SB2 in FIG. 4a.

The potentiometers PC1, PC2 and PC3 of FIG. 4b are similarly connected to the reference frequency lines FC, from the master controller, as described above relative to potentiometers PB1, PB2 and PB3 of FIG. 4a.

Directly to the right of the timing adjustable resistors in FIG. 4b are six fixed terminals that may be in the form of insulated screw terminals, for example, and five adjustable forked terminal leads. The adjustable forked leads, which may be called "offset" leads, for example, are connected to the desired fixed terminals, which may be called "split" terminals, for example. Any one or more "offset" leads may be connected to any "split" terminal to obtain the desired split of the cycle during any selected offset operation of the local controller. These terminals are shown unconnected for convenience of illustration. It will be observed if the adjustable "offset" leads are not connected to any of the "split" terminals or if the "offset" leads are connected to the two uppermost "split" terminals the split number 1 will be in effect via back contacts of relays SC3, SC2 for phase C and via back contacts of relays SB3 and SB2 for phase B as described more fully below. It will be understood that the adjustable "offset" leads may be cross-connected to the "split" terminals as desired.

The two selector switches SS1 shown in FIG. 4c and SS2 shown in FIG. 4b are ganged switches having four possible positions each for a different form of operation of the local controller. These switches are shown separated for convenience of illustration. The switches SS1 and SS2 are illustrated fully counter clockwise and indicate a position of "actuated and free" operation. However, by turning the selector switches to the next position clockwise the "actuated" condition may be obtained. The next position clockwise would provide "Phase B pedestrian recall" while the fourth position would provide "Phase B vehicle recall" all as described more fully below.

The relay FRR is located below the selector switch SS2. Relay FRR which would be energized for "free" operation of the local controller is shown deenergized in the condition assumed.

To the right of the insulated "split" terminals and adjustable forked terminals are four indicator lamps of a neon type for example, which will be illuminated individually to indicate when the local controller is in "free," outbound, inbound or average offset operation.

Again to the right are five relays OT, OT', IN, SIM and PR with their associated contacts below the respective relay. On the upper right of the diagram are four lines OC, OC1, OC2 and SM1, which lines correspond to the lines similarly labeled in FIG. 1 and FIG. 2. These lines are the three offset selection input lines from the master controller, OC1, OC2 and SM1 and a common ground line OC from the master controller.

The relays OT, OT', IN and PR are illustrated deenergized while relay SIM is illustrated energized in the assumed condition of the local controller.

The selector switches SS3 and SS4 are shown in position 1 which position will cause the local controller to be in coordination with the system and also to provide simultaneous operation, when called for by the master controller.

If the selector switches SS3 and SS4, which switches are ganged, were connected to position 2, the local controller would be in the coordinated system but not allowed to go into simultaneous operation. Position 3 of the selector switches SS3 and SS4 would place the local controller in isolated operation.

When selector switches SS3 and SS4 are placed in position 3, switch SS4 will supply a ground line to relay PR and thus place the local controller in isolated operation; however relay PR is deenergized with switch SS4 in position 1 as shown.

Four potentiometers PO1, PO2, PO3 and PO4 are associated with inbound offset, outbound offset, average offset and simultaneous offset respectively. Potentiometer PO5 provides a local reference wave energy for establishing the offset effective for the local controller.

A reversible motor RDM is illustrated to the right of the potentiometers. The three lines bracketed and labeled FR are input reference frequency lines from the master controller, corresponding to those similarly marked in FIGS. 1, 2 and 3.

In FIG. 4c of the diagram are illustrated the remaining three banks D, E and F of the thirteen position rotary stepping switch. Below the bank F there is illustrated fifteen relays BD, BM, AG, AY, BG, BY, CG, CM, CD, BP, BWT, BS, CS, CWT and CP with their respective contacts arranged below the relay. Relays BM, AG, CM, BWT, and CWT are illustrated as energized while the remaining ten relays are illustrated as deenergized. To the left of relay BD is a set of contacts VDB which contacts represent a vehicle detector associated with the phase B. To the left of relay BP is illustrated a pushbutton PBB representing a pedestrian actuated pushbutton associated with the phase B. Both the vehicle detector VDB and the pedestrian pushbutton PBB would be located externally but are here illustrated as internal parts for convenience of illustration. On the right of FIG. 4c is a selector switch SS6. Switch SS6 is illustrated in position 2, which is an "off" position, however position 1, the extreme counterclockwise position, would cause a phase C pedestrian recall, while position 3, the extreme clockwise position, would cause a phase C vehicle recall. The terminal of position 1 of selector switch SS6 is connected to the ground side of relay CP and the terminal of position 3 of selector switch SS6 is connected to the ground side of relay CD.

To the right of relay CP a pushbutton PBC is illustrated representing a pedestrian actuated pushbutton associated with the phase C. Above relay CD is a set of contacts VDC representing a vehicle detector associated with the phase C. Both vehicle detector VDC and pedestrian pushbutton PBC are illustrated as internal parts for convenience but are external to the local controller.

In the lower section in the center of the diagram are two timing adjustable resistors TP6 and TP7 associated with interval timing as explained below.

Directly below bank F are three contacts CA, CB and

CC. These contacts are employed during "isolated" operation only and are closed via the rotating action of cam arms on cam shaft CMS illustrated above the reversible motor RDM in FIG. 4b, all of which is explained hereinafter.

FIG. 4d generally is a diagram of three pulse former networks PF1, PF2 and PF3, arranged in a vertical column at the left, and three coincidence gate circuits CG1, CG2, CG3 and their associated output relays MAX, OS, and OD respectively, arranged at the bottom of the diagram with their respective contacts beneath them.

These three pulse former circuits PF1, PF2 and PF3 are indicated in general by the dash line blocks so designated and are associated on their input sides with the respective transformers T1, T2 and T3 at the left, and the coincidence gate circuits CG1, CG2 and CG3 are similarly indicated by dash line blocks and control the respective output relays MAX, OS and OD. The pulse former of each horizontal row extends to the right of the output winding at the right of its associated transformer about ⅓ of the way across the figure as indicated by the broken line block designated PF1 in connection with the lower most row, and the coincidence gate circuit is in general at the right half of each row as indicated in the broken line block designated CG1 for example, in connection with the lower most row, but the pulse former of each row is not necessarily associated only with the coincidence gate of the same row, as will be described below.

The lowest of the three coincidence gate blocks CG1 and its output relay MAX is concerned at its output end with control of the motor magnet MM (in FIG. 4a) and the advance of the stepping switch in certain positions as described, such as steps 1, 7 and 11.

The pulse former PF1 is concerned at its input end with the output of the resistor network PA and potentiometers PB1, PB2, PB3, PC1, PC2 and PC3, establishing the locally adjusted percentage points for the control of the advancing of the wiper arms of the stepping switch at the desired steps in its cycle, in association with the control lines FC from the master controller, the output of pulse former PF1 being supplied to the input of coincidence gate CG1. As will be more fully described hereinafter, the resistor network PA is more closely associated with phase A while the potentiometers PB1, PB2 and PB3 are more closely associated with phase B and potentiometers PC1, PC2 and PC3 associated with phase C of a single cycle of the local controller.

The middle pulse former PF2 is connected at its input end with the output of potentiometer PO5 via transformer T2, the output of potentiometer PO5 serving as what might be called a local reference voltage, which in its normal stable condition on completion of its homing operation is in phase with the output of whichever one of the several potentiometers PO1, PO2, PO3 or PO4 is selected by remote control from the master controller, all of the several potentiometers just mentioned being associated with the reference frequency lines FR.

As more fully described below, the output from one of the potentiometers PO1, PO2 or PO3 is selected by operation of either one or both of the relays OT (and OT') or IN all through the offset control lines OC1, OC2 and OC from the master controller, or potentiometer PO4 is selected by the operation of relay SIM over the offset control lines SM1 and OC from the master controller. The reversible motor unit RDM in FIG. 4b is controlled by the outputs of the middle and upper coincidence gates of FIG. 4d to drive the rotor of the potentiometer PO5 in FIG. 4b in the nearest direction at a relatively slow rate to coincidence of phase displacement with one of the four potentiometers selected by the master controller to determine the offset of the local controller cycle.

Relays OT, OT' and IN are for convenience shown deenergized with relay SIM energized indicating simultaneous offset demand as assumed, but it will be understood that relays OT and OT', or relay IN or both relays OT, OT' and IN may be energized with relay SIM, and in most cases likely would be so energized, although this would not prevent simultaneous offset selection with relay SIM energized. Relay OT' is merely a contact multiplying relay for relay OT.

It will be understood that from the moment of change in offset selection by the master controller until the rotor of potentiometer PO5 has completed its rotation in its homing operation to coincidence with the newly selected offset or phase relation, the output of potentiometer PO5 will be slowly changing in phase, and will be controlling pulse former PF2 in FIG. 4d during such change as well as when at rest in its final position. The output of this pulse former PF2 will be applied to the input of the coincidence gate CG1 for comparison with the output of pulse former PF1 to control the stepping switch in each desired percentage controlled point in its cycle. However, as more fully explained below, the output of pulse former PF2 is also applied to the coincidence gates CG2 and CG3 to control the homing operation of the rotor of potentiometer PO5 by means of the reversible motor RDM. In this connection the coincidence gate CG2 is employed to stop the motor at coincidence of the output voltage wave of PO5 with the output of the selected voltage wave of one of the potentiometers PO1, PO2, PO3 or PO4.

The output of pulse former PF2 is also applied to the input of the coincidence gate CG3, the output of which controls relay OD which controls the direction of rotation of reversible motor RDM, this being accomplished by phase comparison of the spike pulse output of pulse former PF2 with the square wave output of the pulse former PF3 of FIG. 4d, this latter pulse former having both a square wave output and a spike pulse output.

To the left of pulse former PF3 is a relay MMR with its associated contacts below the relay, the relay MMR being illustrated as energized.

Below pulse former PF1 in phantom form, is relay MM with one of its contacts while below the relay MM here illustrated deenergized is a pushbutton MB which may be used for manual control of the local controller.

Figure 4E:
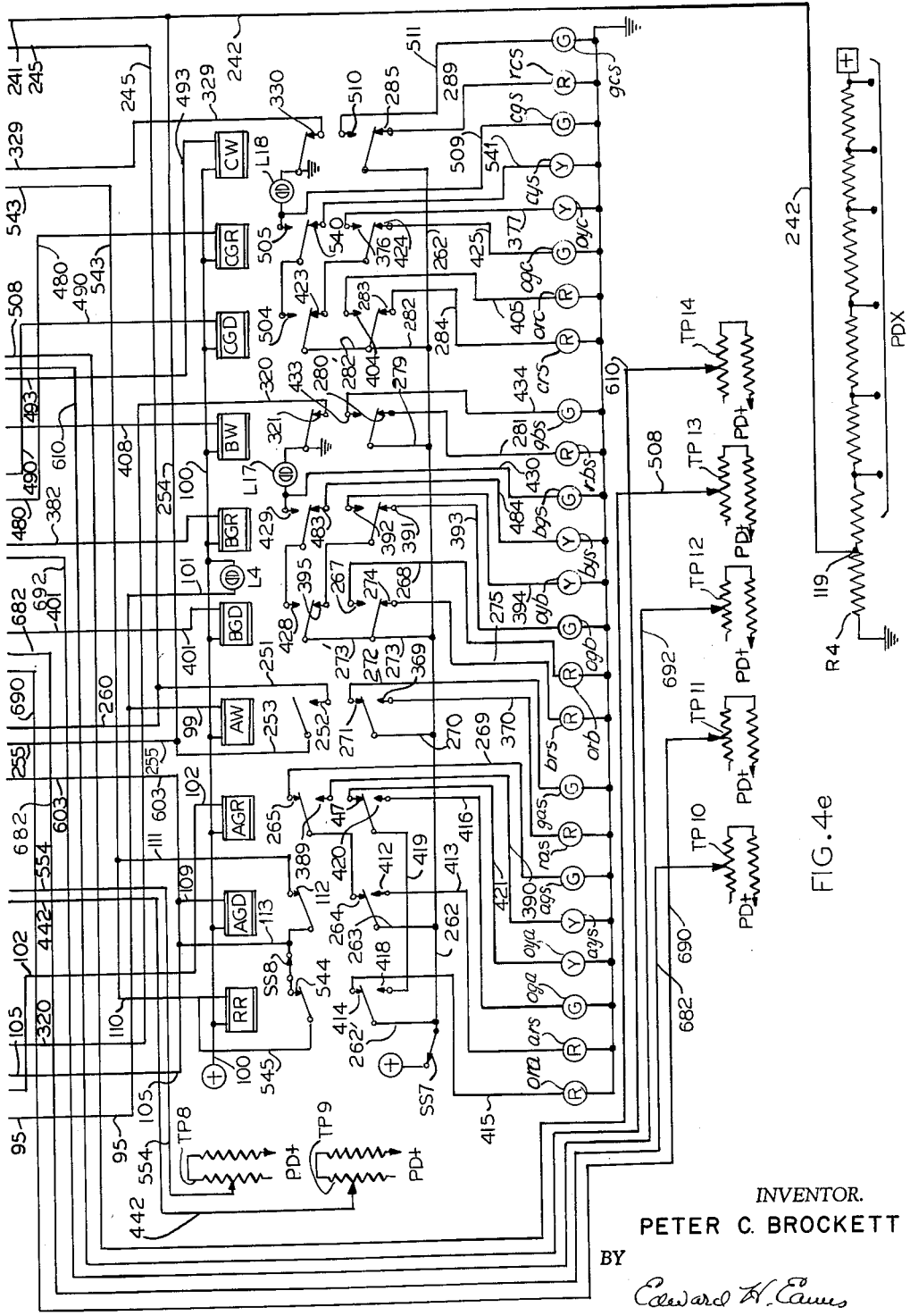

The FIG. 4e illustrates 10 relays, RR, AGD, AGR, AW, BGD, BGR, BW, CGD, CGR, and CW. These several relays, with their contacts directly beneath them control the signal lights individually represented by 24 circles beneath the contacts of the relays. The several circles illustrate signal lights of the conventional colors, green for go, yellow for caution, or clearance and red for stop plus pedestrian walk and wait signals as desired. Also, included in the several signals are a series of overlap signals which will be later discussed.

To the left of relay RR and its associated contacts are two adjustable timing resistors TP8 and TP9.

Beneath the several signals are five adjustable timing resistors TP10, TP11, TP12, TP13 and TP14. The seven adjustable timing resistors with reference to FIG. 4e all have terminals marked PD+ which terminals are connected to a selected position on a potential divider PDX shown at the bottom of FIG. 4e.

The switch SS7 located near the adjustable timing resistor TP9 is an on-off switch, here shown in the on position to supply alternating current power to illuminate the several signal lights through circuits that will hereinafter be described.

The potential divider PDX in the lower section of FIG. 4e is made up of several resistors with taps so that the several adjustable timing resistors may be connected to the desired tap from points PD+ on the timing potentiometer.

The four relays RR, AGD, AGR and AW of FIG. 4e are illustrated as energized while the remaining six relays are illustrated in a deenergized condition.

The FIG. 4, including FIGS. 4a, 4b, 4c, 4d and 4e, having been described, the operation of the pulse formers PF1, PF2 and PF3 and the coincidence gates CG1, CG2 and CG3 will now be described. The output of pulse former CG1 is concerned with the energization of relay MAX, which relay is concerned with the energization of the motor magnet MM in certain positions of the rotary stepping switch as will be fully described below.

With the contacts and certain relays open, as will later be described, the circuit of cathode 213 is open so that the tube 205 of the coincidence gate CG1 cannot pass current even though all of the conditions of the circuit in FIG. 4d place the coincidence gate CG1 in coincidence to pass current.

Capacitor 120 aids in certain control of the coincidence gate CG1. Capacitor 120 is rapidly charged from the power supply through line 115, resistor 126, line 127, adjustable resistor 125, tap 124, line 138, line 80, contact 75, of relay FRR, line 79, line 78 to the capacitor 120, which capacitor is associated with the input wire 158 of coincidence gate CG1 to control the grid bias of one of the two control grids of the coincidence gate tube. This capacitor 120 brings the bias on the control grid of the coincidence gate tube from a relatively high negative blocking value to a point near zero bias at which the tube can pass plate current if the other control grid is also at sufficiently low negative or near zero bias. As will be seen below, upon energization of the motor magnet MM, shown in FIG. 4d in phantom form, contact 118 of the motor magnet MM is closed to discharge the capacitor 120 through resistor R6, contact 118 to ground, thereby discharging the capacitor to substantially zero with respect to ground. With the capacitor 120 so discharged the bias of the control grid of the coincidence gate tube is increased to a relatively high negative blocking value to stop the passage of plate current through the tube.

In certain modes of operation of the local controller the capacitor 120 is charged slowly at a preadjusted timing rate through certain charging circuits hereinafter described. Thus in certain modes of operation the capacitor 120 serves as a timing capacitor while in other modes of operation of the local controller the capacitor 120 serves to block the passage of current to the coincidence gate at the end of a timed interval.

When the capacitor is employed for purposes of timing the transformer T1 is shunted by certain contacts of the relay FRR, then energized. Certain other contacts of the relay FRR, when relay FRR is energized, connect a capacitor 120 to certain charging circuits hereinafter described. Thus in a percentage timing position of the contact banks A and B since the pulse former PF1 has its input disconnected the pulse former provides no output to the line 158 and this line is controlled only by the timed controlled charging of capacitor 120.

In the modes of operation of the local controller in which it is desired to have the percentage control from the control frequency lines FC via locally adjusted potentiometers, the capacitor 120 is disconnected from the timed charging rate control adjustable resistors and is instead connected to the potential divider made up of resistors 126 and 128 and an adjustable resistor 125, to be charged rapidly through the circuit previously described. The potentiometer 124—125, or more particularly its resistance element 125, is a part of a potential divider from positive D.C. power at a terminal 115 via resistor 126, wire 127, resistor 125 and resistor 128 to ground at junction 132 in series. Capacitor 131 is connected between wire 127 and junction 132 at ground. This combination serving to provide an operating potential for the cathode somewhat above ground and more positive normally than the point at tap 124 associated with the control grids via the respective resistors 121, 180, 225 and 232 and thus establishing a normal negative bias relation between these control grids and the cathode of the several coincidence gate tubes. The cathodes of the several coincidence gate tubes are connected via wire 133 to the wire 127 at the upper or positive side of capacitor 131.

Coincidence gate circuit CG1 in FIG. 4d is representative of the corresponding coincidence gate circuits CG2 and CG3 above and since the pulse former circuit PF1 and its associated transformer T1 are representative of the pulse former circuits PF2 and PF3 above and their associated transformers T2 and T3, except for a dual purpose output arrangement in connection with pulse former PF3 as further described below, only pulse former PF1 and its associated transformer T1 and coincidence gate CG1 will be described in detail.

The input side or winding 56 of the transformer T1 is connected via wires 70 and 71 to wipers A1 and B1 of banks A and B respectively of the stepping switch contacts. The capacitor 136 is connected across these wires at the input winding 56 of transformer T1. The capacitor tunes the input wiring of the transformer to the frequency of the voltage wave on the lines 70—71, as for example 400 cycles per second. This capacitor reduces the loading of the transformer on the resistor network PA and potentiometers PB1, PB2, PB3, PC1, PC2, and PC3, and reduces the amount of error between the mechanical position of the potentiometer rotor and the actual phase angle of the output voltage from the potentiometer rotor contacts.

The input transformer T1 preferably steps up the sine wave voltage somewhat, and at its output winding 57 applies this stepped up voltage via resistor 137 to control grid 141 of the first triode section 145 of the pulse forming circuit PF1, the other side of the transformer output winding 57 being connected at junction 143 to the cathode of this triode section and to ground. Capacitor 137' connected across resistor 137 develops a small operating bias for the tube 145 and as soon as the positive half cycle of the input sine wave occurs, the grid draws current causing a voltage drop across a resistor 137. This causes the positive half of the wave to be limited to a low value and when the negative half of the wave appears at the input, it swings the grid 141 to negative bias beyond cutoff. The plate 144 of tube 145 is connected to junction 142 and returns to resistor 146 and wire 147 to B+ power supply.

Therefore, the voltage on plate 144 appearing on junction 142 has a low positive or substantially zero value corresponding to the positive half of the original sine wave input at transformer T1, and has a partially squared positive pulse form corresponding to the negative half of the original sine wave input.

By means of the coupling capacitor 151 this pulse form is applied across the load resistance 152 and via the series grid resistor 153 to grid 154 of the second triode tube, section 155. The capacitor 151 is connected between junction 142 and junction 148. Resistor 152 is connected between junction 148 and ground.

The resistor 153, between junction 148 and grid 154 serves for grid limiting on the positive half of the partially square pulse wave input at this grid so that the pulse output of this tube section 155, at its plate circuit 156, provides a substantially square wave. The cathode of tube 155 is connected to ground at 157, and the plate circuit 156 is connected from junction 161 via resistor 162 to wire 147 and the B+ plate voltage supply.

The square wave pulse output of the plate circuit 156 at junction 161 is differentiated by capacitor 163 in conjunction with resistor 121 to apply a sharp narrow spike pulse in the positive direction to the upper control grid at input circuit 158 of the coincidence gate circuit CG1, corresponding to the point at which the square wave pulse crosses zero rapidly to become positive, and corresponding with the same relative transition point of the original sine wave for example.

It will be appreciated that this spike pulse output is relatively positive in relation to the normal negative bias of this grid of the coincidence gate tube 165, as established by the circuit including resistance 121 connected from the junction point 164 at the left end of line 158 and the right side of condenser 163 and continuing via wire 79, contact 75 of relay FRR, line 80, wire 138, to tap 124 of potentiometer providing the adjusted grid bias for the two control grids of the coincidence gate tube 165.

It will be appreciated that a positive spike pulse is provided at the output side of capacitor 163 corresponding to one side of the square wave input at the left side of this capacitor and a negative spike pulse at the opposite end of such square wave input. The operating points of the triode section 145 and 155 are chosen to develop a strong narrow positive pulse and the negative spike pulse may be of somewhat less amplitude and sharpness than the positive spike pulse, but in any event the negative pulse serves to further bias the coincidence gate tube grid 167 connected to the line 158 and thus is ineffective in making this tube conducting.

The coincidence gate tube 165 is of the general type having two controls grids, both of which must be substantially zero or positive bias to make the tube pass any appreciable plate current. Thus, the control grid 167 of the coincidence gate tube 165 and the lower control grid 168 jointly control this tube in relation to its cathode 169.

Thus the pulse former PF1 in two stages associated with the tube sections 145 and 155 provides a square wave pulse, as generally illustrated in FIG. 5b in response to the sine wave input to transformer T1 from the lines 70—71 from the percentage determining potentiometer through the circuit as previously described, and the capacitor 163 in conjunction with the load resistor 121 and its associated circuit connection to the desired normal grid bias, provides the narrow spike pulse forms generally indicated in FIG. 5c, this spike pulse output being provided on the input line 158 to coincidence gate CG1. The input to the lower control grid 168 of the coincidence gate tube 165 is connected to an isolating resistor 173, the left side of which is connected to the wire 175 extending upward to connect with the other two coincidence gates above in FIG. 4d. This line 175, at junction 176, connects with wire 177 extending to junction 189, at the output side of a differentiating capacitor 170 in the pulse former PF2 and at the upper side of load resistance 180 of this pulse former, and resistance 180 being connected between junction 189 on wire 177 and junction 139 on wire 236, and thence via wires 236, 138 to the grid bias potentiometer tap 124. The isolating resistor 173 may be considered a part of this line 175, or it might be included in the same grid circuit within the coincidence gate CG1 and considered a part of the latter.

A pulse former PF2 of FIG. 4d is generally associated with the locally displaced reference frequency wave energy. The pulse former PF2 provides a sharp spike pulse output in similar fashion to that described in connection with pulse former PF1, but in corresponding relationship to the locally displaced reference wave energy, and this spike pulse is applied to all three of the lower grids of the respective coincidence gate tubes, of coincidence gates CG1, CG2 and CG3, in each case via isolating resistors 173 as described in connection with resistor 173 of CG1.

Thus the spike pulse, locally phase displaced as desired in relation to the reference frequency wave energy on the lines FR from the master controller, is supplied to the three coincidence gate circuits for phase comparison with the other wave energy inputs to their respective other control grids, and in the case of coincidence gate circuit CG1 is compared with the percentage point phase related output of the pulse former PF1 to actuate the coincidence gate circuit CG1 to operate its output relay MAX to actuate the motor magnet MM of the stepping switch at the corresponding percentage points of the cycle.

The spike pulse output of the pulse former PF2 on the lines 177 and 175, and applied to the several lower control grids of the coincidence gate tubes, corresponds with the spike pulse Pr appearing in FIGS. 5 and 6. This pulse also corresponds with the spike pulse Pr shown in FIGS. 7, 8 and 9, as will be further described below.

Continuing now with a description in more detail of the coincidence gate circuit CG1 as representative of the several such circuits designated CG1, CG2, CG3 of FIG. 4d, the coincidence gate tube 165 and its two control grids 167 and 168 have previously been mentioned. The cathode 169 of this tube is connected to the line 133, and via this line to the wire 127 to establish a cathode potential normally more positive than the two control grids as provided by the potential divider and the potentiometer arrangement previously described extending from the positive line 115 to the ground terminal 132 with the capacitor 131 between the wire 127 and the ground terminal 132. The plate circuit 178 of this coincidence gate tube is connected via resistance 181 and wire 182 to the B+ supply terminal.

The screen grids 167' of the coincidence gate tube 165 are connected through resistor 183 and wire 182 to the B+ supply terminal.

In the percentage potentiometer control positions of the stepping switch, the normal bias applied to both the control grids of the coincidence gate tube 165 is sufficient to keep the tube bias well beyond cutoff. Any negative pulses only add to this bias and the tube remains cut off. The positive pulse output of the respective pulse formers into the tube control grids of this coincidence gate tube are of sufficient amplitude to overcome this applied bias, and if both the control grids are positive at the same time, as in coincidence of these pulses, plate current flows in the gate tube 165 and a negative pulse appears at the plate current circuit 178. The coupling capacitor 184 applies this pulse from the plate circuit 178 across the load resistor 186, and to the control grid 187 of the triode tube section 185, this grid circuit being connected to junction 188 between capacitor 184 and resistor 186, the lower end of the resistor being connected to the B+ power supply, to which also the plate circuit 191 is connected.

It will be appreciated that the output pulses at the plate circuit of tube 165 are repeated during the brief coincidence period, at the frequency of the reference and control lines which has been assumed for example to approximate 400 cycles per second and thus during the coincidence or overlap of the pulse outputs of the two pulse formers which are being compared at the coincidence gate circuit, the capacitor 184 passes each of the series of coincidence pulses.

The cathode 192 of the tube 185 is connected in series through resistance 193 to ground. The output of this tube circuit is taken from leads 194 and 196 across the cathode load resistance 193, and this tube circuit thus serves as a cathode follower, which avoids loading the coincidence gate tube and obtains a low impedance driving source for the next following rectifier circuit associated with the diode tube section 195.

The upper end of the resistor 193 at the cathode circuit 192 is connected via wire 194 to the left side of capacitor 197, the right side of which is connected to wire 198 to the cathode circuit of diode 195 at junction 201. The lower side of the resistance 193 at ground is connected via wire 196 to the plate circuit of the diode 195 at junction 202.

Thus each of the series of brief negative pulses, at the 400 cycle per second rate and of the time length of the order of $\frac{1}{200}$ of each such cycle, for example, by coincidence, appear as a reduction in voltage across the cathode load resistance 193, and quickly discharge capacitor 197 via diode rectifier 195. Between the remaining periods between pulse of the series, that is for the remaining more than 99% of each cycle of the 400 cycles per second, for example, at coincidence the capacitor 197 will be recharging via resistance 206 to the normally higher voltage across resistance 193 between negative pulse and at noncoincidence.

The charging time of capacitor 197 via resistance 206 is sufficient so that, for the over 99% of the time period of the 400 cycles per second waves between negative pulse of successive waves, there exists a sustained positive average voltage across resistance 206 with respect to ground. At junction 203 this average direct current voltage at coincidence is applied to the control grid of a direct current amplifier tube section 205 illustrated in triode form, and this reduces the bias of the grid with respect to the cathode in this tube 205, so as to operate relay MAX in the anode-cathode circuit. The brief negative pulse on the control grid while capacitor 197 is discharged is of such short duration that the anode current through the coil of relay MAX does not fall sufficiently to release the relay. Thus relay MAX is operated throughout the period of coincidence of the two positive spike pulses at the input of the coincidence gate CG1.

The plate of tube 205 is connected via wire 211 to the relay MAX, which relay coil is connected to the power supply represented by a plus in a square. The cathode of the tube 205 is connected via wire 234 through any one or all of several contacts of several relays to point 119 on the potential divider in FIG. 4e through resistor R4 to ground.

Thus since the cathode 213 of tube 205 is connected to a point above ground potential at junction 119 of the potential divider PDX and the control grid of tube 205 is connected normally to ground potential via resistor 206 and leads 207, 196 in the absence of any coincident pulses to the coincident gate circuits, this provides a normal bias for the control grid of tube 205 to deenergize relay MAX under this condition of noncoincidence.

As discussed above, upon the coincidence of input pulses the capacitor 197, diode 195 and resistance 206 combination applies a direct current positive voltage to the control grid of tube 205 which will overcome the normal negative bias and make the anode cathode circuit of this tube sufficiently conducting to operate the relay MAX.

Although the capacitor 197 is sufficiently large to sustain the operation of the relay MAX between the rapidly repeated brief negative pulses at the 400 cycle per second rate for example, during coincidence it is not sufficiently large to continue to hold relay MAX operated for any substantial period of time after the end of such coincidences. Thus relay MAX will be released properly at the end of coincidence after a brief but negligible time lag resulting from the recharge of capacitor 197.

Thus with this description of the coincidence gate circuit CG1, the operation of the similar coincidence gate circuits CG2 and CG3 above will be understood. It will be noted in this connection that the cathode of the direct current amplifier tube section at the output ends of the latter two coincidence gate circuits are connected in common to the potential divider made up of resistor R9 and R10 connected between the direct current supply and ground, the cathodes being connected in common to the potential divider at point 114. The plates of the direct current amplifier tube sections at the output end of the coincidence gates CG2 and CG3 are connected to the relay OS and OD respectively with both relays OS and OD connected to positive power via their respective coils.

Similarly at the input ends of the several coincidence gate circuits the cathodes of the coincidence gate tubes of the circuits CG3 and CG2 are connected in common via wire 133 with the cathode of the coincidence gate tube 165 at wire 127 to the desired operating potential.

The pulse former circuits PF2 and PF3 are identical with that described above for the pulse former PF1 except that the pulse former PF3 in addition to the spike pulse output on line 224 also provides a substantially square wave puse output from the plate circuit of the output tubesection 355 of pulse former PF3 via wire 226, capacitor 227 to the upper input control grid of the coincidence gate tube of the circuit CG3 at junction 229 via circuit limiting resistor 228. Capacitor 231 shunts capacitor 227 and the resistor 228, from wire 226 to the upper control grid also to provide a better squared pulse at the control grid. This capacitor 231 is connected from the junction with the lead 226 at the top of the capacitor 227 to the junction between the upper control grid and the right hand end of resistor 228. For convenience in the drawing particularly in FIG. 4d, the common bias in cathode potential supplied on wire 133 and related operating point potentiometer 124—125 and resistors 126, 128 and capacitor 131 are not included within the blocks designating the coincidence gates CG1, CG2 and CG3 since they are in large part common to the several coincidence gates and it is obvious that separate such operating point controls and the like might be employed individually and included within the coincidence gates if desired. The isolating resistors 173, 237 and 179 might also be included within their respective coincidence gate blocks, if desired.

Similarly, the blocking capacitor and return resistor combination 227 and 232 and the current limiting resistor 228 and its by-pass pulse aiding capacitor 321 are illustrated outside of the blocks PF3 and CG3 for convenience in the drawing of FIG. 4d, but those elements could be included in PF3 or CG3 or divided between the two blocks.

The circuit including capacitor 227 and the resistor 228 and the shunt capacitor 231 provides a substantially square wave pulse to the upper control grid of the coincidence gate tube of the coincidence gate circuit CG3, whenever the sine wave input to the pulse former PF3 is on its positive excursion, this square wave pulse also appearing across the load resistor 232, which is connected between the junction 229 and the lead 233, the latter connecting the lower side of the resistor by a lead 236 to the junction 129, wire 138 to tap 124, on the potentiometer 124—125 setting the desired operating point above ground for the normal bias potential of the control grids of the coincidence gate tubes.

Thus the upper control grid of the coincidence gate tube of the upper coincidence gate circuit CG3 goes substantially positive throughout the whole positive half of the sine wave output, from whichever one of the potentiometers PO1, PO2 or PO3, or potentiometer PO4 is selected by the master controller through the operation of the relays OT—OT', IN, SIM, contacts of these relays associated with the output of only one of these several elements at one time via wires 50—51 to the input side of the transformer T3, and thence from the output of this transformer to the input of the pulse former PF3.

With the relays OT—OT' and IN deenergized and relay SIM energized as illustrated in FIG. 4d for example, potentiometer PO4 is connected to the input of the transformer T3 of pulse former PF3 via lines 50—51.

The sine wave input to the pulse former PF3 bears a predetermined phase relationship to the three phase reference frequency wave energy on the reference lines FR from the master controller. Therefore, the coincidence gate CG3 has its upper control grid controlled by the square pulse output corresponding to the positive half of this sine wave. Its lower control grid is connected via isolating resistance 179, wire 175, junction 176 and wire 177 to the spike pulse output of the pulse former PF2 derived from the output of the potentiometer PO5. Thus the latter grid will receive a spike pulse at the beginning of each positive half of the sine wave output of the potentiometer PO5. If this positive spike pulse output from PF2 derived from the potentiometer PO5 occurs within the positive half of the sine wave output from the potentiometer connected to the transformer T3, as selected from the several remotely selectable such inputs for pulse former PF3, the coincidence gate tube will conduct and coincidence gate circuit CG3 will therefore operate its output relay OD throughout the period of overlap of the spike pulse from PF2 and the square pulse from PF3.

However, if the spike pulse output of PF2 applied to the lower control grid does not fall within the positive half of the sine wave as determined by the square wave positive pulse output of PF3 at the upper control grid of the gate tube, in other words if the positive spike pulse output PF2 occurs during the negative half of the sine wave output of the potentiometer so applying its output to the transformer T3, the upper control grid of the gate tube will not be sufficiently positive and despite the continuing spike pulses on the lower control grid, this tube will not conduct, and the coincidence gate circuit CG3 will not operate its output relay OD so that the latter will be in the deenergized condition under the circumstances last described. The effect of operation or release of relay OD will be described more fully below, where it will be seen that the energized or deenergized condition of relay OD determines the direction of drive of the reversible motor assembly RDM for rotation of the rotor of potentiometer PO5.

The spike pulse output of pulse former PF3 appears on line 224 in similar fashion to the spike pulse output of pulse former PF1 at junction 164 and line 158 as described above. Thus the spike pulse output of PF3 is carried via wire 224 to the upper control grid of the gate tube of coincidence gate CG2. This spike output appearing also across the load resistor 225 connected via leads 236 and 138 to the tap 124 establishing the desired operating potential for normal bias of the control grid. The lower control grid of coincidence gate CG2 is controlled via the isolating resistance 237 from the line 175 to which the spike output pulse from pulse former PF2 is applied via wire 177.

Since the upper control grid at the input of CG2 is controlled by the spike pulse output of pulse former PF3 associated with the wave energy on lines 50—51 derived from the reference frequency lines FR in predetermined phase relationship as selected by relays OT—OT', IN, or SIM and since the lower control grid at the input of coincidence gate CG2 is controlled by the spike pulse output from the pulse former PF2 in a phase relation determined by the position of the rotor of potentiometer PO5 with respect to the wave energy of the reference frequency lines FR, therefore when these two spike pulses are in coincidence, which will be when the rotor of potentiometer PO5 is in a position corresponding to that of the selected element controlled by the relays OT—OT', IN, or SIM, in the assumed position here illustrated corresponding to the phase position of the wave energy of the output of potentiometer PO4, the coincidence gate CG2 will be operated by the conduction of its gate tube, which will operate its output relay OS as long as such coincidence occurs. The relay OS is energized between the pulses of the series at a 400 cycle per second rate during the coincidence period, as discussed above.

Thus the relay OS will be operated to stop the motor driving the rotor of the potentiometer PO5 when it is in coincidence with the potentiometer then seletced by the energization or deenergization of the relays OT—OT', IN, and SIM as more fully described below.

The circuit connections from the contacts of relays OS and OD controlling the two directional driving coils CCW and CW' of the reversible motor RDM will now be described.

The relay OS at the output end of the coincidence gate CG2 has one contact 590 and the energized condition assumed due to coincidence of pulse input contact 590 is disconnected as illustrated. However, when there is noncoincidence between the spike pulse output of the pulse formers PF2 and PF3 applied to CG2 as previously described, the relay OS will be deenergized and contact 590 will be closed.

Similarly, the relay OD has two contacts 591 and 592.

When the relay OD is in a deenergized condition, as illustrated herein, contact 591 is closed and contact 592 is open. From the illustrated condition it may be assumed that the last homing operation of the rotor of the potentiometer PO5 under control of the reversible motor RDM, was clockwise, as will be obvious on the further description below, corresponding to a condition of noncoincidence of the spike pulse output of the spike pulse former PF2 and the square pulse output from the pulse former PF3 causing relay OD to remain deenergized. Thus with relay OS energized and with relay OD deenergized under the conditions assumed and illustrated in FIG. 4d the rotor of the potentiometer PO5 will be stopped at the desired coincidence position, since the common power supply for both winding CW' and CCW of the motor RDM will be interrupted via open contact 590. The junction 593 between the two coils CW' and CCW is connected to the A.C. power supply while the upper end of the coil CW', is connected to the contact 591 of relay OD via wire 594. With contact 591 of relay OD closed, and contact 590 of relay OS closed, a circuit will be complete from the A.C. power supply through point 593, the coil CW', wire 594, contact 591 of relay OD, wire 595, contact 590 of relay OS to ground. To drive the motor RDM in the reverse direction a circuit would be complete through closed contact 592 of relay OD through a circuit that may be traced from the A.C. power through terminal 593, coil CCW, wire 598, contact 592 of relay OD, wire 595, contact 590 of relay OS to ground. Irrespective of the condition of the relay OD if the relay OS should be energized its contact 590 would be opened and thereby open the circuit to draw the motor in either direction thereby stopping the motor RDM, which in turn stops the rotation of the potentiometer PO5 leaving the potentiometer in a rest condition.

However, if it were now to be assumed that a change in selection of offset had just been made by the master controller through the relays OT, OT', or IN, or a combination of all three relays deenergized, the outputs from the rotor of the potentiometer PO5 and from the selected potentiometer to the left of potentiometer PO5 and associated with the reference lines FR, would no longer be in coincidence, and this would cause the coincidence gate CG2 to release its relay OS and close the contact 590. Thus ground would be supplied via the closed contact 590 through line 595 through one of the contacts of relay OD, 591 or 592.

If it is now assumed that newly selected offset position, provided by one of the potentiometers PO1, PO2 or PO3, for example is displaced clockwise of the existing rotor position of the potentiometer PO5, or in other words is nearer to the latter in a clockwise driving direction for PO5 than in a counterclockwise driving direction, the new homing position will be less than one-half cycle of the sine wave away in a clockwise direction from the old homing position and the spike pulse output of PF2 derived from potentiometer PO5 at the beginning of the positive half of the sine wave of such output will fall in the negative half of the square wave output of PF3 derived via lines 50—51 from the selected potentiometer both of such outputs being related to the reference frequency. Thus the positive square wave output of pulse former PF3 and the positive spike pulse output of pulse former PF2 would not be in coincidence at the input of coincidence gate CG3 and the relay OD would thus be in a deenergized condition. Therefore, contact 591 would be closed to complete the circuit to the clockwise winding CW' to drive the motor RDM and consequently the rotor of potentiometer PO5 in a clockwise direction toward coincidence with the newly selected offset.

The assumed condition of relay OS deenergized with contact 590 closed and relay OD deenergized with contact 591 closed would continue to operate the motor via winding CW' in the same direction until coincidence were to be achieved, at which point the rotor would be stopped by the coincidence of the output spike pulses from the pulse former PF3 and PF2, thus energizing the relay OS as previously described and opening its contact 590.

If it were now to be assumed, however, that the newly selected offset relation was such that the shortest direction of the rotation of the rotor of potentiometer PO5 to its new corresponding position would be counterclockwise, then the noncoincidence of the spike pulse output from PF2 and PF3 would deenergize relay OS again at the output of coincidence gate CG2 to close its contact 590, but coincidence of the positive spike pulse output of PF2 and the positive square pulse output of pulse former PF3 at the input of coincidence gate CG3 would cause relay OD to be energized, thereby opening its contact 591 and closing its contact 592. Thus under the assumed condition a circuit would be complete to energize the coil CCW to drive the motor RDM and consequently the rotor of potentiometer PO5 in a counterclockwise direction toward coincidence with a newly selected offset.

Thus it will be observed that the rotor of the potentiometer PO5 will never rotate more than 180 degrees to its newly selected offset position from its previously selected position, but will rotate in a shortest direction, either clockwise or counter clockwise as required. Since the output from the rotor of the potentiometer PO5, in desired phase relation to the wave energy from the master controller on the reference line FR, is compared in coincidence gate CG1 with the output from the respective rotor of the percentage determining potentiometers in desired phase relation to the wave energy from the master controller on the control lines FC, the local offset of the reference pulse of the time cycle is determined for the succession of coincidence with the percentage control pulses from the several percentage determining potentiometers in the time cycle.

It will be observed that in a stable condition with the rotor of potentiometer PO5, having reached its position corresponding to the newly selected offset, this offset relation will remain the same until a change by a new selection from the master controller, or of course by any local manual adjustment of the rotor of whichever of the potentiometers PO1, PO2 or PO3 happen to be controlling the position of potentiometer PO5 at the moment. However, from the time of such change of desired offset, either by selection from the master controller over the offset control lines and relays OT—OT', IN or by local adjustment of a particular potentiometer of this group, which may happen to be selected, the rotor of the potentiometer PO5 turns relatively slowly from its old offset position to its new offset position. This slow rotation may be provided by the reduction gearing, not shown, associated with the rotor element of the motor RDM.

In this connection it will be understood that the rotor of the potentiometer PO5 is rotatable through a maximum angle of 180 degrees by action of the coincidence gate control circuits making phase comparison of its output with the output of the desired offset selecting potentiometer, but the rotor itself is physically capable of continuous rotation and the maximum automatic rotation of 180 degrees may take place in any phase relation to the entire 360 degrees stator.

The rate of rotation of the rotor of potentiometer PO5 by the motor RDM is preferably of the order of one revolution in 6 to 12 minutes, where a maximum total signal time cycle of the order of 2 minutes is employed, for example, in which case the maximum half cycle change of offset would be completed in 1½ to 3 signal cycles, and the greatest effect in cycle timing during such maximum change would be about 33% increase or decrease for the ⅙ r.p.m. rate of 16½% for the 1/12 r.p.m. rate. Obviously a faster rate of rotation for potentiometer PO5 may be employed where a lower maximum time cycle is employed.

This feature of enabling the offset of the local controller to be shifted in this smooth progressive manner in the shortest direction but at a desirably slow rate between one offset relation and another, has the effect of merely slowing down the local time cycle or speeding it up slightly and distributing this gain or loss in time over the various percentage points and periods terminated thereby in the time cycle in a substantially even manner, and is of great significance in traffic control systems, in avoiding any abrupt change from one offset relation to another. The distribution of the gain or loss in time over the signal cycle is quite important in avoiding excessively long stopping periods for traffic and consequent traffic congestion in connection with changes of offset, especially if there is a major change in offset, and the ability to move in the shortest direction either clockwise or counter clockwise as required to the new offset position is also of great benefit in avoiding long traffic stoppages, as will be evident in considering a change of offset to be made from one offset point which is just about to be reached in the time cycle to another offset point which has just been passed in the time cycle, since in the latter case if it were necessary always to turn in the same direction the signal operation might be held up for a complete cycle before the new offset relation can be effective to produce a signal change.

The operation of the controller through its cycle will be described more fully in relation to the circuits in FIGS. 4a through 4e, such cycle being provided by the stepping of the wiper arms of a stepping switch from position 1 through its 13 step positions and returning to position 1 to transfer right of way from Street A to Street B and thence to Street C and retransfer right of way to Street A.

As previously stated, it will be assumed that the local controller is in simultaneous operation and is at rest with a green signal illuminated for both vehicle and pedestrian traffic on street A and a red signal for both vehicle and pedestrian traffic on Street B and Street C. It is further assumed that split 1 will be in effect to control certain positions of the rotary stepping switch.

Simultaneous operation of the local controller is obtained when switch SS3 in FIG. 4b is in position 1, as shown, and the line SM1 from the master controller is energized while lines OC1 and OC2 are deenergized. Relay SIM would be energized from the input line SM1 through switch SS3, line 31 to the coil of the relay SIM to line 32 to ground.

Contact 33 of relay SIM would be closed to place a ground connection on the adjustable lead SIM' via line 34 while contact 35 of relay SIM would be closed to complete a circuit to illuminate the indicator lamp L10 from the alternating current power supply represented by a plus in a circle through line 39, indicator lamp L10, line 40 to contact 35, to line 41 to contact 42 of relay PR to ground.

Contact 43 of relay SIM completes a circuit from one of the input lines FR, through the potentiometer PO4, line 44, to contact 43 through line 45, contact 49 of relay PR, line 50 to the transformer T3 (FIG. 4d) through the coil of the transformer T3 through line 51, line 52 to contact 53 of relay SIM, line 54 to the potentiometer PO4 to apply a selected adjusted phase input signal on transformer T3 with respect to the three phase line Fr.

The output of the potentiometer PO5 is applied to the input of transformer T2 via a circuit from the potentiometer PO5, line 55, contact 59 of relay PR, line 60 to transformer T2 through the coil of transformer T2, through line 61 to contact 62 of relay PR, line 63 to potentiometer PO5. Closure of this circuit supplies a single phase voltage to transformer T2, the phase angle of which is adjustable with respect to the three phase lines FR by means of reversible motor RDM through suitable gearing.

If a change of offset to simultaneous has just now been called for by the master controller by operation of relay SIM the potentiometer PO5 will be in transition to the simultaneous offset condition for the local controllers, and will be driven by the motor RDM gradually from its prior position of prior offset toward the new position matching in phase the simultaneous offset in the nearest direction, thus speeding up or slowing down the actual local time cycle respectively for decreased or increased offset angle in the nearest percentage change direction. However, for purposes of the present it will be assumed that the potentiometer PO5 has already reached its rest condition matching potentiometer PO4 for simultaneous offset, with the time cycle of the controller matching the length of the master time cycle, i.e. the time spacing between phase coincidence between the wave energies on lines FR and FC.

When the local controller is at rest the wiper arms of the several banks of the rotary stepping switch would be in position 1.

Wiper arm A1 of bank A in FIG. 4a connects the resistor net work PA via line 64 to line 65 to the contact 69 of relay FRR to line 70 to transformer T1 through the input of transformer T1, line 71, to point 72 through line 73 to wiper arm B1 of bank b, position 1, through line 74 to the reference frequency line FC from the master controller.

With relay FRR deenergized, contact 75 of relay FRR is closed and its circuit is completed from resistor 121 in the pulse former PF1 in FIG. 4d through line 79, contact 75 through line 80, point 129 through line 138 potentiometer arm 124 to establish an operating bias for the grid 167 of tube 165 in the coincidence gate CG1 so that the tube 165 will be in condition to receive pulses from the pulse former PF1.

The wiper arm C1 of bank C in position 1 applies a ground connection to the timing capacitor TC to keep the timing capacitor TC discharged while the local controller is in its position 1 through a circuit from ground to position 1 of bank C through wiper arm C1 line 81, contact 82, of deenergized relay BY, line 83, contact 84, of deenergized relay AY, line 85 to point 89 to capacitor TC.

Wiper arm D1 in position 1 of bank D completes a circuit to energize the relay LO in FIG. 4a from the power supply represented by a plus in a circle through the coil of relay LO, line 91, line 90 to position 1 of start D, wiper arm D1 to ground. A connection is also completed to energize the relay AG from the power supply represented by a plus in a circle through line 94 the coil of relay AG, line 93, line 92, line 90 to position 1 of bank D, wiper arm D1, to ground. The relay AW is also energized through a circuit from the power supply represented by a plus in a circle through line 100, the coil of relay AW, line 99 to line 95, line 92, line 90 to position 1 of bank D, wiper arm D1 to ground. A parallel circuit to illuminate indicator lamp L4 is similarly completed from the power supply represented by a plus in a circle through line 100, lamp L4, line 101, lines 95, 92, 90, to position 1 of bank D, wiper arm D1 to ground.

The wiper arm E1 of bank E supplies a ground connection in position 1 to energize the relay AGR from the power supply to line 100, through the coil of relay AGR, through line 102, position 1 of bank E, wiper arm E1, line 103, to ground. Wiper arm F1 of bank F similarly supplies a ground connection to energize relay AGD from A.C. power to line 100, the coil of relay AGD, lines 109, 105 to position 1 of bank F, wiper F1, line 104, line 103 to ground.

With the relay AGD thus energized its contact 112 is closed, thereby completitntg a circuit to energize the relay RR from the A.C. power through line 100, the coil of relay RR, lines 110, 111, to contact 112, line 113, line 105, to position 1 of bank F, wiper F1, lines 104 and 103 to ground.

With the relay LO in FIG. 4a thus energized certain of its contacts close to allow a change in split at this time. However, it is assumed for the present that no change in split will occur and that split 1 remains in effect with relays SB3, SB2, and SC3 and SC2 deenergized.

The local controller is maintained in a rest condition by maintaining an open circuit for cathode 213 of the coincidence gate CG1 in FIG. 4d.

This circuit, between cathode 213 and point 119 on potential divider PDX in FIG. 4e, may be traced from the cathode 213 through lines 234, 235, contact 239 of relay CM if contact 239 is closed, through lines 240, 241, 242, point 119 on potential divider PDX, resistor R4 to ground, or from cathode 213, through lines 234, 245, 251, contact 252 of relay AW, if contact 252 is closed through lines 253, 254, 242, point 119, resistor R4 to ground or from cathode 213 through lines 234, 245, 260, contact 259 of relay BM if contact 259 is closed, through lines 255, 254, 242, point 119, resistor R4 to ground.

As illustrated, contact 239 of relay CM, contact 252 of relay AW and contact 259 of relay BM are open and therefore the circuit of cathode 213, as described is open so that the tube 205 of FIG. 4d cannot pass current to energize its associated relay MAX. Upon closure of either of the contacts 239, 252 or 259, or any or all of them the circuit for the cathode 213 will be complete and the tube 205 will be in condition to pass current as will be later described.

With such condition maintained via energized relays CM, BM and AW the local controller remains at rest with green signal *ags* illuminated for vehicle traffic on Street A green or walk signal *gas*, illuminated for pedestrian traffic on Street A to cross Street B and/or Street C, a red signal, *brs* illuminated for vehicle traffic on Street B, a red or wait signal, *rbs* illuminated for pedestrian traffic on Street B to cross Street A, a red signal *crs* illuminated for vehicle traffic on Street C and a red or wait signal *rcs* for pedestrian traffic on Street C to cross Street A.

Signal *ags* is illuminated from the A.C. input represented by a plus in a circle, through switch SS7, lines 262, 263, contact 264 of relay AGD, contact 265 of relay AGR line 269, signal *ags* to ground.

Signal *gas*, the walk signal for pedestrian traffic to cross Streets C and/or B is illuminated from the A.C. power through lines 262, 270, contact 271 of relay AW, line 272 to signal *gas* to ground. The signal *brs* is illuminated from the A.C. power via lines 262, 273, contact 274 of relay BGD, line 275, signal *brs* to ground. The signal *rbs* is illuminated from the A.C. power via lines 262, 279, contact 280 of relay BW, line 281, signal *rbs*, to ground. Signal *crs* is illuminated from the A.C. power via lines 262, 282, contact 283 of relay CGD, line 284, signal *crs* to ground.

Signal *rcs* is illuminated from the A.C. power via line 262, contact 285 of relay CW, line 289, signal *rcs* to ground.

The signal *ora*, the red overlap signal illuminated during energization of relay RR is illuminated via a circuit that may be traced from the A.C. input through switch SS7, lines 262, 262', contact 414 of relay RR, line 415, signal *ora* to ground.

The signal *ogb*, the green overlap signal illuminated during deenergization of both relays BGD and BGR, is illuminated via a circuit that may be traced from the A.C. input through switch SS7, lines 262, 273, 273', contact 395 of relay BGD, contact 391 of relay BGR, line 393, signal *ogb* to ground.

The signal *ogc*, the green overlap signal illuminated during deenergization of relays CGD and CGR, is illuminated via a circuit that may be traced from the A.C. input through switch SS7, lines 262, 282, 282', contact 423 of relay CGD, contact 424 of relay CGR, line 425, signal *ogc* to ground.

It will be noticed that each circle, representing a signal light, has a letter R, Y or G inside the circle. This letter R, Y or G indicates that the signal is R for red, Y for yellow or G for green, the conventional colors for traffic signal lights.

The relay BM would now be energized as illustrated, from the A.C. power through line 94, the coil of relay BM, lines 290, 291, contact 292 of relay BG, lines 293, 294, contact 295 of relay BD, line 299, contact 300 of relay BP to ground. The relay CM would now be energized as illustrated from the A.C. power through line 94, the coil of relay CM, lines 301, 302, contact 303 of relay CG, lines 304, 305, contact 309 of relay CD, line 310, contact 311 of relay CP to ground.

Relay BWT would now be energized from A.C. power to point 312 to the coil of relay BWT, lines 313, 314, contact 315 of relay BWT, contact 319 of relay BP, line 320, contact 321 of relay BW to ground.

Relay CWT would now be energized from the A.C. power through point 322 the coil of relay CWT line 323 contact 324, of relay CWT, contact 325 of relay CP, line 329, contact 330 of relay CW to ground.

The relay MMR would also be energized from the A.C. power, through the coil of relay MMR, line 331, contact 332 of relay MM to ground.

The rest condition of the local controller having been fully described, it shall now be assumed that the local controller has been at rest in the above described condition for an appreciable time. The pulse former PF1 and coincidence gate CG1 of FIG. 4d cannot energize the relay MAX, even though coincidence may be obtained, because the cathode circuit of tube 205 is open as previously described. When the relays BM and/or CM become deenergized, as described herein, and complete the cathode circuit through contacts of the respective relays, the relay MAX will be energized at the next coincidence response.

For the purpose of description, let us now assume that four actuations occur while the local controller is in its rest condition. The four actuations are assumed to be: (1) actuation of the vehicle detector VDB on Street B by a vehicle approaching the intersection on Street B; (2) actuation of a pedestrian pushbutton PBB by a pedestrian who wishes to cross Street A from Street B; (3) actuation of the vehicle detector, VDC, via a vehicle approaching the intersection on Street C and, (4) actuation of the pedestrian pushbutton PBC by a pedestrian who wishes to cross Street A from Street C.

When contact VDB closes, a circuit would be complete to energize relay BD from the power supply, through the coil of the relay BD, lines 333, 334, closed contact VDB to ground. When relay BD is energized, its contact 295 opens to break the energizing circuit for relay BM as previously described so that the relay BM would become deenergized and close its contact 335. Relay BD remains energized through a circuit from the power supply, through the coil of relay BD, lines 333, 339, contact 335 of relay BM to ground. Relay BM remains deenergized because of open contact 295 of relay BD caused by energization of relay BD via actuation of vehicle detector VDB. Relay BD now remains energized through the circuit previously described because relay BM remains deenergized. The circuit of cathode 213 of FIG. 4d would now be complete to close contact 259 as previously described.

Whenever the relay BD is energized a circuit is completed to illuminate the indicator lamp L5 via a circuit that may be traced from the A.C. input through indicator lamp L5, line 347, contact 346 of relay BD to ground.

Actuation of pedestrian pushbutton PBB would cause relay BP to become energized via a circuit from the power supply through the coil of relay BP, point 338, line 340, pedestrian pushbutton PBB to ground.

When relay BP is energized, contact 319 of relay BP opens breaking the energizing circuit for relay BWT, as previously described, and contact 342 of relay BP closes to lock in relay BP via a circuit from the power supply to the coil of relay BP through point 338, line 341, contact 342, line 320, contact 321, of relay BW to ground.

Relay BP opens its contact 300 which in absence of the energizing of relay BD would have opened the energizing circuit of relay BM and also cause relay BM to become deenergized.

Whenever relay BP is energized a circuit is completed from the A.C. input, through indicator lamp L6, line 306, contact 307 of relay BP to ground to illuminate indicator lamp L6.

When contact VDC closes, a circuit would be complete to energize relay CD from the power supply through the coil of the relay CD, through lines 343, 344, contact VDC to ground. When relay CD is energized its contact 309 is open to break the energizing circuit for relay CM as previously described so that the relay CM would become deenergized and close its contact 345. Relay CD remains energized after contact VDC opens as it is now energized, via a circuit from the power supply through the coil of relay CD, lines 343, 349, contact 345 to ground. Relay CD remains energized and holds its contact 309 open to keep relay CM deenergized. Whenever relay CD is energized indicator lamp L7 is illuminated from the A.C. input through indicator lamp L7, contact 348 of relay CD to ground.

With relay CM deenergized its contact 239 is closed so that if relay BM had not been deenergized as previously explained to complete the circuit of cathode 213 of FIG. 4d, such circuit would now be complete through a parallel connection formed by closure of contact 239 of relay CM, a circuit having been previously described.

With actuation of the pedestrian pushbutton PBC of phase C the relay CP is energized via a circuit from power supply through the coil of relay CP, line 352, pushbutton PBC to ground. Energized relay CP opens its contact 325 to break the energizing circuit for relay CWT as previously described. Relay CP also opens its contact 311 which contact in absence of the opening of contact 309 of energized relay CD would open the energizing circuit for relay CM as previously described.

When the relay CP becomes energized it closes its contact 357 to complete a lock in circuit that can be traced from the current supply thru the coil of relay CP, line 356, contact 357 of relay CP, line 329, contact 330 of relay CW to ground.

With the relay CP energized a circuit is completed to illuminate the indicator lamp L8 from the A.C. input through indicator lamp L8, contact 316 to ground.

It should be noted that, as described above, both relays BD and CD are energized via circuits completed through the respective contacts of deenergized relays BM and CM respectively. It is worthy to note at this time that should the pedestrian pushbuttons PBB and PBC of the respective phases B and C, have been actuated with an absence of actuation on the vehicle detectors VDB and VDC during such rest condition of the local controller, the energization of relay BP would cause deenergization of relay BM which in turn would cause energization of relay BD and the energization of relay CP would cause deenergization of relay CM which in turn would cause energization of relay CD through circuits previously described, all of which is more fully described below.

The circuit of cathode 213 in FIG. 4d would now be complete from cathode 213 through lines 234, 235, contact 239 of relay CM, lines 240, 241, 242, point 119, resistor R4 to ground, and through a parallel circuit of cathode 213 through lines 234, 245, 260, contact 259 of relay BM, lines 255, 254, 242, point 119, resistor R4 to ground.

With completion of the cathode circuits, the tube 205 may now permit the coincidence gate CG1 to pass current to energize relay MAX in FIG. 4d. The relay MAX thus energized closes its contact 353, to complete a circuit to ground for motor magnet MM from the power supply, indicated by a plus, in a circle, through the coil of the motor magnet MM, lines 359, 360 contact 353 of relay MAX to ground.

The motor magnet thus energized would notch a step by step ratchet gear (not shown) and upon the motor magnet being deenergized, the ratchet wheel would be partially rotated to advance the wiper arms of the rotary stepping switch, in unison to the next position 2. However, upon energization of the motor magnet MM the motor magnet attracts its contact 118 which contact closes a discharge circuit for capacitor 120, the circuit being completed from the upper side of the capacitor 120 through resistor R6, contact 118 of relay MM to ground. Upon energization of the motor magnet MM its contact 332 is opened breaking the energizing circuit of relay MMR, previously described. With the discharge of capacitor 120 the control grid of the coincidence gate tube 165 of coincidence gate CG1 is biased off beyond cutoff so that the tube 165 no longer passes current. With such blocking of plate current through the tube 165 the coincidence gate CG1 can no longer produce an output through its tube 205. The relay MAX becomes deenergized and opens its contact 353, thereby opening the energizing circuit of motor magnet MM which motor magnet MM in turn upon deenergization opens its contact 118, closes its contact 332 and advances the ratchet wheel to partially rotate and advance the wiper arms of the rotary stepping switch, in unison.

With the wiper arms in position 2 of the rotary stepping switch, the wiper arms A1, and B1 of the banks A and B respectively are grounded so that there is no input to the pulse former PFI of FIG. 4d. Positions 3, 4, 5, 6, 8, 9, 10, 12, and 13 are also grounded at these banks A and B to insure timing of the intervals via the pretimed adjustable resistors.

The wiper arm C1 of the bank C, in position 2 connects the timing adjustable resistor TP1, connected at PD+ to a tap on the potential divider PDX so that a circuit is now complete from D.C. input, represented by a plus in a square, via the potential divider PDX at a point PD+ through minimum resistor R12, potentiometer TP1, tap 362, line 363 to position 2 of bank C, wiper arm C1, line 81, contact 82 of relay BY, line 83, contact 84 of relay AY, line 85, point 89 to charge timing capacitor TC.

The wiper arm D1 of bank D in position 2 is not connected for relays LO, AG and AW, the circuits being previously described.

Positions 1, 2 and 3 of bank E are jumpered together so that the energizing circuit for the relay AGR, previously described, would be maintained through position 2 of bank E, as well as position 3 of bank E.

Positions 1, 2, 3 and 4 of the bank F are jumpered together so that the energizing circuit for the relay AGD is maintained as in position 1 of the bank F, the circuit being previously described. Relay RR also remains energized through the contacts of relay AGD as previously described.

With the relay LO deenergized its contacts 364 and 365 are open which contacts are in the energizing circuit for the relays SB3 and SB2 and SC3 and SC2 respectively, as will be described below. With the contacts 364 and 365 open, the "split" in which the local controller is then operating may not change. The relay LO will remain deenergized during all positions of the rotary stepping switch except position 1, in which it is energized, as described above. Therefore, a change of "split" on the local controller may take place only when the stepping switch is in position 1, thereby energizing the relay LO, all of which will be more fully described below.

The relay AG becomes deenergized in position 2 but has no effect on the local controller at this time. This relay AG remains deenergized in position 2 through 13 as it is only energized in position 1 through bank D.

With relay AW deenergized the contact 252 closes so that the cathode circuit of the cathode 213 would now be complete through contact 252 of the circuit previously described. The contact 271 of relay AW is opened to break the illuminating circuit for the signal *gas* thereby extinguishing such signal while contact 369 of relay AW is closed to illuminate signal *ras* from the A.C. power supply through switch SS7, lines 262, 270, contact 369 line 370, signal *ras*, to ground. Thus the green signal *gas* for pedestrian traffic crossing Street B and/or Street C is extinguished and the red signal *ras* to pedestrian traffic crossing Streets B and/or C is illuminated.

The interval now being timed would be pre-set and timed through the potentiometer TP1 so that when the charge on the capacitor TC approaches the breakdown potential of the flasher tube FA, the tube FA will pass current from the capacitor TC to energize the relay INT. Energized relay INT would close its contact 371 to supply a ground connection for the motor magnet MM to complete an energizing circuit for the power supply, through the motor magnet MM, contact 371 of relay INT to ground.

The motor magnet MM would notch the ratchet (not shown) upon energization and would also close its contact 361 to discharge timing capacitor TC from point 89 through contact 361 to ground, thus reducing the charge on the capacitor TC to substantially zero with respect to ground.

With the charge on the timing capacitor TC so reduced, the passage of current through the tube FA stops and the relay INT is deenergized. The energizing circuit for a motor magnet MM is broken with a release of the contact 371 of the relay INT, and the motor magnet becomes deenergized and advances the wiper arms of the several banks of the rotary stepping switch to the next position, position 3.

The position 3 is a skip position and a circuit is completed to rapidly charge the timing capacitor TC from D.C. supply through resistor R14, position 3 of bank C, wiper arm C1, line 81, contact 82 of relay BY, line 83, contact 84 of relay AY, line 85, point 89 to timing capacitor TC. The timing capacitor TC being rapidly charged quickly reaches the breakdown potential of the flasher tube FA and the tube FA passes current from the capacitor TC to energize the relay INT as previously explained.

The energizing circuit INT closes its contact 371 to complete the energizing circuit for the motor magnet MM and as previously described the advance of the wiper arms of the rotary stepping switch takes place and the wiper arms advance from position 3 in unison to position 4.

It should be noted that with each energization of the motor magnet MM the contact 118 closes as previously described. However, the effect of the closure of contact 118 of the motor magnet MM upon the capacitor 120 only effects the local controller timing in certain positions of the rotary stepping switch as will be described hereinafter. Furthermore, each time the motor magnet MM is energized the energizing circuit for the relay MMR is opened at contact 332 of the motor magnet MM. Upon deenergization of the motor magnet MM the energizing circuit for the relay MMR is again completed as contact 332 of motor magnet MM closes. Such change of status of the relay MMR has no effect in the local controller at this time.

A second circuit through position 3 of bank D applies a ground connection to the motor magnet MM through the lines 359, 379, contact 375 of relay MMR, lines 374, 373, position 3 of bank D, wiper arm D1, to ground. With two such circuits, as previously described, to cause the energization of the motor magnet MM the rapid advancement of the rotary stepping switch arms is assured.

While in position 4 the wiper arm C1 of bank C is not connected to the circuit. However, the wiper arm D1 of bank D supplies a ground connection to complete the energizing circuit for relay AY from the A.C. power line 94 through the coil of relay AY, line 380, position 4 of bank D, wiper arm D1 to ground.

Wiper arm E1 of bank E, when in position 4, opens the energizing circuit for the relay AGR, thereby causing relay AGR to become deenergized while the wiper arm supplies a ground connection for relay BGR, the circuit being complete from the A.C. power through line 100, the coil of relay BGR, line 382, contact 383 of deenergized relay BS, line 602 position 4 of bank E, wiper arm E1 to ground.

With relay AGR now deenergized, its contact 265 opens and its contact 389 closes, thereby extinguishing the signal *ags*, via open contact 265 and illuminating signal *ays* via a circuit from the A.C. power through switch SS7, line 262, line 263, contact 264 of relay AGD, contact 389 of relay AGR, line 390, signal *ays* to ground. The signal *ays* is a caution or clearance signal for vehicle traffice on Street A. The energized relay BGR opens its contact 391 and closes its contact 392 to extinguish signals *ogb* at open contact 391 and illuminate the signal *oyb* the yellow vehicle overlap signal, from the A.C. power supply through switch SS7, lines 262, 273, 273′, contact 395 of relay BGD, contact 392 of relay BGR, line 394 signal *oyb* to ground.

With relay AY energized, its contact 84 opens and its contact 381 closes, the closure of which completes a circuit to charge the timing capacitor TC from the PD+ through timing potentiometer TP6 and its minimum resistor below, line 385, contact 381 of relay AY, line 85 through point 89 to capacitor TC. At the termination of the time interval the wiper arms are advanced to the next position (5) as previously described.

In position 5 the relay BGD is energized from the A.C. power supply to line 100, the coil of relay BGD, line 401, contact 402 of relay BS, line 403, position 5 of bank F, wiper F1 to ground while relay BW is energized from the A.C. power supply through line 100, the coil of relay BW, line 408, contact 409 of relay BWT, line 410, position 5 of bank D, wiper D1 to ground.

Relay AGD is deenergized as wiper F1 moves to position 5 of bank F to open the energizing circuit for the relay AGD as previously described. Relay RR also becomes deenergized via the advance of the wiper arm F1 to position 5, bank F.

Relay AY becomes deenergized as wiper arm D1 moves to position 5 of bank D to open the energizing circuit for the relay AY as previously described.

Relay BWT becomes deenergized as relay BW becomes energized and opens its contact 321.

When relay AGD becomes deenergized its contact 264 opens to break the illuminating circuit for signal *ays* while its contact 412 closes to complete a circuit to illuminate signal *ars*, the red signal for vehicle traffic on Street A from the A.C. power supply through switch SS7, line 262, line 263, contacts 412 of relay AGD, line 413, signal *ars* to ground. When relay RR became deenergized the circuit was complete to illuminate the signal *oga*, the overlap vehicle green signal, while contact 414 opened to extinguish signal *ora*. The illuminating circuit for signal *oga* is completed from the A.C. power supply through line 262′, contact 418 of relay RR, line 419, contact 420 of relay AGR, line 416, signal *oga* to ground. The signal *ora* is extinguished via an open circuit at contact 414 of relay RR.

The signals *brs* and *rbs* are extinguished by the opening of the contacts 274 of relay BGD and contact 280 of relay BW respectively, while signals *bgs*, the go signal for vehicle traffic and signal *gbs*, the walk signal for pedestrian traffic, are illuminated via circuits that may be traced from the A.C. power supply to switch SS7, lines 262, 273, 273′, contact 428 of relay BGD, contact 429 of relay BGR, line 430, signal *bgs* to ground to illuminate signal *bgs* and from the A.C. power supply to switch SS7, lines 262, 279, contact 433 of relay BW, line 434, signal *gbs* to ground. Signal *orb* illuminated while relay BGD is energized, is illuminated via a circuit from the A.C. input, thru switch SS7, lines 262, 273, contact 267 of relay BGD, line 268, signal *orb* to ground. The indicator lamp L17 is also illuminated via a circuit that can be traced from the A.C. input thru switch SS7, lines 262, 273, 273′, contact 428 of relay BGD, contact 429 of relay BGR, indicator lamp L17 to ground.

The timing capacitor TC is charged from the D.C. power supply through the potential divider PDX, some point on the potential divider PDX here called PD+ through point PD+ through timing adjustable potentiometer TB1, and its minimum resistor below, line 435, contact 439 of relay SB2, contact 440 of relay SB3, line 441, position 5 of bank C, wiper arm C1, line 81, contact 82 of relay BY, line 83, contact 84 of relay AY, line 85, the timing capacitor TC to time the green walk interval.

When the timing capacitor TC becomes sufficiently charged the flasher tube FA will pass current and effect the advance of the wiper arms to the next position (position 6), as previously described.

With the wiper arms of the rotary stepping switch in position 6 no additional relays are energized at this time, however relay BW is deenergized as wiper arm D1 advances from position 5 to position 6 of bank D.

The phase B pedestrian clearance interval is now timed by charging the timing capacitor TC through the point PD+ on the timing adjustable resistor TP9, line 442, contact 443 of relay BWT, line 444, position 6 of bank C, wiper arms C1, line 81, contact 82 of relay BY, line 83, contact 84 of relay AY, line 85 to the timing capacitor TC.

With relay BW now deenergized, the signal *gbs* becomes extinguished by the opening of contact 433 while signal *rbs* is illuminated as previously described. When the timing capacitor TC becomes sufficiently charged, as previously explained, the wiper arms of the rotary stepping switch are advanced in unison to position 7.

In position 7 the relays BM and BG are energized through position 7 of bank D, the relay BM being energized from the A.C. power through line 94, the coil of relay BM lines 290, 445, contact 449 of relay MAX, lines 450, 293, contact 451 of relay BG, line 452, contact 453 of relay MMR lines 454 and 455 to position 7 of bank D through wiper arm D1 to ground while relay BG is energized via a circuit from the A.C. power through line 94 the coil of relay BG, lines 456, 455, position 7 of bank D, wiper arm D1 to ground.

The relay BD is deenergized when relay BM becomes energized because the contact 335 of relay BM, which contact is in the energizing circuit of relay BD, is now open.

The interval timed in position 7 is the phase B vehicle interval. However, since the phase B vehicle interval is extendible a background interval is also timed which will time the maximum time that the local controller is permitted to remain in its position 7 before advancing to position 8. This background time interval is usually referred to as the maximum time interval.

The extendible vehicle interval is timed by the charging of capacitor TC from the terminal PD+ in the timing adjustable potentiometer TP2, with a minimum resistor below, through lines 459, point 461, line 460, position 7 of bank C, wiper arm C1, line 81, contact 82 of relay BY, line 83, contact 84 of relay AY, line 85 to timing capacitor TC.

If while the vehicle interval is thus being timed, a vehicle should cross the vehicle detector VDB the relay BD would be energized as previously described. The relay BD would close its contact 463. Closure of contact 463 would connect point 461 to ground via line 462, resistor R16 and contact 463. Since point 461 is on the charging side of capacitor TC in the charging circuit as previously traced, it is understood that such completion of the ground connection to point 461 is sufficient to discharge the timing capacitor TC through the resistor, to substantially zero with respect to ground, thereby effectively extending the time of the vehicle interval.

While the resettable vehicle interval timer is connected as previously described, a maximum limit control circuit is also connected in position 7 through banks A and B, which determines the extension limit of Street B green on the basis of a percentage of the cycle controlled by the "split" in effect at the time. Herein it has been assumed that "split" 1 is in effect so that the potentiometer PB1, of "split" 1 would control the percentage based limit. The input of potentiometer PB1 is connected to the three phase cycle lines FC from the master and the output of potentiometer PB1 of a single phase voltage is connected to the input of pulse former PF1 via line 464, contact 465 of relay SB2, contact 469 of relay SB3, line 470, wiper arm A1, in position 7 of bank A, line 65, contact 69 of relay FRR, line 70, the coil of transformer T1, line 71, point 72, line 73, wiper arm B1, in position 7 of bank B, line 471, contact 472, of relay SB3, contact 473 of relay SB2, line 474 to potentiometer PB1.

Actuations of the vehicle detector VDB during the extendible vehicle interval would cause additional discharging of the timing capacitor TC so that the time in the Street B green position may be extended. In the absence of the actuations on the detector VDB, or if the actuations sufficiently fall apart, the timing of capacitor TC will charge sufficiently to reach the breakdown potential of tube FA so that the charge on the capacitor TC will pass through the tube FA and energize the relay INT, to effect the advance of the stepping switch to its next position. However, if multiple actuations of the vehicle detector should keep the capacitor TC from becoming charged to the breakdown potential of the tube FA, then the maximum limit control will terminate the interval at the predetermined percentage point of the cycle set by the potentiometer PB1. The output of the potentiometer PB1 would be applied to the pulse former PF1, while the output of potentiometer PO5 would be applied to the pulse former PF2, and compared in the coincidence gate circuit CG1. At the predetermined percentage point of the cycle determined by the coincidence gate CG1, tube 205 would pass current to energize relay MAX. Relay MAX would close its contact 353 to complete a ground connection for the motor magnet MM as previously described. The relay MAX would also open its contact 449, to break the energizing circuit for relay BM as previously described. With a relay BM thus deenergized its contact 335 will close to complete a ground connection to energize relay BD as previously described. The energization of this relay BD has the effect leaving a call for vehicle right of way return to Street B in the next cycle.

The return circuit for cathode 213 of tube 205 in CG1 was completed in position 2 over contact 252 of relay AW, the circuit being previously described. This cathode return circuit remains completed until the rest position 1 is reached at which time the relay AW is operated to open its contact 252 at which point the cathode return circuit depends on closure of parallel circuits via contact 259 of relay BM or contact 239 of relay CM. It was assumed above that the Street B green interval was terminated by the relay MAX being energized via the percentage maximum limit, thus having energized the relay BD as previously described. If, however, the interval timed in position 7 of the stepping switch had been terminated by the action of the relay INT as previously described, prior to the maximum limit the contact 449 of relay MAX would not be opened since the relay MAX would not have been energized. Thus the energizing circuit for the relay BM would remain complete thereby keeping the contact 335 of relay BM open and in turn keeping the energizing circuit for the relay BD opened.

It will be assumed that no further actuations are received and that the local controller was advanced via the energization of relay INT, to the next position (position 8).

When the local controller advances into position 8, relays BG and BGR both become deenergized. The energizing circuit for relay BG is opened when the wiper arm D1 of bank D advances from position 7 to position 8 of bank D and the energizing circuit for relay BGR is opened when the wiper arm E1 of bank E advances from position 7 to position 8 of bank E.

Relay BY is energized through a circuit from the A.C. power supply through line 94, the coil of relay BY, point 475, line 479, position 8 of bank D, wiper arm D1 to ground. Relay CGR is energized via circuit from the A.C. power supply through line 100, the coil of relay CGR, line 480, contact 481 of relay CS, line 482, position 8 of bank E, wiper arm E1, line 103, to ground. Through the deenergization of relay BGR the green signal *bgs* is extinguished as contact 429 of relay BGR opens and signal *bys*, the yellow clearance signal for phase B vehicle traffic is illuminated via a circuit from the A.C. power supply through switch SS7, lines 262, 273, 273', contact 428 of relay BGD, contact 483 of relay BGR, line 484, signal *bys* to ground.

When the relays CGD and CGR are both deenergized, a circuit is complete to illuminate the overlap signal *ogc*, from the A.C. input through switch SS7, lines 262, 282, 282', contact 423 of relay CGD, contact 424 of relay CGR, line 425, signal *ogc* to ground.

With relay CGD deenergized and the relay CGR energized, the signal *ogc* is extinguished by open contact 424 of relay CGR and the signal *oyc* is illuminated via a circuit that can be traced from the A.C. input through switch SS7, lines 262, 282, 282', contact 423, contact 376 of relay CGR, line 377, signal *oyc* to ground.

The clearance interval of the local controller is timed by charging the timing capacitor TC from the D.C. current supply through the potentiometer TP7 point PD+, through the timing adjustable resistor TP7 with its minimum resistor below line 485, contact 489 of relay BY, line 83, contact 84 of relay AY, line 85, to the timing capacitor TC. At the termination of the interval as timed by the charging of timing capacitor TC the wiper arms are advanced in unison to the next position (position 9) as previously described.

In position 9 relays BGD, CP and BY are deenergized and relays CGD and CW are energized.

The relay CGD is energized via a circuit from A.C. power supply through line 100, the coil of relay CGD, line 490, contact 491 of relay CS, line 492, position 9 of bank F, wiper arm F1, lines 104, 103, to ground.

Relay CW is energized via a circuit from the A.C. power supply through line 100, the coil of relay CW, line 493, contact 494 of relay CWT, line 495, to position 9 of bank D, wiper arm D1, to ground.

The relay CP is deenergized when the energized relay CW opens its contact 330 and breaks the energizing circuit of the relay CP. The relay BY is deenergized when the wiper arm D1 advances from position 8 to position 9, thereby opening the energizing circuit of the relay BY. The relay BGD is deenergized when the wiper arm F1 advances from position 8 to position 9 of bank F and opens the energizing circuit for the relay BGD.

The interval in position 9 of the rotary stepping switch is timed by charging the timing capacitor TC through a point PD+ on the potential divider PDX through the adjustable timing resistor TC1 with its minimum resistor below through line 500, contact 501 of relay SC2, contact 502 of relay SC3, line 503, position 9 of bank C, wiper arm C1, line 81, contact 82, line 83, contact 84, line 85, to timing capacitor TC.

With the relay BGD deenergized, the signal *bys* is extinguished by opening the illuminating circuit at contact 428 of relay BGD. The signal *brs* is illuminated by the closure of contact 274 of relay BGD, the circuit having been previously described. With both relays BGD and BGR now deenergized the overlap signal *ogb* is illuminated via a circuit from the A.C. input through switch SS7, lines 262, 273, 273', contact 395 of relay BGD, contact 391 of relay BGR, line 393, signal *ogb* to ground. The signal *orb* is extinguished via the opening of contact 267 of relay BGD. With both relay CGD and CGR now energized the overlap signal *oyc* is extinguished at open contact 423 of relay CGD and overlap red signal *orc* is illuminated via a circuit from the A.C. input through switch SS7, lines 262, 282, contact 404 of relay CGD, line 405, signal *orc*, to ground.

The signal *cgs*, the green signal for phase C vehicle traffic, and the signal *gcs*, the green or walk signal for phase C pedestrian traffic, are illuminated, the illuminating circuit for signal *cgs* is completed from the A.C. power supply through switch SS7, lines 262, 282, 282′, contact 504 of relay CGD, contact 505 of relay CGR, line 509, signal *cgs* to ground. The signal *gcs* is illuminated via a circuit from the A.C. power supply through switch SS7, line 262, contact 510 of relay CW, line 511, signal *gcs* to ground.

When the timing capacitor TC is charged through circuits previously described, so that the charge on the timing capacitor TC reaches the breakdown potential of the tube FA, the tube FA would pass current, as previously described, and the wiper arms of the several banks of the rotary stepping switch will be advanced to the next position (position 10) as previously described.

In position 10 the relay BWT is energized and the relay CW is deenergized. The relay BWT is energized via a circuit from the A.C. power through point 312, the coil of relay BWT, line 313, line 512, to position 10 of bank D, wiper arm D1 to ground. The relay CW is deenergized as the wiper arm D1 of bank D is advanced from position 9 to position 10, thereby opening the energizing circuit for the relay CW.

The interval timed in position 10 is timed by charging timing capacitor TC from the PD+ to timing potentiometer TP13, with its resistor below, through the line 508, contact 513, of relay CWT, line 514 to position 10 of bank C, wiper arm C1, line 81, contact 82, line 83, contact 84, line 85 to timing capacitor TC. With relay CW deenergized, the signal *gcs* is extinguished by opening of its illuminating circuit at contact 510 and signal *rcs* is illuminated by closure of its contact 285, both contacts on the relay CW. At the termination of the interval timed through the circuit previously described, the wiper arms will advance to the next position (position 11) as previously described.

In position 11 the relay CG and CM are both energized. Relay CD is deenergized via open contact 345 of relay CM.

The relay CG is energized via a circuit from the A.C. power supply through line 94, the coil of relay CG, line 515, line 519, position 11 of bank D, wiper arm D1, to ground. The relay CM is energized via a circuit completed from the A.C. power supply via line 94 to the coil of relay CM through line 301, 520, contact 521 of relay MAX, line 522, line 304, contact 569 of relay CG, line 570, contact 571 of relay MMR, line 572, line 519 to position 11 of bank D, wiper arm D1 to ground. Position 11 is the extendible vehicle interval of phase C, extendible during such period by actuations of the phase C vehicle detector VDC. As in position 7, the phase B extendible vehicle interval, there are timed in position 11 two means of timing control through separate circuits. The vehicle interval timer, which is extendible, is timed through the terminal PD+ through adjustable timing resistor TP3, line 523, point 524, position 11 of bank C, wiper arm C1, line 81, contact 82, of line 83, contact 84, line 85 to capacitor TC. While the resettable vehicle interval timer for phase C is connected as previously described, the maximum limit control circuit for this phase C interval is connected in position 11 through banks A and B, which determine the extension limit of the Street C green on the basis of a percentage of the cycle controlled by the "split" in effect at the time. As previously stated, it has been assumed that "split" 1 is in effect so that in the phase C the potentiometer PC1, of split 1, phase C will control the percentage basis. The input of the potentiometer PC1 is connected to the three phase cycle line FC from the master and the output of the potentiometer PC1, of a single phase voltage is connected through line 526, contact 527 of relay SC2, contact 525 of relay SC3, line 529, to position 11 of bank A, wiper arm A1, line 65, contact 69 of relay FRR, line 70, to the primary coil of transformer T1, line 71, to point 72, line 73 to wiper arm B1, position 11 of bank B, line 530, contact 531 of relay SC3, contact 532, of relay SC2, line 533 to potentiometer PC1.

With the passage of a vehicle across the vehicle detector VDC of phase C the relay CD would become energized through a circuit as previously described thereby closing its contact 534, closure of contact 534 of relay CD places a ground connection on point 524 previously mentioned in the charging circuit for the timing capacitor TC via line 535 and resistor R18, thereby discharging the capacitor to substantially zero with respect to ground. When the contacts VDC would reopen the relay CD would again become deenergized to open its contact 534 and break the discharge circuit of the timing capacitor TC so that the timing capacitor TC would begin to recharge to retime this "vehicle interval."

Subsequent actuations of the vehicle detector VDC would cause additional discharging of the timing capacitor TC so that the time in the phase C green position 11 may be extended. In absence of actuations on the vehicle detector, or if actuations are sufficiently far apart the timing capacitor TC will charge sufficiently to reach the breakdown potential of the tube FA so that the charge on the capacitor TC will pass through the tube FA and energize the relay INT, to effect advance of the stepping switch to its next position, position 12.

However, if multiple actuations of the vehicle detector VDC during the interval timed in position 11 should keep capacitor TC from becoming charged to the breakdown potential of the tube FA, then the maximum limit control will terminate the interval at the predetermined percentage point of the cycle, set by the potentiometer PC1. The output of the potentiometer PC1 would be applied to the pulse former PF1 while the output of the potentiometer PO5 would be applied to the pulse former PF2 and when in coincidence the coincidence gate circuit CG1 at the predetermined percentage point of the cycle determined by such coincidence gate CG1 would pass current to energize the relay MAX. Relay MAX would close its contact 353, to complete a ground connection for motor magnet MM as previously described. The relay MAX would also open its contact 521, in the energizing circuit for the relay CM as previously described and the relay CM would become denergized and close its contact 345 thereby energizing the relay CD through a circuit as previously described including contact 345 of relay CM. This reaction of energizing the relay CD will release the relay CM and will leave a vehicle call for return of right of way to Street C in the next cycle.

Immediately above it was assumed that the phase C green interval was terminated by the MAX relay on the percentage maximum limit, thus having relay CM deenergized and relay CD energized.

If, however, the interval timed in position 11 of the stepping switch had not been terminated by action of the relay MAX but had instead been terminated by action of the relay INT prior to the maximum limit, the contact 521 of the relay MAX would not have been opened and the relay CM would have remained energized while the relay CD would remain deenergized since its energizing circuit through the contact 345 would remain open.

It will be assumed that no further actuations are received and that the local controller was advanced via the energization of the relay INT to the next position (position 12).

In position 12 the relay AGR is energized and relay CGR is deenergized, each effected by the advance of the wiper arm E1 from position 11 to position 12 of bank E.

The relay AGR is energized via a circuit from the A.C. supply via line 100 through the coil of relay AGR, lines 102, 539 to position 12 of bank E, wiper arm E1, line 103 to ground. Relay CGR is deenergized by advance of the wiper arm E1 of bank E to position 12 of bank E from position 11.

With relay CGR deenergized its contact 505 opens to extinguish the signal *cgs*, and contact 540 of relay CGR closes to illuminate the signal *cys* via a circuit from the A.C. power through switch SS7, lines 262, 282, 282', contact 504 of relay CGD, contact 540 of relay CGR, line 541, signal *cys* to ground.

This interval, the phase C vehicle clearance interval, is timed by charging the timing capacitor TC through the terminal PD+, the timing adjustable resistor TP4, line 542, position 12, of bank C, wiper arm C1, line 81, contact 82, line 83, contact 84, line 85, to timing capacitor TC, to cause the advance of the wiper arms, as previously described.

In position 13 with switch SS8 closed, as illustrated, the relays RR, AGD and CWT are energized. Relay RR is energized from the A.C. power supply through line 100, the coil of relay RR, line 110, line 543, position 13 of bank F, wiper arm F1, lines 104, 103, to ground while relay AGD is energized from the A.C. power supply through line 100, the coil of relay AGD, line 109, line 113, switch SS8, contact 544 of relay RR, lines 545, 110, 543, position 13 of bank F, wiper arm F1, line 104, line 103 to ground.

Relay CWT is energized from the A.C. power supply through point 322, the coil of relay CWT, line 549, position 13 of bank D, wiper arm D1 to ground.

Relay CGD is deenergized as wiper arm F1 of bank F advances from position 12 of bank F to position 13. With the relay CG deenergized, its contact 504 is opened to open the illuminating circuit for the signal *cys*, thereby extinguishing such signal while contact 283 of relay CGD closes to complete a circuit previously described, to illuminate signal *crs*, the phase C red vehicle signal.

Position 13 may be employed as an all-red position or a skip position during which a green vehicle and green or walk-pedestrian signals of phase A will be displayed. With closure of switch SS8, the all red signals are eliminated and the green phase A vehicle and pedestrian signals are illuminated.

The interval timed in position 13 is timed by charging timing capacitor TC through the terminal PD+, timing adjustable potentiometer TP5, line 550, position 13 of bank C, wiper arm C1, line 81, contact 82, line 83, contact 84, line 85 to timing capacitor TC.

When the all-red signals that may be illuminated during position 13 are eliminated, the timing adjustable potentiometer TP5 would be turned down so that the timing capacitor TC is rapidly charged so that the position 13 in effect, becomes a skip step, and the local controller advances rapidly into position 1, the rest position.

If, however, it is desired to display all-red signals in position 13 the switch SS8 would be opened and the relay AGD would not be energized in position 13 because of open switch SS8, which switch is in the energizing circuit for relay AGD, as previously described. With relay AGD thus deenergized, its contact 412 would remain closed to keep the signal *ars*, the red signal for vehicle traffic on phase A, illuminated.

At termination of the interval as timed in position 13, the stepping switch would be advanced to the next position (position 1) and the local controller would resume its rest position as originally assumed.

If the all-red signals were displayed in position 13, the relay AGD will be energized in position 1 as previously described, and the red signal *ars* would be extinguished and the green signal *ags* would be illuminated all as previously described.

Since it has been previously assumed that both phase B vehicle interval (position 7) and phase C vehicle interval (position 11) were both terminated via the minimum vehicle interval timer rather than the maximum time control associated with the respective positions there is now no recall for a phase on the local controller at the present time. The local controller will now rest in its position 1, the phase A green position and await further demands of traffic via actuation of vehicle detector VDB for vehicle traffic of phase B, push-button PBB for pedestrian traffic on phase B, actuation of vehicle detector VDC for vehicle traffic on phase C, or actuation of PBC via pedestrian traffic on phase C, any one of which will initiate a cycle of the local controller from its rest position (position 1). In each case the initiation of the cycle also requires coincidence gate operation at the desired percentage point as previously explained.

In FIG. 4e, represented by the circles labeled *ora, oya, oga, orb, oyb, ogb, orc, oyc* and *ogc*, are the overlap signals associated with the phases A, B, and C. It has been explained how and under what conditions the signals are illuminated.

It is obvious that any set or all three sets of the overlap signals may be employed at an intersection as the science of traffic control demands for the controlled intersection.

The overlap red signal *ora* of phase A will be illuminated, for example when the vehicle green and vehicle yellow signals, *ags* and *ays* respectively are displayed. When the vehicle red signal, *ars*, of phase A is illuminated the green overlap, *oga*, signal will be displayed, and just prior to termination of the signal *ars* the yellow overlap, *oya*, signal will be displayed.

The use and display of the overlap signals are dictated by the science of traffic control as applied to the intersection controlled by the local controller. In general it may be said that the overlap signals of phase A for example, would give right of way to traffic that would be considered non-interfering at all times except when the vehicle green and vehicle yellow signals are being displayed and at that time would be considered interfering traffic. A phase A green overlap signal would remain green during the phase B vehicle green and yellow signals and the phase C vehicle green signal, while the phase A yellow overlap signal would be displayed during the phase C vehicle yellow signal.

If the phase B were skipped of course the phase A overlap green signal would be displayed during the phase C vehicle green signal only and the overlap yellow displayed during the phase C vehicle yellow. If, however, the phase C were skipped then the phase A overlap green would be displayed during the phase B vehicle green and the overlap yellow signal would be displayed during the phase B vehicle yellow signal.

The phase B overlap signals would have the same relation to phase A and C as the phase A overlap signals have to phase B and C while the phase C overlap signals are related to the phases A and B.

Let us now assume that the local controller has remained in its rest position for an appreciable length of time and that an actuation of the phase B vehicle detector VDB, is now received. It will be further assumed that during the ensuing cycle no further actuations are received by the local controller due to an absence of both vehicle and pedestrian traffic on Streets B and C.

The rest position (position 1) of the local controller is, as previously described, held at rest by the open circuit of the cathode 213 with relays energized and deenergized as previously described and with right of way accorded to Street A vehicle and pedestrian traffic.

When the actuation of the phase B vehicle detector VDB occurs, the contact VDB, representing the phase B vehicle detector, closes and the relay BD is energized through the contacts as previously described. With relay BD thus energized its contact 295 opens and breaks the energizing circuit for relay BM thus causing relay BM to become deenergized resulting in closure of contact 335 of relay BM.

With the closure of contact 335 the relay BD has a shunting circuit to ground, shunting contact VDB when the contact reopens thereby keeping relay BD energized through a circuit previously described.

With the relay BM deenergized the cathode circuit for cathode 213 is completed, as previously described through contact 259 of relay BM so that when coincidence is obtained the coincidence gate CG1 will pass current to energize the relay MAX to cause advancement of the wiper arms to position 2, as previously explained.

In position 2 the relays LO, AW and AG become deenergized as previously described and the signal lights are the same as in position 2 above.

It should be noticed that in contrast to the description above that relays CM, BWT and CWT remain energized and relays BP, CD and CP are now deenergized, in the previous description the situation was reversed.

Timing of the interval through bank C, position 2 is as previously described and the advance to position 3 occurs as described above.

Position 3 is a skip-step as above described and all signals and relays remain in the same condition as in position 2 while the advance of the wiper arms is effected to position 4.

In position 4 relays AY and BGR are energized as in position 4 above and relay AGR is likewise deenergized. The signals illuminated are identical to those described in position 4 above with the interval timed as previously described relative to position 4 above.

Position 5, as here assumed, becomes a skip step; since relay BWT is energized, a circuit to energize the motor magnet MM is completed from the A.C. power, through the coil of motor magnet MM, lines 359, 379, contact 375 of relay MMR, lines 374, 551, 552, contact 553 of relay BWT, line 410, position 5 of bank D, wiper arm D1 to ground.

The advance to position 5 causes relays AY, AGD and RR to become deenergized as previously described and causes relay BGD to become energized as previously described.

The relay BW remains deenergized since contact 409 of relay BWT, in the energizing circuit of relay BW, is open. With relay BW deenergized the signal *gbs* remains extinguished and signal *rbs* remains illuminated through circuit as previously described. The signals now illuminated will show red signals for phase A vehicle and pedestrian traffic, a green signal for phase B vehicle traffic, a red signal for phase B pedestrian traffic and red signals for phase C vehicle and pedestrian traffic.

Position 6 presents no change in the relay status, as disclosed up to position 5. The timing of position 6 differs somewhat from that described previously for position 6 as the timing capacitor is now charged through terminal PD+, timing adjustable resistor TP8, line 554, contact 555 of relay BWT, line 444, position 6 of bank C, wiper arm C1, line 81, contact 82 of line 83, contact 84, line 85 to timing capacitor TC.

The advance to position 7 is effected as previously described.

In position 7 the relay BM is energized through a circuit as previously described. Relay BG is also energized and relay BD is deenergized as previously described.

Position 7 here is similar to position 7 as previously described since both minimum and maximum time controls are timed during the interval, which is the vehicle interval of phase B.

As previously described, the minimum time control is extendible up to the maximum limit which maximum limit is a percentage calculated time. The cathode circuit is now complete through the contact 252 of relay AW, as previously described.

The local controller may advance to position 8 either on the minimum or maximum timing control depending upon additional actuations on the vehicle detector VDB during such interval all as previously discussed above relative to position 7.

Let it be assumed that the vehicle interval is terminated via action of the minimum timing circuit, which circuit charges timing capacitor TC. The advance to position 8 is as previously described.

In position 8 the relay BY is energized as previously described and relay CS is energized via a circuit from the A.C. power supply through point 322, the coil of relay CS, line 558, contact 559 of relay BY, lines 560, 561, contact 562 of relay CM to ground. The relays BG and BGR are both deenergized as previously described.

With the relay CS energized positions 8, 9, 10 and 11 become skip-steps and the wiper arms advance through to position 12 where the phase B vehicle clearance interval is timed.

It will be noted in FIG. 4c that positions 8, 9, 10 and 11 of bank E are electrically joined so that a circuit completed through position 8 of bank E may be the same in positions 8, 9, 10 or 11, therefore the four skip-steps are accomplished by placing a ground on the motor magnet MM via a circuit from the A.C. power through the coil of the motor magnet MM, lines 359, 379, contact 375 of relay MMR, lines 374, 551, 563, contact 564 of relay CS, line 482, position 8 of bank D, wiper arm E1 line 103 to ground.

This circuit is opened at contact 373 of relay MMR as motor magnet MM becomes energized and opens its contact 332 to break the energizing circuit of relay MMR. As deenergized relay MMR opens its contact 375 the energizing circuit for motor magnet MM is opened thus causing MM to become deenergized. When deenergized MM closes its contact 332 thus completing the energizing circuit for relay MMR. The energizing circuit for motor magnet MM is again complete as previously described. This entire reaction occurs in positions 8, 9, 10 and 11 causing the rapid advancement of the wiper arms of the several banks of the rotary stepping switch to reach position 12 while all signals and other relays hold as in position 8.

When the local controller advances into position 8 the signal lights remained as in position 7 except for the phase B vehicle signal which changed from green to yellow, indicating the phase B vehicle clearance interval.

When the local controller is in position 9 the relay BGD is energized via a circuit that can be traced from the A.C. power supply through line 100, the coil of relay BGD, line 401, contact 402 of relay BS, line 403, the jumpered positions 5, 6, 7 and 8 of bank F, line 565, contact 568 of relay CS, line 492 to jumpered positions 9, 10, 11 and 12 of bank F, wiper arm F1 in position 9 of bank F, lines 104, 103 to ground.

In order to maintain relay CS energized in position 8, a parallel circuit is formed that may be traced from the A.C. supply voltage through point 322, the coil of relay CS line 558, contact 559 of relay BY, line 547 line 603 contact 609 of relay AG to ground. This alternate circuit for relay CS will keep relay CS energized during the skipping operations if the actuation on the phase C vehicle detector VDC or the phase C pedestrian pushbutton PBC should occur to deenergize relay CM and open its contact 562.

In position 11 the relay CG is energized and deenergization in position 12 through circuits described above.

The phase B vehicle clearance interval is timed by charging the timing capacitor TC through the terminal PD+, timing adjustable resistor TP7, line 485, contact 489 of relay BY, line 83, contact 84, line 85 to timing capacitor TC. The charging of the timing capacitor begins in position 8 but as the rapid advance takes place through positions 8, 9, 10, 11 to position 12 the timing capacitor TC is discharged with each advance since when the motor magnet MM is energized its contact 361 closes to discharge the timing capacitor as previously described. Therefore, the timing of the phase B vehicle clearance interval occurs in position 12, under the assumed conditions.

The advance to position 13 occurs as previously described, as does the advance to position 1, in which the local controller may rest if no call from traffic on phase B or phase C has been received.

Let it now be assumed that after the local controller has been at rest for an appreciable time two actuations are received, one actuation via the phase B vehicle detector VDB and one actuation via the phase B pedestrian pushbutton PBB and for the purpose of this description, let it now be assumed that no further actuations are received for either phase B or phase C.

When the contact VDB is closed, the relay BD is energized as previously described. Its contact 295 is opened to cause the energizing circuit for relay BM to become open and relay BD is energized via contact 335 of relay BM, as previously described.

When pushbutton PBB is actuated the relay BP is energized as previously described. The contact 319 of relay BP is opened to cause relay BWT to become deenergized while contact 342 of relay BP closes to lock-in the relay BP.

The contact 259 of relay BM closes to complete the cathode, 213, circuit as previously described so that when the coincidence gate CG1 is in coincidence the coincidence gate CG1 will pass current to energize the relay MAX to advance the wiper arms to position 2.

In position 2 the relays LO, AG and AW become deenergized as previously described, with the position 2 timed as previously described, and the signal lights illuminated the same as previously disclosed for position 2 above.

Positions 2, 3, 4, 5 and 6 are similar to those described above with reference to phase B vehicle and pedestrian actuations and phase C vehicle and pedestrian actuations, except that the phase C vehicle and pedestrian actuations are omitted and consequently the relays CG, CP, CM and CWT are as described with reference to the description involving phase B vehicle actuation only.

In positions 7, 8, 9, 10, 11, 12 and 13 the local controller is as was described above with reference to phase B vehicle actuation only.

It should be noted that actuation of the phase B pedestrian pushbutton PBB only and no actuation of the phase B vehicle detector VDB, and no phase C actuations while the local controller is at rest or during a succeeding cycle would cause the local controller to react as if a phase B vehicle actuation had also been received with the phase B pedestrian actuation. This will be understood when it is pointed out that the energization of relay BP opens contact 300 which contact is in the energizing circuit for relay BM. Relay BM when deenergized causes relay BD to become energized, all as previously described. Let it now be assumed that the local controller has been at rest for a period of time and during such rest period of a phase C vehicle actuation, via closure of contact VDC, is received. It is further assumed that no additional actuations via either phase C vehicle detector or phase C pedestrian pushbutton PBC or phase B vehicle detector or phase B pedestrian pushbutton are received either while the local controller is at rest or is in its ensuring cycle.

With the actuation of the phase C vehicle detector VDC the contact VDC closes and relay CD is energized as described above. The relay CM is deenergized as its energizing circuit is opened at contact 309 of relay CD. With relay CM thus deenergized the relay CD remains energized via a circuit previously described through contact 345 of relay CM.

The cathode 213 circuit would now be closed through the circuit previously described via contact 239 of relay CM. The advance of the wiper arms to position 2 would be as previously described.

In position 2 the relays LO, AG and AW become deenergized and the timing of the interval is as previously described. Position 3 is a skip position as previously described while in position 4 relays AY and BS become energized and relay AGR becomes deenergized. Relay AY is energized as previously described and relay BS is energized via a circuit from the A.C. power supply through point 312, the coil of relay BS, line 576, contact 573 of relay AY, line 574, contact 575 of relay BM to ground.

Position 4 is the phase A clearance interval during which the phase A vehicle yellow is illuminated and the phase A vehicle green is extinguished. Since there were no calls on phase B the relay BS has become energized which relay completes a circuit to apply a ground connection to motor magnet MM so that positions 4, 5, 6 and 7 become skip steps and, as previously explained, in connection with the skipping of phase C, the wiper arms of the rotary stepping switch are rapidly advanced through the phase B positions 5, 6, and 7 so that the phase A vehicle yellow interval, normally timed in position 4 is now timed in position 8, the normal position accorded to phase B vehicle yellow during a cycle when phase B is not omitted. In positions 4, 5, 6 and 7 the motor magnet MM is energized via a circuit from the A.C. power supply, through the coil of relay MM, lines 359, 379, contact 375 of relay MMR, lines 374, 551, 552, contact 601 of relay BS, line 602 to position 4 of bank E, wiper arm E1, line 103 to ground. When the circuit is complete as described in position 4 the motor magnet MM is energized and notches the ratchet wheel (not shown). The contact 332 of motor magnet MM is opened and breaks the energizing circuit for relay MMR which opens its contact 375 to open the energizing circuit for motor magnet MM which thereupon deenergized the motor magnet MM and, the motor magnet deenergizing, advances the ratchet wheel to advance the wiper arms of the rotary stepping switch to the next position (position 5) with the motor magnet MM deenergized its contact 332 closes causing MMR to become energized through its energizing circuit and MMR closes its contact 375 which contact closes the energizing circuit for MM through position 5 and the circuit previously described since positions 4, 5, 6 and 7 are jumpered together.

The relay AY, heretofore described as deenergized only in position 4 is maintained in an energized condition via a circuit that may be traced from the A.C. power supply through line 94, the coil of relay AY, line 578, contact 579 of relay AY, contact 580 of relay AG, line 581, jumpered positions 1, 2, 3, and 4 of bank F, line 105, line 603, contact 582 of relay BS, line 403 to positions 5, 6, 7, and 8 of bank F, wiper arm F1, lines 104, 103 to ground. It will be noted that positions 5, 6, 7, and 8 of bank F are jumpered together so that the relay AY is held energized while the local controller is now in its positions 5, 6, 7, and 8.

The skipping operation previously described is discontinued in position 8 as the ground connection for motor magnet MM is no longer completed through the circuit making the skip operation possible.

In position 8 the phase A vehicle clearance is timed through terminal PD+, timing adjustable potentiometer TP6, line 385, contact 381 of relay AY, line 85 to timing capacitor TC.

In order that the phase A vehicle yellow signal be displayed during the rapid advance from positions 4 to 8 and during the interval timed in position 8, the relay AGD is held energized in position 5, 6, 7, and 8 by a circuit completed from the A.C. power supply through line 100, the coil of relay AGD, lines 109, 603, contact 582 of relay BS, line 403, jumpered position 5, 6, 7 and 8 of bank F, wiper arm F1, lines 104, 103 to ground.

Relay BGD is held deenergized by open contact 402 of relay BS and relay BGR is held deenergized by open contact 383 of relay BS.

In order that the local controller will be assured continuance of the skip operations once such skip operation has started an alternate circuit to energized relay BS is completed from the A.C. power supply through point 312 the coil of relay BS, line 572, contact 573 of relay AY, line 604, contact 605 of relay BS, line 608, contact 609 of relay AG to ground. The last described circuit serves to hold the energizing circuit for relay BS completed through its own contact 605. After the original energizing circuit has been completed, if it should occur that there is an actuation of either phase B vehicle detector VDB or phase B pedestrian pushbutton PBB, which actuation would cause the relay BM to become deenergized and open the original energizing circuit for relay BS at contact 575 of relay BM the relay BS would remain energized through its own contact while the skipping operation of phase B, then in process, would continue.

At the termination of the phase A vehicle yellow interval the wiper arm is advanced to position 9 as previously described.

In position 9 the phase A yellow vehicle signal is extinguished and the phase A red vehicle signal is illuminated as the phase C red vehicle signal is extinguished and the phase C green vehicle signal is illuminated. The relay CGD is energized in position 9 as previously described. The relay CGR having been energized in position 8 also as previously described.

Due to the absence of a phase C pedestrian call the relay CP remains deenergized thereby causing relay CWT to remain energized, therefore in position 9 relay CW remains deenergized since the contact 494 of relay CWT in the energizing circuit of relay CW is open.

Position 9 is now a skip step. In the previous description where the phase C vehicle and pedestrian actuations were received, position 9 was timed via the adjustable timing resistor TP13 to time the phase C green walk signal. With the absence of the phase C green walk signal displayed, the position 9 becomes a skip step and ground is applied to the motor magnet MM via a circuit from the A.C. power supply through the coil of motor magnet MM, lines 359, 379, contact 375 of relay MMR, lines 374, 551, 563, contact 612, of relay CWT, lines 495 position 9 of bank D, wiper arm D1 to ground. The relay AY is deenergized in position 9 by the advance of the wiper arm E1 from position 8 to 9 of bank E. With the relay AY deenergized its contact 573 opens to open the energizing circuit for the relay BS.

The position 10 is timed by charging the timing capacitor TC through the terminal PD+, through the adjustable timing resistor TP14, line 610, contact 611 of relay CWT, line 514, position 10 of bank C, wiper arm C1, line 81, contact 82 line 83, contact 84 line 85 to timing capacitor TC.

Positions 11, 12 and 13 are as previously described above relative to the description of the cycle including phase C vehicle and pedestrian actuations.

The local controller moves into its position 1 to display the phase A green signals and awaits further calls from either phase B or phase C traffic.

Actuation of the phase C pedestrian pushbutton PBC alone or actuation of the phase C vehicle detector VDC and the phase C pushbutton together during the rest position of the local controller will cause identical reaction. Such reaction is similar to that previously described with relation to a phase C vehicle detector actuation above except that the relay CP and CD will both be energized and relay CM and CWT will both be deenergized as described relative to the first disclosed description above.

Positions 2 through 9 will be as previously described relative to a phase C vehicle actuation only while position 9, previously described as a skip position, will time a phase C walk green period as described in the first description above. Position 10 will time a phase C walk clearance period similar to that description of the first disclosed cycle. Periods 11, 12 and 13 would remain similar to that description first disclosed and also to the preceding description referring to a phase C vehicle actuation above.

It should be understood that maximum limit control timed in position 7 for phase B and in position 11 for phase C is based on a percentage of the time of the current cycle with each percentage referable to zero of the cycle. Therefore, the percentage employed as maximum time control of position 11 must exceed that percentage employed as maximum time control of position 7.

Since the percentage referred to as set by the respective potentiometers PB1, PB2 and PB3 for phase B and PC1, PC2 or PC3 for phase C, is a percentage of the time of one cycle, which cycle length is determined by the master controller, it is therefore obvious that when the phase B is skipped, the time the local controller may remain in phase C may thus be increased, by timely phase C vehicle actuations, in time to include that part of the time of the cycle that had been allocated to phase B. However, the percentage of the cycle at which the phase C must terminate remains the same as determined by the potentiometer whether or not phase B is displayed in the same cycle. Due to an absence of a phase C actuation, the phase B may not be extended in time, or otherwise, as control of the percentage of the cycle is determined by the potentiometer. The time that had been allocated to phase C would be absorbed by phase A after the termination of phase B.

It is obvious that a complete cycle including all of phase A, phase B and phase C may be obtained, if the new cycle had been initiated via a phase B actuation, and no phase C actuation is received until the local controller is in its position 7. If a phase C actuation is received during or before the interval timed in position 7 the phase C part of the cycle will be included in the current cycle. However, should no phase C actuations be received during a single cycle until after the termination of the interval timed in position 7 and there is no memory of phase C from the previous cycle then the actuation shall be remembered and shall be employed to initiate a new cycle in absence of additional actuations or shall be employed to include phase C in the new or succeeding cycle.

Should it occur that a phase C actuation initiates a cycle with no phase B actuation or memory at that time and the local controller advances into position 4 to terminate the phase A, a phase B actuation must occur before the local controller arrives in position 4 in order that the phase B may be included in that particular cycle. If such actuation is received by the local controller while the local controller is in any position from positions 4 through 13 then the phase B of that cycle will be skipped but the actuation will be remembered by the local controller and the phase B will be included in the next succeeding cycle.

It has previously been assumed that the local controller, as described, was in simultaneous operation. It should be noted that simultaneous operation of the local controller will occur regardless of the energized or deenergized condition of the relays OT—OT' or IN in FIG. 4b so long as the relay SIM is energized. The several contacts of relay SIM are so arranged as to complete direct circuits from the potentiometer PO4 alone to the pulse former PF3 via contacts of relay PR as previously described, independently of any contacts in relays OT—OT' and IN. Operation of the local controller other than simultaneous may occur only with the relay SIM deenergized.

It will now be assumed that the master controller calls for a change to outbound offset for example energizing line OC1 in FIG. 4b and deenergizing line SM1 to the local controller, so as to energize the relay OT—OT' and deenergize the relay SIM.

The relay OT would be energized from the master controller via line OC1, through the coil of relay OT, line 32 to ground. The relay OT closes its contact 613 to input power through the coil of relay OT', line 614, contact 613 of relay OT to ground. The relay OT' serves in effect to multiply the number of contacts controlled by the coil of relay OT.

With relay SIM deenergized and the relays OT—OT' energized the output circuit from the potentiometer PO4 in FIG. 4b to the pulse former PF3 in FIG. 4d is open at contacts 43 and 53 of relay SIM. The relays OT—OT' thus energized close their contacts so that the output of the potentiometer PO2 is applied to transformer T3 of the pulse former PF3 from the potentiometer PO2 through line 615, contact 618 of relay OT', line 619 contact 620 of relay IN, contact 621 of relay SIM, line 52, line 51, the coil of transformer T3, line 50, contact 49 of relay PR, line 45, contact 622 of relay SIM, contact 623 of relay IN, line 624, contact 625 of relay OT', line 628 to potentiometer PO2.

The output from the potentiometer PO2 adjusted for the desired percentage offset for "outbound," will be applied to the transformer T3 of pulse former PF3 for comparison with the pulse output of PF2 derived from the controller offset potentiometer PO5 in coincidence gate CG2 and CG3 to drive potentiometer PO5 slowly in the nearest direction by motor RDM to the new desired percentage point established by potentiometer PO2.

Although the change toward the new offset is initiated by selection over lines SM1, OC1, OC2, the change to full outbound offset for the controller cycle is completed when potentiometer PO5 is at rest, matching potentiometer PO2 as determined by coincidence gate CG2.

With the relay OT' energized and relay IN and SIM deenergized, a ground is provided for the adjustable lead and lug "OUT" through line 629, contact 630 of relay OT', line 631, contact 632 of relay IN, contact 633 of relay SIM to ground to effect change in cycle split if desired, as described below.

If, however, the master controller calls for a change to inbound offset, for example, by energizing line OC2 and deenergizing lines OC1 and SM1, the relay IN would be energized from the input line OC2 through the coil of relay IN, line 32 to ground, while relays OT—OT' and SIM remain deenergized. The energizing of relay IN would close contacts to apply the output from potentiometer PO1 to the pulse former PF3, from potentiometer PO1 through line 634, contact 635 of relay OT', 638, contact 639 of relay IN, contact 621 of relay SIM, line 52, line 51 through the coil of transformer T3, line 50, contact 49 of relay PR, line 45, contact 622 of relay SIM, contact 640 of relay IN line 641, contact 642 of relay OT', line 643 to potentiometer PO1.

The action of the pulse former PF2 and PF3 and the coincidence gated CG2 and CG3 cause the motor RDM to drive the potentiometer PO5 slowly to the position of potentiometer PO1 in a manner previously explained, as moving the offset of the local controller gradually to the desired inbound percentage offset.

The operation of relay IN also connects ground to lead and lug IN' via line 644, contact 645 of relay OT, contact 648 of relay IN, contact 633 of relay SIM to ground for connection to one of the split selection terminals as desired.

Should the relays OT—OT' and IN both be energized by the master controller and relay SIM deenergized offset condition, termed "average" offset, would similarly control the percentage based timing through the output of potentiometer PO3. The output of potentiometer PO3 would be applied to the pulse former PF3 via lines 649, 655, contact 654 of relay OT', line 638, contact 639 of relay IN, contact 621 of relay SIM, lines 52, 51, coil of transformer T3, line 50, contact 49 of relay PR, line 45, contact 622 of relay SIM, contact 640 of relay IN, line 641, contact 653 of relay OT', lines 652, 651 to potentiometer PO3.

Lead and lug "AVE" will have ground applied via line 656, contact 658 of relay OT, contact 648 of relay IN contact 633 of relay SIM to ground for connection to the desired split selection terminal for association with the average offset.

Associated with the relays OT—OT', IN and SIM are indicator lamps L10, L11, L12 and L13 which are controlled by contacts of these several relays to indicate master demand for simultaneous, average, inbound and outbound offset respectively. Lamp L10 is illuminated from the A.C. power through line 39, lamp L10, line 40, contact 35 of relay SIM, line 41 contact 42 of relay PR to ground. Lamp L11 is normally illuminated via a circuit from the A.C. power supply through line 660, lamp L11, line 661, contact 662 of relay OT, contact 663 of relay IN, contact 664 of relay SIM, line 41, contact 42 of relay PR to ground. The lamp L11 is also illuminated in average offset operation, if the local controller is set by switch SS2 in positions 2, 3, or 4 so as not to respond to the master call for "free" operation.

This circuit may be traced from the A.C. power supply through line 660, lamp L11, lines 661, 665, switch SS2 in positions 2, 3, or 4 line 666, contact 669 of relay OT, contact 670 of relay IN, contact 664 of relay SIM, line 41, contact 42 of relay PR to ground.

The indicator lamp L12 is illuminated from the A.C. power through a circuit via line 660, through lamp L12, line 671, contact 672 of relay OT, contact 663 of relay IN, contact 664 of relay SIM, line 41 contact 42 of relay PR to ground. Indicator lamp L13 is illuminated via a circuit from the A.C. power supply through line 660, lamp L13, line 673, contact 674 of relay OT, contact 670 of relay IN, contact 664 of relay SIM, line 41, contact 42 of relay PR to ground.

It should be noted that if switch SS2 is not in position 1 (it is here illustrated in position 1), the average offset will be called when relays OT—OT', IN and SIM are all deenergized. Thus in this condition average offset potentiometer PO3 is connected to transformer T3 via a circuit through lines 649, contact 650, line 619, contact 620, contact 621, line 52, 51, coil of transformer T3, line 50, contact 49, line 45, contact 622, contact 623, line 624, contact 675, line 651 to potentiometer PO3.

Should the relay OT—OT', IN and SIM all be deenergized the controller would operate under "FREE" condition so long as the selector switch SS2, in FIG. 4b is in position 1 as illustrated. If the selector switch SS2 were in the next position (position 2) the local controller would operate under average offset conditions even though the master controller called for "free" operation. This permits some local controllers to go "free" operation while others remain on average offset in light traffic as locally desired.

In any event a lead and lug "FREE" provide means for connection to the desired split, with relays OT—OT' IN and SIM all deenergized, regardless of position of the selector switch SS2. This circuit provides a ground to the lug "FREE" via line 678, contact 679 of relay OT', line 631, contact 632 of relay IN, contact 633 of relay SIM to ground.

"Free" operation of the local controller is obtained by energization of relay FRR with relays OT—OT', IN and SIM deenergized and with switch SS2 in position 1 as illustrated. The relay FRR would be energized from the A.C. supply through the coil of relay FRR, line 677, switch SS2, line 666, contact 669, contact 670, contact 664, line 41, contact 42 to ground.

The indicator lamp L14 to indicate free offset is connected when free operation is in effect by being completed in parallel with relay FRR via line 660 (lamp L14, line 680 to switch SS2.

In "free" operation the 400 cycle input to PF1 is shorted out at contact 681 of relay FRR. Capacitor 120 in FIG. 4d is charged through the terminal PD+ through adjustable timing resistor TP10, line 682, contact 683 of relay BG, line 684, contact 685 of relay CG, line 688, contact 689 of relay FRR, line 79, 78 to capacitor 120. As capacitor 120 is charged the bias potential on grid 167 in CG1 in FIG. 4d is decreased, through the circuit from the upper side of the capacitor 120, line 78, line 79, resistor 121, terminal 164 line 158 to grid 167 of tube 165. When the potential on the capacitor 120 becomes sufficiently high the bias on grid 167 becomes sufficiently low so that the tube 167 begins to pass pulses through the coincidence gate CG1 to provide a positive voltage on the control grid 203 of tube 205. This positive voltage on the control grid 203 prepares the tube 205 for the passage of current when the cathode 213 circuit is completed via contact 259 of relay BM, contact 239 of relay CM or contact 252 of relay AW by actuation as previously described.

The 400 cycle output of PF2 provides the pulses on the second input to CG1 at grid 168 of tube 165 for operation of CG1.

In position 7, the extendible vehicle interval of phase B, the extendible vehicle interval is timed from the terminal marked PD+ through adjustable timing resistor TP11, line 690, contact 691 of relay BG, line 684, contact 685 of relay CG, line 688 contact 689 of relay FRR, line 79, line 78 to capacitor 120 as previously described with reference to the timing of the interval in position 1 above. During the interval timed in position 7 the cathode 213 circuit is held closed so that the interval will terminate as previously described.

In position 11, the extendible vehicle interval of phase C, the extendible vehicle interval is timed as previously described. However, the maximum limit, is timed from the terminal marked PD+ through adjustable timing resistor TP12, line 692, contact 693 of relay CG, line 688, contact 689, lines 79, 78 to capacitor 120 thereby charging capacitor 120 as previously described with reference to position 1 and position 7 above. The maximum limit control will terminate as previously described.

The split changing feature will now be described. In this embodiment three different adjustable splits are provided for selection from the master controller by locally chosen association with the several offsets.

The splits 1, 2 and 3 are provided by control of relays SB2 and SB3 for phase B and SC2 and SC3 for phase C, in connection with the split change locking relay LO. A call for split change is initiated by a selection of one of the offsets by control relays OT—OT', IN, SIM from the master controller over lines OC1, OC2, SM1 and OC as described above. By cross connection of, as desired locally, one or more of the offset lead-lugs FREE, AVE, IN', OUT and SIM' to any of the split terminals, the actual change of split can take place by energization or deenergization of relay SB2 or SB3 for phase SB and SC2 or SC3 for phase C, under control of the relay LO.

The relay LO is energized only in position 1 of the cycle of the stepping switch which is Street A green walk and potential rest position and which terminates at the zero point of the local controller time cycle. Since the split changes affect the termination of the Street B green interval in position 7 and the termination of the Street C green interval in position 11 of the cycle, the making of a split change only in position 1, by control of the relay LO, avoids skipping a cycle in case of switching from one split percentage to an earlier split percentage after passing the earlier point.

A circuit previously described energized the relay LO only when the local controller is in position 1.

When relay LO is energized, a circuit is completed from input power through line 694, the coil of relay SC3, line 695, line 696, contact 365 of relay LO, line 699 to split 3 terminals and from A.C. input power through line 701, the coil of relay SB3, line 696, contact 365 of relay LO, line 699 to split 3 terminal, also from A.C. power through line 694, the coil of relay SC2, lines 702, 703, contact 364 of relay LO, line 704 to split 2 terminals and from A.C. power through line 701, the coil of relay SB2, line 703, contact 364 of relay LO, line 704 to split 2 terminals. These circuits prepare for operation of relays SB2, SB3, SC2 and SC3 when ground is applied to the associated split terminal.

Let it be assumed that a ground connection is applied to the split 2 terminal via adjustable lead-lug "IN" over the circuit of this lead previously described. Relays SB2 and SC2 would be energized through the above described circuits via contacts of relay LO to open the input circuit for the potentiometer PB1 and PC1 respectively at contacts 473 and 465 of relay SB2 for potentiometer PB1 and at contact 532 a nd 527 of relay SC2 for potentiometer PC1. Potentiometer PB2 would apply an input to transformer T1 of the pulse former PF1 through line 723, contact 724 of relay SB2, contact 472 of relay SB3, line 471, position 7 of bank B, wiper arm B1, line 73, point 72, line 71, the coil of transformer T1, line 70, contact 69 of relay FRR, line 65, wiper arm A1, position 7 of blank A, line 470 contact 469 of relay SB3, contact 725 of relay SB2, line 726 to potentiometer PB2. The potentiometer PB2 of split 2 would now serve a similar purpose as that previously described with reference to potentiometer PB1 of split 1.

Similarly potentiometer PC2 would apply an input to transformer T1 through line 729, contact 730 of relay SC2, contact 531 of relay SC3, line 530, position 11 of bank B, wiper arm B1, line 73, point 72, line 71, the coil of transformer T1, line 70, contact 69 of relay FRR, line 65, wiper arm A1, position 11 of bank A, line 529, contact 525 of relay SC3, contact 731 of relay SC2, line 732 to potentiometer PC2.

The pre-set adjustable timing resistor TB1 associated with the potentiometer PB1, as previously described also has its circuit broken at contact 439 of relay SB2 while the preset adjustable timing resistor TC1 associated with potentiometer PC1 has its circuit broken at contact 501 of relay SC2.

The adjustable timing resistor TB2 would now be employed to charge the timing capacitor TC from the direct current input through the potential divider PDX to a tap PD+ to which the adjustable timing resistor TB2 is connected, through TB2, line 734, contact 733 of relay SB2, contact 440 of relay SB3, line 441, position 5 of bank C, wiper arm C1, line 81, contact 82, line 83, contact 84, line 85 to timing capacitor TC.

The adjustable timing resistor TC2, associated with potentiometer PC2 would be employed to charge the timing capacitor TC through the terminal PD+, adjustable timing resistor TC2, line 736, contact 735 of relay SC2, contact 502, of relay SC3, line 503, position 9 of bank C, wiper arm C1, line 81, contact 82, line 83, contact 84, line 85 to timing capacitor TC.

With the relay SB2 energized a circuit would be complete from the A.C. supply through line 701, indicator lamp L2, contact 722 of relay SB2, contact 739 of relay SB3 to ground.

With the relays SB3, SB2, SC3 and SC2 deenergized as previously described, split 1 would be in effect and the indicator lamp L1 would be illuminated from the A.C. power supply through line 701, lamp L1, contact 740 of relay SB2, contact 739 of relay SB3 to ground.

Assume that a ground connection is applied to split 3 terminal via adjustable lead-lug "OUT" over the circuit of this lead previously described relays SB3 and SC3 would be energized through the above described circuits via contacts of relay LO, to open the input circuit for the potentiometer PB2 and PC2 respectively at contacts 472 and 469 of relay SB3 for potentiometer PB2 and contacts 525 and 531 of relay SC3 for potentiometer PC2. Potentiometer PB3 would apply an input to transformer T1 of pulse former PF1 through line 705, contact 706 of relay SB3, line 471, position 7 of bank B, wiper arm B1, line 73, point 72, line 71, the coil of transformer T1, line 70, contact 69 of relay FRR, line 65, wiper arm A1, position 7 of bank A line 470, contact 709 of relay SB3, line 710, to potentiometer PB3. The potentiometer PB3 of split 3 would now serve a similar purpose as that previously described with reference to potentiometer PB1 of split 1.

Likewise potentiometer PC3 would apply an input to the transformer T1 through line 711, contact 712 of relay SC3, line 530, position 11 of bank B, wiper arm B1, line 73, point 72, line 71 the coil of transformer T1, line 70, contact 69 of relay FRR, line 65, wiper arm A1, position 11 of bank A, line 529, contact 713 of relay SC3, line 714 to potentiometer PC3. The potentiometer PC3 would now serve a similar purpose as that previously described with reference to potentiometer PC1 of split 1.

The pre-set adjustable timing resistor TB2 associated with potentiometer PB2, as previously explained also has its circuit broken at contact 440 of relay SB3 while the preset adjustable timing resistor TC2, associated with potentiometer PC2 has its circuit open at contact 502 of relay SC3.

The adjustable timing resistor TB3, associated with potentiometer PB3 would be employed to charge the timing capacitor TC from the direct current input through the potential divider PDX to a tap PD+ to which the adujstable timing resistor is connected, through the adjustable timing resistor TB3, line 715, contact 716 of relay SB3, line 441, position 5 of bank C, wiper arm C1, line 81, contact 82, line 83, contact 84, line 85 to capacitor TC.

The adjustable timing resistor TC3 associated with potentiometer PC3 would be employed to charge the timing capacitor TC through the terminal PD+, adjustable timing resistor TC3, line 719, contact 720 of relay SC5, line 503, position 9 of bank C, wiper arm C1, line 81, contact 82, line 83, contact 84, line 85 to timing capacitor TC.

With the relay SB3 energized a circuit would be completed from the A.C. supply through line 701, indicator lamp L3, contact 721 of relay SB3 to ground.

It should be noted that should relay SB3 and SB2 and SC3 and SC2 be energized at the same time, split 3 would be in effect.

As previously described, the split can change only when the locking relay LO is energized. After a change of split has taken place via energization of the relay SB2, SB3, SC2 and SC3 as explained above, the energized relays lock in via their own contacts through the contacts 741 and/or 742 of deenergized relay LO. When the relay SB2 and SC2 are energized, when the relay LO is deenergized, the relay SB2 and SC2 lock in through contacts of relay SB2. The circuit is completed from the A.C. power supply through line 694, the coil of relay SC2, line 702, 703, contact 741 of relay LO, line 743, contact 722 of relay SB2, contact 739 of relay SB3 to ground and from the A.C. power supply through line 701, the coil of relay SB2, line 703, contact 741 of relay LO, line 743, contact 722 of relay SB2, contact 739 to ground.

The relays SB3 and SC3 are locked in through contacts of relay SB3 from the A.C. power supply through line 694, the coil of relay SC3, lines 695, 696, contact 742 of relay LO, line 744, contact 721 of relay SB3 to ground and from A.C. power supply through line 701, the coil of relay SB3, line 696, contact 742 of relay LO, line 744, contact 721 of relay SB3 to ground.

The foregoing description has assumed that the ganged switch SS3—SS4 were placed in contact with the upper tap, as illustrated. If the switches SS3—SS4 were placed in the center position the local controller could not assume simultaneous operation due to the lack of an energizing circuit for the relay SIM via input line SM1, which line is only connected to the upper position.

If, however, the switches SS3—SS4 were placed in the lower position the local controller would assume isolated operation via energization of the relay PR through a circuit from power supply represented by a plus in a square, through the coil of relay PR, switch SS4, resistor R20 to ground.

The indicator lamp L15 would be illuminated from the A.C. power supply through the lamp L15, contact 745 of relay PR to ground.

The contact 746 of relay PR is closed to short out the transformer T3 via a circuit from the contact 746 of relay PR through line 50, the coil of transformer T3, line 51 to contact 746 of relay PR.

The contacts 749 and 750 of relay PR close to apply a 60 cycle A.C. to the transformer T2 from the A.C. power supply through resistor R21, contact 749 of relay PR, line 61, the coil of transformer T2, line 60, contact 750 to ground. This applied 60 cycle A.C. to the pulse former PF2 via the transformer T2 will prevent coincidence in the coincidence gate CG2 and therefore no current would pass through CG2 to energize the relay OS. Consequently the relay OS remains deenergized and its contact 590 remains closed to complete a ground connection to whichever contact of relay OD is then closed. The relay OD will also be and remain deenergized due to the failure of CG3 to pass current so that a circuit would be complete from the A.C. power supply through point 593, coil CW, line 594, contact 591 of relay OD, line 595, contact 590 of relay OS to ground, to keep the motor RDM rotating at a constant speed in a constant direction.

The motor RDM will rotate the cam shaft CMS to rotate the cam arms to close the cam contacts CA, CB and CC respectively at different periods in the cycle.

Cam contact CA will be effective only when the stepping switch is in position 1, cam contact CB will be effective only when the stepping switch is in position 7 and cam contact CC will be effective when the stepping switch is in position 11 only.

When in position 1 the cam contact CA closes a circuit from ground through lines 103, 104, wiper arm F1, position 1 of bank F, line 581, contact 751 of relay AG, cam contact CA, line 752, contact 753 of relay PR line 754, lines 241, 242, to point 119. When a call is received by the local controller either relay BM or CM, or both will become deenergized and close the contacts 259 of relay BM or 239 of relay CM or both. With the closure of such contacts the cathode 213 will be grounded via a circuit that can be traced from the cathode 213, through lines 234, 235, contact 239, lines 240, 754, contact 753 of relay PR, line 752, cam contact CA, contact 751 of relay AG, line 581, position 1 of bank F, wiper arm F1, lines 104, 103 to ground or from cathode 213, through lines 234, 245, 260, contact 259, lines 255, 254, 241, 754, contact 753, line 752, cam contact CA, contact 751, line 581, position 1 of bank F, wiper arm F1, lines 104, 103 to ground.

The joining of cathode 213 to ground will cause tube 205 to pass plate current to operate the relay MAX since there is no potential on grid 203 of tube 205. The relay MAX closes its contact 353 completing the energizing circuit for the motor magnet MM as previously described.

When the stepping switch is in position 7 the cam contact CB closes completing a ground for the cathode 213 through lines 234, 234, contact 239, line 240, to line 754, or from cathode 213, through lines 234, 245, 251, contact 252 of relay AW, lines 253, 254, 241 to line 754, and through line 754, contact 753 of relay PR, line 752, cam contact CB, line 755 to contact 756 of relay BG to ground. This circuit will serve as the maximum timing circuit for the extendible vehicle interval of phase B timed during position 7 and will only advance the wiper arms if actuations of the phase B vehicle detector VDB extend the phase B extendible vehicle interval to the maximum limit during such interval.

In position 11 the cam contact CC closes to complete a ground for the cathode 213 through lines 234, 245, 260, contact 259, lines 255, 254, 241 to line 754 or from cathode 213 through lines 234, 245, 251, contact 252, lines 253, 254, 241 to line 274 and through line 754 contact 753, line 752 to cam contact CC, line 758, contact 759 of relay CG to ground.

This circuit will serve as the maximum limit circuit for the extendible vehicle interval of phase C timed during position 11 and will only advance the wiper arms of the rotary stepping switch if actuations of the phase C vehicle detector VDC extend the phase C extendible vehicle interval to the maximum limit during such interval.

As previously described above relative to the termination of an extendible vehicle interval via the maximum limit circuit, if phase B is terminated via the maximum limit timing circuit, by the energization of relay MAX, the relay BM is deenergized as previously described and a call is left for phase B for the next succeeding cycle.

Similarly the phase C will be recalled in the next succeeding cycle if the extendible vehicle interval of phase C terminates via the maximum limit circuit by energization of relay MAX which relay would cause relay CM to become deenergized so as to leave a phase C call for the next succeeding cycle.

When the switch SS6, previously described, is turned to the position to the left to obtain phase C pedestrian recall a circuit is complete from input power supply through the coil of relay CP, line 352, line 765, switch SS6 in its left most position, line 762, contact 761 of relay AG to ground. This would energize relay CP and place a phase C pedestrian call in the local controller when the AG becomes energized in position 1, as previously described. When the switch SS6 is turned fully to the right, the phase C vehicle recall position, the circuit is completed from input power supply through the coil of relay CD, line 766 to the rightmost position of switch SS6, line 762, contact 761 to relay AG to ground to energize relay CD and place a phase C vehicle call in the local controller when relay AG becomes energized in position 1.

The switches SS1 in FIG. 4c and SS2 in FIG. 4b are illustrated as separated for convenience. These switches, however, are associated with each other as will be seen in FIG. 11, the sample face panel of the local controller. These switches are mechanically connected and will rotate to successive positions simultaneously.

As previously stated, when the switches SS1—SS2 are in position first as shown, the local controller may, upon demand of the master controller, assume "free" operation as previously discussed. In position second such "free" operation may not be assumed even though the appropriate demand for the same is made by the master controller. In position third a phase B pedestrian recall is affected while in position fourth a phase B vehicle recall is affected.

The phase B pedestrian recall is effected by the energization of relay BP through a circuit from the input power through the coil of relay BP through point 338, line 340, line 768, position third of switch SS1, line 769, contact 770, of relay AG, line 760 to ground. Thus relay BP is energized and places a pedestrian call for phase B in the local controller when relay AG is energized in position 1, as previously described. When the switch SS1 is in position fourth, a circuit is complete to energize relay BD from the input power supply through the coil of relay BD, lines 333, 334, 771, switch SS1 in position fourth, line 769, contact 770 of relay AG, line 760 to ground. Thus relay BD will be energized and place a vehicle call in the local controller when relay AG is energized in position 1 as previously described.

Reference will now be made to FIG. 10, showing a sample dial panel for the controller of FIGS. 4a–4e, and to the associated FIGS. 11 and 12 showing sample cycles of operation of the controller with the several signal periods or functional periods identified by numbers in parentheses with the similarly identified adjusting dials in FIG. 10.

These FIGS. 10–12 are largely self-explanatory but will be supplemented with a brief description of some features below. The several adjusting dials in FIG. 10 are generally shown with their knobs pointing to either the "off" position or the lowest setting that may be obtained on the dial. The FIG. 10 is so presented because of the numerous settings possible, all depending upon the traffic at the controlled intersection. It will therefore be understood that the settings will differ in percentage or time settings as the case may be, depending upon the science of traffic control and th intersection controlled by such local controller.

The large circles with the two semi-circles inside identified "INBOUND," "OUTBOUND," "AVERAGE," "SPLIT 1," "SPLIT 2," "SPLIT 3," "ISOLATED," "FREE," "SIM," "A WALK," "B GREEN," "C GREEN," "STREET B PED. CALL," "STREET C PED. CALL," "STREET B VEH. CALL" and "STREET C VEH. CALL" in FIG. 10, illustrate indicator lamps corresponding to L12, L13, L11, L1, L2, L3, L15, L14, L10, L4, L17, L18, L6, L8, L5 and L7 respectively in FIG. 4.

The several switch and dial adjustments are more fully described below. The manual switch (21) in FIG. 10 illustrated in coordinated and simultaneous position, is similar to switch SS3—SS4 in FIG. 4b which switch also permits selection of coordinated or isolated operation. Under coordinated operation, positions 1 and 2, the local controller is subject to the control of the master controller with regard to cycle and offset.

Under isolated operation, position 3, the controller is disconnected from the master controller. However, the cycle and split under isolated operation are supplied by a synchronous motor RDM and cam CMS arrangement, operating the associated contacts CA, CB, and CC. The "split" set by these cams in such operation determines the side street maximum intervals, as explained above while the side street interval timing of phase B and phase C individually, up to the maximum, is determined by vehicle and pedestrian actuations.

For normal coordinated operation, under the control of the master controller, the system selector switch (21) is set in ether the "coordinated" position or the "coordinated and simultaneous" position. In the latter position, 2, the local controller will switch to the inbound, outbound or average offset on demand from the master controller, but will ignore any call for simultaneous offset. With the switch in the former position, 1, the local controller will respond to demand for simultaneous offset, as well as to a demand for inbound, outbound or average offset.

The selector switch (20) in FIG. 10 is comparable to switches SS1—SS2 of FIG. 4. Selector switch (20) of FIG. 10 is presented in the "actuated and free" position, the most counterclockwise position of the switch (20). This position corresponds to the position in which switch SS1—SS2 of FIG. 4 is represented. With selector switch (20) set in the above position, the local controller will respond to demand from the master controller for "free" operation. Response to a call for "free" operation may be made in either position 1 or position 2 of switch (21) depending on the position of selector switch (20).

When selector switch (20) is in its next position to the right, "actuated" position, the local controller will perform as a coordinated semi-actuated controller, governed by the master controller, but will ignore any call from the master controller to go to "free" operation.

With the switch (20) in the "B PED. RECALL" position or in the "B VEH. RECALL" position, the operation of the local controller will be modified to the extent of recalling the controller to phase B, at the termination of each phase A period, with the initial timing of the phase B green period determined by either the vehicle or pedestrian interval settings.

Selector switch (22), illustrated in its "off" position is comparable to switch SS6 of FIG. 4c. By putting switch

(22) of FIG. 10 in the "STREET C PED. RECALL" or "STREET C VEH. RECALL" position, the operation of the local controller will be modified to the extent of recalling the controller to the phase C after the termination of the phase A, if phase B is not inserted into the cycle or, after the termination of phase B if the phase B is inserted into the cycle, with the initial timing of the phase C green period determined by either the vehicle or pedestrian interval settings.

It is obvious that selector switch (20) may be set on either "B PED. RECALL" or "B VEH. RECALL" and selector switch (22) may, at the same time, be set on "STREET C PED. RECALL" or "STREET C VEH. RECALL" and thus modify the local controller.

Dials (1a), (1b) and (1c) corresponding to phase adjusting potentiometers PO1, PO2 and PO3 determine the offset, in percent of total cycle, by which the local controller cycle will lag behind the zero point in the master controller cycle, for inbound, outbound and average offsets respectively. As called for by the master controller the potentiometer PO4 determines the offset for simultaneous, but is not shown in FIG. 10.

These settings determine the percentile point in the background cycle of the beginning of the Street A pedestrian clearance period, the first interval in the local controller cycle following the Street A pedestrian green walk period in position 1, in the cyclic step-by-step switch. Thus the local zero point or start of the local controller cycle is in the stepping of the stepping switch from position 1 to position 2 to terminate the Street A green walk signal to pedestrian traffic associated with phase A and start the phase A pedestrian clearance period in position 2.

Dial (2) corresponding to timing adjustable resistor TP1, is used to set the Street A pedestrian clearance period. Dial (3) corresponding to potentiometer TP6 determines the length of the Street A vehicle clearance interval. Dial (4), corresponding to potentiometer TP10, is used to set the Street A minimum green period which period is timed under "free operation" only.

Dials (5a), (5b) and (5c) correspond respectively to potentiometers PB1, PB2 and PB3 and are used to set the maximum length of the Street B green interval for the three available splits. These dials are calibrated from zero to 100% for example, and set the maximum termination point of the Street B green as measured from the zero point in the local controller cycle. In adjusting these dials, it will be noted that the Street A pedestrian and vehicle clearance periods will be deducted from the apparent length of the maximum settings.

The dials (5a), (5b) and (5c) settings must be high enough to cover the sum of the Street A pedestrian and vehicle clearance periods and either the Street B pedestrian minimum green and pedestrian clearance intervals or the Street B vehicle initial interval during the shortest time cycle to be used.

Dials (6a), (6b) and (6c), corresponding to potentiometers TB1, TB2 and TB3 respectively, determine the length of the Street B pedestrian walk green interval whenever pedestrian pushbuttons are used, as shown in the preferred form of the invention in FIG. 4. This guaranteed "walk" interval forms the first part of the Street B green period whenever a pedestrian actuation via a pedestrian pushbutton for phase B or Street B is received prior to the end of the Street B vehicle clearance.

Dial (7) corresponding to potentiometer TP8, is used to set the length of the Street B "vehicle initial" interval. This interval forms the first part of the Street B green in absence of pedestrian actuations on Street B.

Dial (8) corresponds to potentiometer TP2 and times the vehicle extension interval of Street B. This interval operates to extend the Street B green period up to the maximum under substantially continuous actuation of the vehicle detector by traffic on Street B.

Dial (9), corresponding to potentiometer TP9, is used to determine the length of the Street B pedestrian clearance interval and its timing function is inserted into the cycle only upon actuation of the pedestrian pushbutton PBB in FIG. 4 prior to termination of the phase A vehicle clearance interval.

Dial (10) corresponds to potentiometer TP7 and is used to time the vehicle clearance interval associated with Street B.

Dial (11) corresponding to potentiometer TP11 is used to set the Street B maximum limit under "free" operation as described below.

Dials (12a), (12b) and (12c) correspond respectively to potentiometers PC1, PC2 and PC3, associated with Street C herein, and are used to set the maximum length of the Street C green intervals for the three available splits. These dials are calibrated from zero to 100% for example, and set the maximum termination point of the Street C green as measured from the zero point in the local controller cycle. In adjusting these dials, it will be noted that the percentage at which dials (12a), (12b) and (12c) are set must exceed the percentage at which the dials (5a), (5b) and (5c) are set. For example, dial (5a) of split 1 of Street B is associated with dial (12a), split 1 of Street C, dial (5b) of split 2 of Street B is associated with dial (12b) of split 2 of Street C and dial (5c) of split 3 of Street B is associated with dial (12c) of split 3 of Street C.

The dial (12a), (12b) and (12c) settings must be high enough to cover the sum of the Street A pedestrian and vehicle clearance periods, the Street B green period, up to the maximum, and the Street B vehicle clearance period followed by either the Street C pedestrian minimum green and pedestrian clearance intervals or the Street C vehicle initial period during the shortest time cycle to be used.

The dials (13a), (13b) and (13c) corresponding respectively to potentiometers TC1, TC2 and TC3 determine the length of the Street C walk green interval whenever a pedestrian pushbutton associated with Street C is actuated. This guaranteed "walk" interval forms the first part of the street C green whenever a pedestrian actuation for Street C is received prior to the end of the Street B vehicle clearance interval, if the local controller is about to time out the Street C periods or prior to the termination of the Street B vehicle interval if the local controller had no call for the Street C periods in that particular cycle.

Dial (14) corresponds to potentiometer TP14 and is used to set the timing of the Street C "vehicle initial" interval. This interval forms the first part of the Street C green period in the absence of a pedestrian actuation on Street C.

Dial (15), corresponding to potentiometer TP3, times the vehicle extension interval associated with Street C. This interval operates to extend the Street C green up to the maximum under substantially continuous actuations of the Street C vehicle detector by traffic.

Dial (17), corresponding to potentiometer TP4, is used to time the Street C vehicle clearance period at the termination of the Street C green period.

Dial (18) corresponds to potentiometer TP12 and is used to set the Street C maximum limit under "free" operation while dial (16), corresponding to potentiometer TP13, times a pedestrian clearance period on Street C when the Street C pedestrian pushbutton has been actuated to produce the pedestrian signal sequence on Street C.

The dial (19), corresponding to potentiometer TP5, is used when the all red interval is inserted into the cycle in advance of the Street A periods. This dial has an "off" position, for example, at the beginning of its timing range to close switch SS8 in FIG. 4 so as to eliminate the all red interval entirely.

On the sample panel as shown in FIG. 10 all the dials on the left in the area marked off and labeled Street A are associated with the Street A or phase A signals while the center section marked Street B contains dials associated with the Street B or phase B signals and the dials on the right marked off and labeled Street C are associated with Street C or phase C signals.

The indicator lamps over split 1, split 2 and split 3 respectively, in the area marked Street C will indicate what split is in effect and will apply to the Street B or phase B as well as Street C or phase C splits. The location of the split indicator lamps are for convenience only for they may have been located in the area labeled Street B.

Free operation is obtained at a local controller when specified by the master controller during light traffic periods, but only if selector switch (20) i.e. SS1—SS2 of FIG. 4 on the local controller, has been set at the "actuated and free" position. During "free" operation the master controller functions of cycle and offset selection are suspended with respect to this local controller, and the latter operates as an independent semi-actuated controller.

Dials (6), (7), (8), (9) and (10) determine the timing interval for Street B as explained above. Dials (5a), (5b), and (5c) are ineffective, and the Street B maximum interval is set on dial (11). The Street B minimum green is composed of one walk interval, dial (6), one pedestrian clearance interval, dial (9), and one vehicle interval, dial (8) or one initial interval, dial (7), and one vehicle interval, dial (8). In either case, the timing of the maximum green period is started simultaneously with the beginning of the first vehicle extension interval.

Dials (13), (14), (15), (16) and (17) determine the timing intervals for Street C as explained above. Dials (12a), (12b), and (12c) are ineffective and the Street C maximum interval is set on dial (18). The Street C minimum green is composed of one walk interval, dial (13), one pedestrian clearance interval, dial (16), and one vehicle interval, dial (15), or one initial interval, dial (14), and one vehicle interval, dial (15). As in the case of phase B, the timing of the maximum time of the Street C green period, is started simultaneously with the beginning of the vehicle extension interval of phase C. Following the Street C periods, or the Street B periods if the Street C periods are eliminated from the cycle, and after the all-red interval, if such all-red interval is displayed, the Street A or phase A minimum green, as set on dial (4), is timed. If a call is received from a Street B vehicle detector or a Street B pedestrian pushbutton, or a Street C vehicle detector or a Street C pedestrian pushbutton prior to the end of the Street A minimum green, the local controller will go directly into the Street A pedestrian clearance, dial (2), at the end of the minimum timing.

In the absence of both pedestrian and vehicle calls from both Street B and Street C, the controller will "rest" on Street A green at the end of the minimum time period. Upon receipt of a Street B or Street C call by actuation thereon, the Street A pedestrian clearance is initiated followed by the Street A vehicle clearance and the Street B green, if there was an actuation on Street B or, in the absence of a Street B actuation, the Street C green.

Referring now to FIGS. 11 and 12, these figures illustrate schematically cycles of operation of the controller of FIGS. 4a–4e in coordinated and isolated operation and in "free" operation respectively.

The diagrams illustrate one complete cycle with both actuated phases, phase B and phase C inserted into the cycle.

In both FIG. 11 and FIG. 12 a horizontal dividing line in the B and C green periods illustrates a vehicle actuation alone, for each phase, in the lower two blocks (for B green, INIT (7) and VEH (8) and for C green INIT (14) and VEH (15)) and illustrates a pedestrian actuation, with or without vehicle actuation, for each phase, in the upper blocks, (for B green, B WALK (6), PED CL (9), VEH INT (8) and for C green, C WALK (13), PED CL (16), and VEH INT (15)). The designation "INIT" is an abbreviation for initial, "PED" for pedestrian, "VEH" for vehicle, "CL" for clearance and "INT" for internal.

The term "FIXED" is applied to locally timed periods pre-set by the time adjustment dial.

The notation "MINIMUM SETTING" in FIG. 11 indicates the lowest limit for the setting of the B percentage maximum by dial (5), the lower notation, and the lowest limit for setting the C percentage maximum by dial (12), the upper notation. The maximum setting for phase B, dial (5) should include time, measured in percentage of the shortest possible cycle, to exceed the total time as pre-set on the locally adjustable timing dials (2) for A PED CL, (3) for A VEH CL, (6) for B WALK, (9) for PED CL, and (8) for VEH INT or dials (2) for A PED CL, (3) for A VEH CL, (7) for INIT and (8) for VEH, whichever sequence of timed intervals is the longest. The maximum setting for phase C, dial (12) should include time, measured in percentage of the shortest possible cycle, to exceed the total possible time that may be absorbed by the several intervals up to the maximum of phase B maximum interval, as set in percentage of a cycle on dial (5), plus the pre-timed settings on dial (10) for B VEH CL, (13) for C WALK, (16) for PED CL and (15) for VEH INT or the maximum of phase B maximum interval plus the pre-timed settings on dial (10) for B VEH CL, (14) for INIT and (15) for VEH whichever series of intervals is the longer. The percentage maximum set for B or dials (5a), (5b) and (5c), and for C on dials (12a), (12b) and (12c) would normally be set to include time in one cycle, the time being measured in percentage of a cycle, somewhat greater than the time of this minimum setting.

The notation "B CALL or C CALL" indicates traffic actuation on Street B and/or Street C.

Since either phase B or phase C may be eliminated from a single cycle due to an absence of actuation on the phase so eliminated, it is obvious that should phase C be eliminated than the ALL-RED (19), if used, or if not then used, the A WALK would begin with the termination of B VEH CL (10).

Referring to FIG. 11 in particular, should the elimination of phase C occur the local controller would then return to phase A after the termination of the phase B VEH CL. This return to phase A would occur early in the cycle and the phase A WALK would be longer than normal since that time in the cycle that had been allocated to phase C now is absorbed by phase A WALK. Therefore, with such early beginning the A WALK although it will terminate at the same percentage point in the local cycle (100%) will be lengthened via an early inception by the amount of time that could have been allocated to phase C of that cycle.

If the ALL RED period were to be inserted into the cycle then such ALL RED period would precede the A WALK in the cycle.

The phase B may be eliminated from a cycle due to an absence of a phase B actuation prior to the phase A vehicle clearance. Should this occur then the phase C would begin early in the cycle. The phase C would then begin with the termination of the A VEH CL (3) period. This early inception of phase C, in the cycle, may cause the phase C green period to be lengthened, if sufficient traffic actuations occur during the extendible vehicle interval since the maximum termination of the phase C green depends upon the phase C green being illuminated up to a certain percentage of the cycle. Therefore if the phase C should begin early in the cycle, the length of time during which the phase C green may be displayed is increased by the amount of time in the cycle that had been allocated to the phase B, had it been displayed while the maximum termination percentage point, with respect to the zero percent of the local cycle, as set by dial (12a), (12b) or (12c) remains the same.

Referring in particular to FIG. 12 the "B MAX" for the maximum limit of the phase B, set on dial (11) and the "C MAX" for the maximum limit of the phase C, set on dial (18) are not percentage set dials but are set-time adjustable dials. The cycle illustrated in FIG. 12 is not controlled by the master controller but depends upon the pre-timed intervals as set by the several dials in the parentheses, which dials correpond to the dials similarly labeled in the sample dial panel illustrated in FIG. 10.

It is obvious that either phase B or phase C may be eliminated from a single cycle illustrated in FIG. 12 so long as there is no call via traffic actuation for that particular phase.

If, for example, due to an absence of actuation of phase C traffic the phase C were to be eliminated from one cycle, although the "A MINIMUM" would begin at the termination of the "ALL RED" or, if the "ALL RED" were eliminated, at the termination of "B VEH CL," the phase A green period may not now be extended to include the time of the cycle that would have been used for phase C. Here, when a phase is eliminated the cycle length is shortened in time since all intervals are pre-timed or fixed time intervals and do not depend upon the reaching of a percentage point in one cycle.

As illustrated in FIG. 12 the B maximum limit as set on the dial (11) starts to time at the beginning of the B vehicle extension interval (8) and the C maximum limit as set on the dial (18) starts to time at the beginning of the C vehicle extension interval (15).

In isolated operation, the length of the cycle is set by the synchronous motor RDM of FIG. 4b rather than by the master controller. The motor RDM is rotated in a constant direction at a constant speed. The maximum limit termination of phase B and phase C is controlled by the cam arms CMS in FIG. 4b that are rotated by the synchronous motor, rather than on a percentage basis of one cycle. However since the motor rotates at a constant speed and in a constant direction the elimination of phase C, for example, from one cycle has the same effect as that described above relative to master control of the cycle length.

With the local controller operating in isolated operation two or more local controllers may, by local adjustment of the synchronous motor, the associated gearing, and the positions of the cam arms CMS, be mutually synchronized as the science of traffic control may demand for the traffic so controlled by the several local controllers.

Several embodiments and connections providing various aspects of the invention have been illustrated or described, and several modifications have been pointed out, but it will be understood that the above description and accompanying drawings are merely illustrative, and that the invention is capable of use in a variety of forms, and it will be obvious to those skilled in the art that various further modifications in structural details or in arrangement or character of parts may be made within the spirit of the invention.

I claim:

1. In a traffic control system having two periodic electrical wave energies, one of which is progressively shifting in phase relation to the other at a slow controlled rate to provide phase coincidences periodically at time intervals of the order of a desired traffic signal control cycle, a traffic actuated signal controller for controlling a traffic signal to provide a traffic signal cycle including at least three right of way signal periods respectively for at least three mutually interfering traffic movements under control of the said wave energies and including means for deriving further wave energies in predetermined phase relation to the respective first mentioned wave energies, means responsive to traffic on at least two of said three traffic movements, means responsive to phase coincidence of certain of said derived wave energies, one from each of the first said two periodic electrical wave energies and for controlling the transfer of right of way to whichever of said traffic movements has its traffic responsive means actuated by traffic therein, and means responsive to phase coincidence of other of said derived wave energies, one from each of the said first two periodic electrical wave energies for controlling transfer of right of way from the respective traffic movements having traffic responsive means.

2. In a traffic signal controller for the control of a traffic signal for control of right of way between more than two mutually interfering traffic lanes, means actuated by traffic in at least two of the said lanes respectively, input circuit means for connection to a remotely controlled source of periodic electrical wave energy, second input means for connection to a second remotely controlled source of periodic electric wave energy having a slow progressive phase shift with respect to the first mentioned wave energy at a controlled time rate, means in said controller connected to said first input circuit means for deriving local first wave energy in predetermined phase relation to the first remotely controlled wave energy, means in said controller connected to said second input means for deriving local second and third and fourth wave energies in different predetermined phase relation respectively to said second remotely controlled wave energy, and means for controlling transfer of right of way to the respective lanes in response to a combination of actuation of the respective traffic actuated means and selected coincidences of the second, third and fourth derived wave energies with said first derived wave energy.

3. A combination as in claim 2, and in which said right of way transfer controlling means includes means for controlling transfer of right of way to the lanes of said traffic actuated means in succession in response to actuation therein and for returning right of way to rest normally on a certain one of said traffic lanes in absence of actuation of said traffic actuated means on the others of said lanes, means controlled by said coincidences of said first local derived wave energies to control transfer of right of way from said one certain lane to a first of said other lanes in response to actuation of its associated traffic actuated means but to control the transfer of right of way from said one certain lane to the next in order of said other lanes in response to actuation of the traffic actuated means of the latter in absence of actuation of the traffic actuated means of said first of said other lanes, and means for setting limits for the transfer of right of way from the respective said other traffic lanes to determine the desired percentage distribution of the time cycle of the signal among the right of way periods for the several lanes, with said limits determined by said coincidences of said third and fourth local derived wave energies respectively, with the first local derived wave energy.

4. In a traffic signal controller for operation of a traffic signal for more than two mutually interfering lanes in response to remotely controlled periodic wave energies, one of which is progressively shifting in phase relation to the other at a slow controlled time rate to provide phase coincidences at time intervals of the order of a desired traffic signal cycle, the combination in said controller of means for deriving further periodic wave energies in predetermined phase relation to the respective first mentioned wave energies, and at least two said predetermined phase relations being adjustable, cyclic switching means having cycle positions through which it is adapted to be operated for controlling the usual red, yellow and green signals for such control of right of way; means in at least two of said lanes, for actuation by traffic; means controlled by said cyclic switch means at a particular position for operation of said cyclic switch means to its next position for control of transfer of right of way to a first of said at least two lanes in response to a combination of traffic actuation of said first traffic actuated means of said first lane and a first coincidence of phase of two of said derived wave energies, one from each of the first mentioned wave energies; means controlled by said cyclic switch at said particular position for operation of said cyclic switch means to a subsequent position for control of transfer of right of way to another of said at least two lanes in response to a combination of traffic actuation of said traffic actuated means in said another lane and said first coincidence of phase of derived wave energies in absence of traffic actuation in said first of said at least two lanes, and means controlled by said cyclic switch means at further positions respectively for setting limits in said cycle for transferring right of way from the respective said first and said another of said at least two traffic lanes in response to respective coincidences of two of said derived wave energies in different predetermined phase relations to one of said first mentioned wave energies as the latter successively comes in to coincidence with the derived wave energy derived from the other of said first wave energies.

5. A combination as in claim 4 and in which a plurality of phase adjusting means are provided for and identified with each of said at least two lanes for deriving alternately selectable derived wave energies in different phase relation to the associated one of the original wave energies, and means for remote controlled selection between said latter adjusting and wave energies deriving means.

6. A traffic signal controller as in claim 4 and including means controlled by the cyclic switch in a further step in its cycle for controlling retransfer of right of way from the respective said at least two lanes to another by operation of said cyclic switch from said latter position in response to phase coincidence of one of said derived wave energies with a third wave energy derived from the corresponding other of first two mentioned wave energies.

7. A traffic signal controller as in claim 4 and including means controlled by the cyclic switch in said further positions in response to actuation of said traffic actuated means for extension of right of way therefor up to a maximum limit established by the respective phase coincidence responsive means for the respective lanes having said traffic actuated means.

8. In a traffic control system for more than two interfering traffic lanes, means for providing two periodic electrical wave energies, one of which is shifting progressively in phase relation to the other at a controlled slow time rate to provide phase coincidences at time intervals of the order of desired traffic signal time cycle, traffic actuated means for at least two of said lanes, phase coincidence responsive means, means providing such time cycle of control for a traffic signal, said last named means including means for initiating such control cycle in response to a combination of traffic actuation of said traffic actuated means in either one of said lanes having such traffic actuated means and operation of said coincidence responsive means by such coincidence of said wave energies, and means for continuing said control cycle from particular respective points therein associated with the respective lanes having said traffic actuated means in response to further respective coincidences of wave energies at respective adjustable phase lags of different amounts in relation to said first coincidences.

9. In a traffic control system for an intersection of more than two mutually interfering traffic lanes and having a local traffic signal controller having a time cycle varied by remote control from a master controller in accordance with slow progressive phase shift between two periodic electrical wave energies providing phase coincidences spaced at time intervals of the order of said time cycle, said controller including a cyclic switch having a cycle of positions through which it is adapted to be operated including positions for operation of a traffic signal to accord right of way successively to said lanes, means connected with said cyclic switch to cause it to return and remain normally in position according right of way to one of said lanes in absence of traffic actuation on the others of said lanes, means for deriving further wave energy from and in predetermined desired phase relation to one of the first mentioned wave energies, means for deriving several additional wave energies in individually adjustable phase relation to the other of said first mentioned wave energies, means including connections to said cyclic switch to render said additional wave energies effective in succession in different positions of the cyclic switch to establish desired percentage points in relation to said remotely controlled time cycle for control of advancement of said cyclic switch in its cycle of positions by successive phase coincidences between the first derived wave energy and the other derived wave energies, said last named means including means employing one of the last named successive phase coincidences at one such percentage point for operating said cyclic switch out of its said normal position and to a subsequent position to transfer right of way to a second of said lanes in response to traffic actuation therein and to transfer right of way to a third of said lanes in response to traffic actuation in said third lane and absence of traffic actuation on said second lane, and said last named means including means employing others of said last named successive phase coincidences at others of said percentage points for establishing limits for the transfer of right of way from said second lane to said third lane in response to traffic actuation in the said third lane, and from said second lane to said one lane in absence of traffic actuation on said third lane, and from said third lane to said one lane.

10. A combination as in claim 9, and means controlled in certain positions of said cyclic switch for providing alternative short minimum periods of such accord of right of way in response to vehicle traffic actuation and longer minimum periods of accord of right of way in response to pedestrian traffic actuation alone or in response to pedestrian and vehicle actuation, each such minimum period being individually adjustable for the respective lanes.

11. In a traffic signal controller for control of right of way for more than two mutually interfering traffic lanes in accordance with a variable time cycle provided by remotely controlled periodic electrical wave energies one of which is shifting slowly and progressively in phase with respect to the other to provide phase coincidences periodically at variable time periods of the order of the desired variable time cycle, means including an adjustable element for deriving a local reference wave energy from one of the first mentioned wave energies and in predetermined phase relation thereto dependent on the position of said adjustable element, means for deriving a plurality of other local wave energies in individually adjustable phase relation to said first wave energies, remotely controlled means for selecting among said plurality of other local wave energies for phase comparison with said local reference wave energy, and means for slowly and progressively shifting said adjustable element in the shortest phase direction at a rate of more than one such time cycle to traverse a phase angle of less than 180 degrees to match the phase of the phase relation of the latest selected of said plurality of other local wave energies, and means for deriving a plurality of further local wave energies in individually determined phase relation to the other of said first mentioned wave energies, means for remotely controlled selection among said further local wave energies of certain of the latter derived wave energies for phase comparison with the said local reference wave energy, and means including a cyclic switch having a multiplicity of positions for effectively connecting in different positions for such last mentioned phase comparisons the selected further local wave energies, traffic actuated means for certain of the lanes and means for responding to coincidences of the said selected further wave energies with said local reference wave energy to control the advancement of said cyclic switch in certain of its positions to control the operation of said controller to accord right of way to and from certain of the successive lanes in response to traffic actuation of the traffic actuated means to provide desired percentage points in said time cycle for control of transfer of right of way from lane to lane in succession by successive combinations of selected phase coincidences and traffic actuation.

12. A traffic control system for more than two mutually interfering traffic lanes comprising signal means for said more than two traffic lanes and operable for according and interrupting right of way to the respective lanes, traffic actuated means individual to at least two of said lanes for actuation by traffic in the respective associated lane, means for operating said signal means for normally according right of way to one of said more than two lanes in absence of actuation of the traffic actuated means for any of the other of said lanes and for according right of way to either one alone of said other lanes and to the first mentioned said one lane in sequence in response to traffic actuation of the traffic actuated means for said either one alone of said other lanes and for according right of way respectively in sequence to the respective actuated of said other lanes and to said first mentioned one lane in response to traffic actuation on more than one of said other lanes, said signal operating means including means for maintaining accord of right of way to any actuated lane for a time period variable between minimum and maximum limits in accordance with traffic actuation of the traffic actuated means of said actuated lane, means for providing a remotely controlled master time cycle variable in time length, means for deriving from said master time cycle a locally adjustably offset time cycle of time length varied by said master time cycle, a plurality of individually adjustable means for setting individual different percentage points in said locally offset time cycle for the respective lanes having traffic actuated means provided therefor, and said signal operating means also including means controlled by said respective percentage point setting means for controlling said respective maximum limits at said respective percentage points in desired relation to said locally offset variable time cycle.

13. A traffic control system as in claim 12 and said percentage point setting means including a plurality of alternative adjustable means for setting certain of said percentage points for control of said maximum limits, and means for remotely controlled selection among said plurality of adjustable means for said control of said maximum limits for remote control of the percentage distribution of the time cycle.

14. A traffic control system as in claim 12, and said offset cycle deriving means including means for adjustably setting a zero point for said locally offset time cycle in desired percentage relation to said master time cycle and means controlled by the last named point setting means and by said traffic actuated means for controlling the transfer of accord of right of way from said first mentioned one lane to the actuated lane by said signal operating means.

15. In a traffic signal controller for more than two mutually interfering traffic lanes for providing a signal control cycle including more than two right of way periods for the several lanes and such cycle having a total length variable in accordance with a remotely controlled time cycle, means individual to at least two of said lanes for actuation by vehicle traffic therein, means individual to at least said two of said lanes for actuation by pedestrian traffic therein, means for according vehicle right of way for a minimum period and extendible beyond said minimum for the respective lanes of said at least two lanes in response to actuation of the vehicle actuated means in said respective lanes, a plurality of individually adjustable means for each lane of said respective lanes for setting selectable alternative maximum limits to such extension of right of way in each of said respective lanes at desired selectable percentage points in said remotely controlled time cycle, a plurality of individually adjustable means for each lane of said respective lanes for setting selectable alternative pedestrian walk periods associated with the respective right of way periods, and remotely controlled means for selecting one set at a time of said maximum limit setting means and said walk period setting means for said respective lanes for remote control of the distribution of the maximum right of way periods and associated walk periods in said remotely controlled time cycle.

16. In a traffic signal controller for more than two mutually interfering traffic lanes for providing a signal control cycle including more than two right of way periods for the several lanes and such cycle having a total length variable in accordance with a remotely controlled time cycle, means individual to at least two of said lanes for actuation by vehicle traffic therein, means individual to at least said two of said lanes for actuation by pedestrian traffic therein, means individual to the said respective lanes for according a minimum and extendible right of way period to the said respective lanes including an individually adjustable vehicle initial part and an individually adjustable vehicle extendible part extendible beyond said minimum in response to actuation of the vehicle actuated means in the respective lanes, and means individual to the said respective lanes for according a minimum and extendible period for said right of way including said vehicle extendible part and an added adjustable pedestrian walk period part and a pedestrian clearance period part in response to actuation of the pedestrian actuated means in the respective lanes, in substitution for the minimum period including said vehicle initial part and vehicle extendible part.

References Cited in the file of this patent

UNITED STATES PATENTS

| | | |
|---|---|---|
| 2,114,968 | Nein | Apr. 19, 1938 |
| 2,241,047 | Wilcox | May 6, 1941 |
| 2,448,113 | Olafson | Aug. 31, 1948 |
| 2,761,119 | Barker | Aug. 28, 1956 |
| 2,883,643 | Du Viver | Apr. 21, 1959 |